(12) United States Patent
Wei et al.

(10) Patent No.: US 11,474,394 B2
(45) Date of Patent: Oct. 18, 2022

(54) ELECTRONIC DEVICE WITH PATTERN DETECTION FUNCTION

(71) Applicant: Huawei Technologies Co., Ltd., Shenzhen (CN)

(72) Inventors: Wenxiong Wei, Hangzhou (CN); Fan Wang, Hangzhou (CN); Ao Shen, Grenoble (FR); Honghai Zhang, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/152,015

(22) Filed: Jan. 19, 2021

(65) Prior Publication Data

US 2021/0141274 A1 May 13, 2021

Related U.S. Application Data

(63) Continuation of application No. PCT/CN2019/097152, filed on Jul. 22, 2019.

(30) Foreign Application Priority Data

Jul. 20, 2018 (CN) .......................... 201810809104.5
Nov. 30, 2018 (CN) .......................... 201811459858.9
Apr. 30, 2019 (WO) ................ PCT/CN2019/085172

(51) Int. Cl.
 G02F 1/13357 (2006.01)
 G02F 1/1335 (2006.01)
 F21V 8/00 (2006.01)

(52) U.S. Cl.
 CPC ....... *G02F 1/133615* (2013.01); *G02B 6/005* (2013.01); *G02B 6/0038* (2013.01); *G02F 1/13362* (2013.01); *G02F 1/133624* (2021.01)

(58) Field of Classification Search
 CPC ......... G02F 1/133615; G02F 1/133624; G02F 1/13362; G02B 6/0038; G02B 6/005
 See application file for complete search history.

(56) References Cited

U.S. PATENT DOCUMENTS

| 5,448,659 A | 9/1995 | Tsutsui et al. |
| 2009/0021487 A1 | 1/2009 | Tien |

(Continued)

FOREIGN PATENT DOCUMENTS

| CN | 103823267 A | 5/2014 |
| CN | 104751121 A | 7/2015 |

(Continued)

OTHER PUBLICATIONS

Ruili, C., et al., "Research on Micro—Guided Holographic Fingerprint Collection System," Journal of Chinese People's Public Security University, No. 1, Sum 33, 2003, 5 pages.

(Continued)

*Primary Examiner* — Nathanael R Briggs
(74) *Attorney, Agent, or Firm* — Conley Rose, P.C.

(57) ABSTRACT

An electronic device includes a light guide plate including three grating parts. A first grating part is configured to receive the emitted light through a light incident surface of the first grating part, diffract the emitted light to form a first light, and enable the first light to enter a second grating part. The second grating part is configured to form, based on the first light, a second light propagated in the second grating part, and form, based on the second light, a third light entering a third grating part. The third grating part is configured to form, based on the third light, a fourth light propagated in the third grating part, form an emergent light based on the fourth light, and enable the emergent light to be emitted through a light emergent surface of the third grating part and enter a cover plate.

19 Claims, 21 Drawing Sheets

(56) References Cited

U.S. PATENT DOCUMENTS

| | | |
|---|---|---|
| 2014/0140654 A1 | 5/2014 | Brown et al. |
| 2017/0131552 A1 | 5/2017 | Yokoyama |
| 2017/0255813 A1 | 9/2017 | Chen et al. |
| 2017/0276948 A1 | 9/2017 | Welch et al. |
| 2018/0039083 A1 | 2/2018 | Miller et al. |
| 2018/0121701 A1 | 5/2018 | Ling et al. |
| 2018/0121703 A1 | 5/2018 | Jung et al. |
| 2018/0150674 A1 | 5/2018 | Ryu et al. |
| 2018/0164638 A1 | 6/2018 | Yoon et al. |
| 2018/0284440 A1* | 10/2018 | Popovich ................ G02F 1/292 |

FOREIGN PATENT DOCUMENTS

| | | |
|---|---|---|
| CN | 105759330 A | 7/2016 |
| CN | 106709455 A | 5/2017 |
| CN | 206147657 U | 5/2017 |
| CN | 106802487 A | 6/2017 |
| CN | 107145868 A | 9/2017 |
| CN | 107480584 A | 12/2017 |
| CN | 107527039 A | 12/2017 |
| CN | 108009533 A | 5/2018 |
| CN | 108021860 A | 5/2018 |
| CN | 108133174 A | 6/2018 |
| CN | 108196731 A | 6/2018 |
| CN | 108227064 A | 6/2018 |
| CN | 108779907 A | 11/2018 |
| CN | 109948410 A | 6/2019 |
| EP | 0609812 A1 | 8/1994 |
| EP | 1526709 A2 | 4/2005 |

OTHER PUBLICATIONS

Hongyun, Y., et al., "Small Angle LCD Screen with Double Light Guide Plate," China Illuminating Engineering Journal, vol. 27 No. 5, Oct. 2016, 5 pages.

Kouchunarayanan, K., et al., "Study of Gratings Recorded in Different Holographic Recording Media for Real-Time Holographic Fingerprint Sensor," 2009 International Conference on Ultra Modern Telecommunications and Workshops, Dec. 4, 2009, 4 pages.

\* cited by examiner

ELECTRONIC DEVICE WITH PATTERN DETECTION FUNCTION

CROSS-REFERENCE TO RELATED APPLICATIONS

This application is a continuation of International Patent Application No. PCT/CN2019/097152 filed on Jul. 22, 2019, which claims priority to International Patent Application No. PCT/CN2019/085172 filed on Apr. 30, 2019, which claims priority to Chinese Patent Application No. 201811459858.9 filed on Nov. 30, 2018 and Chinese Patent Application No. 201810809104.5 filed on Jul. 20, 2018. The disclosures of the aforementioned applications are hereby incorporated by reference in their entireties.

TECHNICAL FIELD

This application relates to the field of electronic product technologies, and in particular, to an electronic device with a pattern detection function.

BACKGROUND

Thanks to convenience and uniqueness of a fingerprint recognition technology, the fingerprint recognition technology, as an identification means, is widely used in various fields and is gradually becoming a basic configuration of an electronic device such as a smartphone.

A bezel-less screen design is a trend of smartphone development. To implement a bezel-less screen, some vendors dispose an image sensor under a screen. When emitted light from the screen is reflected by a user's finger, the image sensor collects reflected light passing through the screen, to form a fingerprint image in order to complete identification. However, because the emitted light from the screen has a characteristic of a Lambert light source, an imaging optical path needs to be added between the image sensor and the screen. Because of the imaging optical path, light that finally enters the image sensor occupies only a very small part of the emitted light. Therefore, the smartphone is prone to a recognition error or a recognition failure caused by insufficient fingerprint recognition precision resulting from insufficient light collected by the image sensor.

SUMMARY

Embodiments of this application provide an electronic device with a pattern detection function, to improve fingerprint recognition precision.

According to an aspect of this application, the electronic device includes an image sensor, a light source, and a cover plate and a light guide plate that are sequentially disposed in a stacked manner. The light source is configured to emit emitted light. The light guide plate includes one or more grating groups, and each grating group includes a first grating part, a second grating part, and a third grating part. The first grating part is configured to receive the emitted light through a light incident surface of the first grating part, diffract the emitted light to form first light, and enable the first light to enter the second grating part. The second grating part is configured to form, based on the first light, second light propagated in the second grating part, and form, based on the second light, third light entering the third grating part. The third grating part is configured to form, based on the third light, fourth light propagated in the third grating part, form emergent light based on the fourth light, and enable the emergent light to enter the cover plate after the emergent light is emitted from a light emergent surface of the third grating part. The image sensor is configured to receive reflected light that passes through the light guide plate, to form image data of a to-be-detected pattern, where the reflected light is light formed by totally reflecting the emergent light by a top surface, away from the light guide plate, of the cover plate, or the reflected light is light formed by reflecting the emergent light by the to-be-detected pattern.

The cover plate may be a front cover plate (a cover plate above the screen) of the electronic device. In this case, the image sensor is configured to recognize a to-be-detected pattern in front of the electronic device. A screen assembly of the electronic device includes the cover plate, the light guide plate, the image sensor, the light source, and the like. Alternatively, the cover plate may be a rear cover plate (or a battery cover, and disposed opposite to a screen) of the electronic device. In this case, the image sensor is configured to recognize a to-be-detected pattern located behind the electronic device. A rear cover assembly of the electronic device includes the cover plate, the light guide plate, the image sensor, the light source, and the like. In another embodiment, the cover plate may alternatively be a structure in another position of the electronic device.

In this embodiment, because detection light of the image sensor is provided by the light source, and the electronic device no longer uses light of the screen for detection, no additional imaging optical path needs to be provided in the electronic device, and the detection light provided by the light source can be fully received by the image sensor in a detection process of the image sensor. In this case, light energy utilization of the light source is high, intensity of the detection light of the image sensor is sufficient, and a comparatively clear optical image of a to-be-detected pattern (for example, a fingerprint or a palm print) can be formed on a photosensitive surface of the image sensor. Additionally, because of a high signal-to-noise ratio of the optical image, the electronic device can perform accurate recognition based on an electrical signal of the image sensor. Therefore, the electronic device has comparatively high recognition precision.

An optical path transmission structure in which a plurality of gratings is cascaded are formed using the first grating part, the second grating part, and the third grating part of the light guide plate such that light from the light source can be transmitted from the light incident surface of the first grating part to the light emergent surface of the third grating part. The structure provides an architecture for extending a light source, that is, the light source may be extended from the first grating part to the third grating part based on the architecture. In this architecture, the light source may be extended by designing different grating parts.

In an optional embodiment, the first grating part and the third grating part are respectively located on two adjacent sides of the second grating part, the light incident surface of the first grating part is opposite to the cover plate, the light emergent surface of the third grating part faces the cover plate, and an area of the light emergent surface of the third grating part is greater than an area of the light incident surface of the first grating part. Because the area of the light emergent surface of the third grating part is greater than the area of the light incident surface of the first grating part, the light guide plate can expand a coverage surface of a single light-emitting unit of the light source from a small area to a large area. This helps the electronic device minimize a quantity of light-emitting units of the light source while implementing full-screen detection. Compared with a conventional solution in which a surface light source is added under the image sensor to provide detection light, the electronic device in this embodiment reduces a size of the entire screen assembly or the rear cover assembly in a thickness direction. In this way, it is avoided that a size of the entire electronic device increases because of a great increase in thickness of the screen assembly or the rear cover assembly of the electronic device.

In an optional embodiment, the light source is located on a side, away from the cover plate, of the light guide plate. In this case, the light source may be disposed in internal space, away from the light guide plate, of the electronic device. There is a comparatively large margin for this space in a design process of the electronic device. Therefore, the design is simple, and design costs are reduced.

In an optional embodiment, the second light is propagated in the second grating part through total internal reflection, and the third light is formed by diffracting the second light by the second grating part. It is easy to implement propagation based on this method, reducing design costs.

In an optional embodiment, the fourth light is propagated in the third grating part through total internal reflection, and the emergent light is formed by diffracting the fourth light by the third grating part. It is easy to implement propagation based on this method, reducing design costs.

In an optional embodiment, the first grating part includes a first substrate and a first grating. The first grating is stacked on a side, close to the cover plate, of the first substrate. The first grating is configured to diffract the emitted light to form the first light. The first substrate is configured to transmit the first light. The first grating may be machined and formed in a manner such as nano-imprinting, a holographic technology, or laser direct writing. In this case, processing precision of the first grating part is high. This helps ensure optical path accuracy when light is transmitted in the first grating part such that detection precision of the electronic device is comparatively high.

The second grating part includes a second substrate and a second grating. The second grating is stacked on a side, close to the cover plate, of the second substrate, or the second grating is stacked on a side, away from the cover plate, of the second substrate. The second grating is configured to diffract the second light to form the third light, the second substrate is further configured to transmit the second light, and the second grating is further configured to cooperate with the second substrate, to enable the second light to be propagated in the second grating part. The second grating may be machined and formed in a manner such as nano-imprinting, a holographic technology, or laser direct writing. In this case, processing precision of the second grating part is high. This helps ensure optical path accuracy when light is transmitted in the second grating part such that detection precision of the electronic device is comparatively high.

The third grating part includes a third substrate and a third grating. The third grating is stacked on a side, close to the cover plate, of the third substrate, or the third grating is stacked on a side, away from the cover plate, of the third substrate. The third grating is configured to diffract the fourth light to form the emitted light, the third substrate is further configured to transmit the fourth light, and the third grating is further configured to cooperate with the third substrate, to enable the third light to be propagated in the third grating part. The third grating may be machined and formed in a manner such as nano-imprinting, a holographic technology, or laser direct writing. In this case, processing precision of the third grating part is high. This helps ensure optical path accuracy when light is transmitted in the third grating part such that detection precision of the electronic device is comparatively high.

In an optional embodiment, the electronic device further includes a first bonding layer and a second bonding layer. The cover plate, the first bonding layer, the light guide plate, and the second bonding layer are sequentially disposed in a stacked manner, and both a refractive index of the first bonding layer and a refractive index of the second bonding layer are less than the refractive index of the light guide plate. The components and parts at all the layers may be bonded using the bonding layers. In addition, after a refractive index of each bonding layer is set according to the foregoing method, a requirement of the electronic device for optical path transmission can be met. At that time, if there are other processes that can be implemented.

In an optional embodiment, a plurality of grating grooves of the first grating are obtained through machining on the substrate of the light guide plate, to form a plurality of grating teeth of the first grating. The grating teeth and the grating grooves of the first grating are disposed at a same layer and are disposed alternately. The grating groove of the first grating is filled with air. When the top surface of the light guide plate is connected to the cover plate using the first bonding layer, a part of the first bonding layer is filled in the grating grooves of the first grating. In this embodiment, a machining manner of the first grating is comparatively simple. This reduces processing costs of the light guide plate.

In another optional embodiment, a plurality of grating grooves of the first grating are obtained through machining on the substrate of the light guide plate, to form a plurality of grating teeth of the first grating. In addition, a transparent material is filled in the grating grooves of the first grating. A refractive index of the translucent material is lower than a refractive index of the substrate of the light guide plate. In this case, a surface, facing the cover plate, of the first grating is a plane. This helps reduce a difficulty in attaching the cover plate to the first grating part, to improve assembly precision of the screen assembly.

In an optional embodiment, a first included angle is formed between a projection of a grating serrated surface of the third grating onto the cover plate and a projection of a grating serrated surface of the first grating onto the cover plate. A second included angle is formed between a projection of a grating serrated surface of the second grating onto the cover plate and a projection of the grating serrated surface of the first grating onto the cover plate. The second included angle is equal to a half of the first included angle.

In this embodiment, a relative position relationship between the grating serrated surface of the first grating, the grating serrated surface of the second grating, and the grating serrated surface of the third grating is set such that the second grating can diffract the first light from the first grating part to form the third light, and make the third light enter the third grating part.

In an optional embodiment, the emitted light can be perpendicularly incident to the first grating. The first light is level-1 diffracted light formed by diffracting the emitted light by the first grating. A wavelength of the emitted light is λ, a diffraction angle of the first light is β, a refractive index of a substrate of the light guide plate is n, and a period d of the first grating satisfies a formula:

$$d = \frac{\lambda}{n \times \sin\beta}.$$

In this embodiment, the incidence angle of the emitted light is 0°. The first grating satisfies a grating equation d'×(sin 0°+sin α)=mλ, m=1, and d'=d×n. In this case, the first grating can accurately diffract the emitted light, to form the first light that meets a requirement. In this way, accuracy of an optical path in the light guide plate is ensured.

An incidence angle at which the first light is incident to the light incident surface of the first grating part needs to be greater than or equal to a critical angle between the light guide plate and the second bonding layer, to ensure that total internal reflection of the first light occurs on a bottom surface of the first grating part (that is, the light incident surface of the first grating part). Because the light incident surface of the first grating part is parallel to a top surface of the first grating part, that is, parallel to a grating surface of the first grating, the diffraction angle of the first light is equal to the incidence angle at which the first light is incident to the light incident surface of the first grating part. In this case, the diffraction angle of the first light is greater than or equal to the critical angle between the light guide plate and the second adhesive layer.

In an optional embodiment, the first grating is a blazed grating or a multi-level phase grating. In this case, the first grating can transfer most energy of the emitted light to level-1 diffracted light, thereby improving light energy utilization efficiency.

The grating surface of the first grating is covered with a thin metal layer that can reflect light, to further improve light energy utilization efficiency. A material of the thin metal layer may be aluminum, silver, gold, or the like. The thin metal layer may be machined and formed through sputtering, vapor deposition, chemical plating, or the like.

In another embodiment, the first grating may alternatively be a common grating. In this embodiment, a parameter of the first grating is set such that the emitted light is diffracted by the first grating to form the first light.

In an optional embodiment, the second light is level-0 diffracted light formed by diffracting the first light by the second grating (which may also be considered as light formed after total internal reflection in the second grating. In addition, it may be understood that, in addition to passing through the second grating, the second light may further pass through the substrate of the second grating part, for example, the second light passes through a bottom surface of the substrate and then is totally reflected). A diffraction angle of the second light is equal to an incidence angle at which the second light is incident to the second grating. The third light is level-1 diffracted light formed by diffracting the first light by the second grating.

Because the grating serrated surface of the second grating is rotated by a second included angle (for example, 45°) relative to the grating serrated surface of the first grating, the level-1 diffracted light formed after the first light is in contact with the second grating is deflected twice of the second included angle (for example, 90°) relative to the grating serrated surface of the first grating. In this way, the third light can enter the third grating part.

A wavelength of the emitted light is λ, a diffraction angle of the first light is β, an incidence angle at which the first light is incident to the second grating is equal to the diffraction angle of the first light, a refractive index of a substrate of the light guide plate is n, and a period d of the first grating satisfies a formula:

$$d = \frac{\lambda}{\sqrt{2} \times n \times \sin\beta}.$$

In this embodiment, the second grating is located on a side, close to the cover plate, of the second grating part, a grating surface of the second grating is parallel to the light incident surface of the first grating part, a bottom surface of the second grating part and the light incident surface of the first grating part are coplanar, and the grating surface of the first grating is parallel to the light incident surface of the first grating part. A part of the first light enters the second grating after total internal reflection of the part of the first light occurs on the light incident surface of the first grating part, and an incidence angle at which the part of first light is incident to the second grating is equal to a diffraction angle of the first light. A part of the first light enters the second grating part and enters the second grating part after total internal reflection of the part of the first light occurs on the bottom surface of the second grating part, and an incidence angle at which the part of the first light is incident to the second grating is also equal to the diffraction angle of the first light.

In this embodiment, the second grating that meets the requirement of the foregoing formula can accurately diffract the first light, to form the second light and the third light that meet the requirement. In this way, accuracy of an optical path in the light guide plate is ensured. The second grating may be a common grating.

In an optional embodiment, the fourth light is level-0 diffracted light formed by diffracting the third light by the third grating (which may also be considered as light formed after total internal reflection in the second grating. In addition, it may be understood that, in addition to passing through the third grating, the fourth light may further pass through the substrate of the third grating part, for example, the fourth light passes through a bottom surface of the substrate and then is totally reflected). A diffraction angle of the fourth light is equal to an incidence angle at which the third light is incident to the third grating. The emergent light is level-1 diffracted light formed by diffracting the third light by the third grating.

In an optional embodiment, a wavelength of the emitted light is λ, a diffraction angle of the first light is β, an incidence angle at which the third light is incident to the third grating is equal to the diffraction angle of the first light, an emergence angle at which the emergent light is emitted from the third grating is γ, a refractive index of a substrate of the light guide plate is n, and a period d of the first grating satisfies a formula:

$$d = \frac{\lambda}{n \times (\sin\beta + \sin\gamma)}.$$

In this embodiment, the third grating satisfies a grating equation: d'×(sin β+sin γ)=mλ, where m=1, and d'=d×n. In this case, the third grating can accurately diffract the third light, to form the fourth light and the emergent light that meet a requirement. In this way, accuracy of an optical path in the light guide plate is ensured.

In an optional embodiment, the electronic device further includes a filtering layer. The filtering layer is located on a side, facing the second bonding layer, of the image sensor and is bonded to the image sensor, and a refractive index of the filtering layer is greater than or equal to 1.3. In this case, light passing through the second bonding layer can smoothly enter the filtering layer.

In an implementation, the filtering layer is an optical filter. Light transmittance of the optical filter for light in a selected band is higher than light transmittance of the optical filter for light outside the selected band. The selected band ranges from ($\lambda$−5) nanometers (nm) to ($\lambda$+5) nm, where $\lambda$ is a wavelength of the emitted light. For example, when $\lambda$ is 850 nm, the selected band ranges from 845 nm to 855 nm.

In another implementation, the filtering layer is an optical coated sheet. Light transmittance of the optical coated sheet to incident light within a specific incidence angle range is higher than light transmittance to incident light outside the specific incidence angle range. The specific incidence angle range is $\gamma$ to 90°, where $\gamma$ is an emergence angle at which the emergent light is emitted from the third grating. For example, when $\gamma$ is 50°, the specific incidence angle range is 50° to 90°, or $\gamma$ may be any angle ranging from 40° to 60°.

In this embodiment, the filtering layer of the electronic device transmits required light and intercepts unnecessary light, to filter out stray light. In this way, a signal-to-noise ratio of an optical image collected by the image sensor is increased such that recognition precision of the electronic device is higher.

The optical filter may be a high-pass filter. For example, transmittance is higher than 50% or even 80% in a band range of above ($\lambda$−5) nm (including ($\lambda$−5) nm). The transmittance is less than 50% in a band range of less than ($\lambda$−5) nm. A wavelength of a cut-off band of the high-pass filter closer to ($\lambda$−5) nm leads to better performance. In practice, the wavelength of the cut-off band may be ($\lambda$−45) nm or even a smaller value in consideration of material characteristics. Transmittance of the cut-off band may be less than 1%. The high-pass filter is easy to manufacture and is low in cost.

Alternatively, the optical filter may be a low-pass filter. For example, the transmittance is higher than 50% or even 80% in a band range less than ($\lambda$+5) nm (including ($\lambda$+5) nm). The transmittance is less than 50% in the band range greater than ($\lambda$+5) nm. A wavelength of a cut-off band of the low-pass filter closer to ($\lambda$+5) nm leads to better performance. In practice, the wavelength of the cut-off band may be ($\lambda$+45) nm or even a larger value in consideration of material characteristics. Transmittance of the cut-off band may be less than 1%.

Alternatively, the optical filter may be a band-pass filter. For example, the transmittance is higher than 50% or even 80% in a band range from ($\lambda$−5) nm to ($\lambda$+5) nm (including endpoint values). The transmittance is less than 50% in the band range of less than ($\lambda$−5) nm and greater than ($\lambda$+5) nm. Wavelengths of a cut-off band of the high-pass filter closer to ($\lambda$−5) nm and ($\lambda$+5) lead to better performance. In practice, in consideration of material characteristics, the wavelengths of the cut-off band may be ($\lambda$−45) nm or even a smaller value, and ($\lambda$+45) nm or even a larger value. Transmittance of the cut-off band may be less than 1%.

Light transmittance of the optical coated sheet to incident light within a specific incidence angle range may be greater than or equal to 50%. The angle of the cut-off band of the optical coated sheet closer to $\gamma$ leads to better performance. During actual machining, when the incidence angle is less than or equal to $\gamma$−10°, the transmittance is usually reduced to less than 1%.

The filtering layer may be bonded to the image sensor using a fifth bonding layer. A refractive index of the fifth bonding layer is greater than or equal to 1.3. In this case, light passing through the filtering layer can smoothly pass through the fifth bonding layer and enter the image sensor.

In an optional embodiment, the electronic device further includes a display panel. The display panel is stacked on a side, away from the light guide plate, of the second bonding layer. The image sensor is located inside the light guide plate or located on a side, away from the light guide plate, of the display panel.

In this embodiment, the electronic device can implement pattern detection (for example, a fingerprint or a palm print) using the image sensor disposed in the display panel or under the display panel, and the image sensor performs detection in an optical detection manner. Compared with a capacitive or ultrasonic detection solution, optical detection can resolve a problem that it is difficult for a detection signal to penetrate through the display panel.

Because the light emitted by the light source is infrared light that cannot be identified by human eyes, the light does not affect normal display of the display panel, and a detection action of the image sensor and a display action of the display panel can be performed separately or simultaneously.

In an optional embodiment, the display panel is a flexible organic light-emitting diode panel. An emergence angle at which the emergent light is emitted from the light emergent surface of the third grating part is greater than or equal to a critical angle between the cover plate and external air, and the reflected light is light formed by totally reflecting the emergent light by a region that is not in contact with the to-be-detected pattern and that is on a top surface, away from the light guide plate, of the cover plate. In an embodiment, the emergence angle at which the emergent light is emitted from the light emergent surface of the third grating part is an emergence angle at which the emergent light is emitted from the third grating.

In this embodiment, because the reflected light is light formed by totally reflecting the emergent light on a top surface of the cover plate, a loss of the reflected light in a transmission process is small, and light intensity of the reflected light is comparatively large. This helps improve recognition precision of the image sensor such that the electronic device has comparatively high detection accuracy.

In an optional embodiment, the display panel is a rigid organic light-emitting diode panel. There is an air layer inside the display panel. An emergence angle at which the emergent light is emitted from the light emergent surface of the third grating part is less than a critical angle between the cover plate and external air, and the reflected light is light formed by reflecting the emergent light by the to-be-detected pattern. In an embodiment, the emergence angle at which the emergent light is emitted from the light emergent surface of the third grating part is an emergence angle at which the emergent light is emitted from the third grating.

In this embodiment, because there is the air layer inside the display panel, an image collection manner of the electronic device no longer depends on an optical path for total internal reflection, but collects reflected light reflected back by the to-be-detected pattern, to form image data of the corresponding to-be-detected pattern. The detection manner is simple and direct.

In an optional embodiment, the electronic device further includes a quarter-wave plate and a linear polarizer. The quarter-wave plate is located between the cover plate and the first bonding layer. The linear polarizer is located between the image sensor and the second bonding layer. The light source is configured to emit the emitted light that is linearly polarized, where a polarization direction of the emitted light is perpendicular to a polarization direction of the linear polarizer.

In this embodiment, no material having birefringence is used for a rigid display screen, therefore, a polarization state of light entering the display panel is stable. When light is diffracted in the light guide plate into stray light that is emitted to the display panel, the stray light cannot pass through the linear polarizer because a polarization state of the light is perpendicular to the linear polarizer. The linear polarizer can implement filtering such that light noise received by the image sensor is low, and a signal-to-noise ratio of an optical image obtained by the image sensor is high.

The linear polarizer may be a wire grid polarizer, to filter out infrared light.

In an optional embodiment, an air layer is formed between the second bonding layer and the image sensor. The electronic device further includes a prism film. The prism film is located on a side, close to the second bonding layer, of the air layer. The prism film includes a plurality of micro prisms arranged in an array, and an incidence angle of the reflected light on a tilt surface of the micro prism is less than a critical angle between the prism film and external air.

In this embodiment, because the incidence angle of the reflected light on the tilt surface of the micro prism is less than the critical angle between the prism film and the external air, the plurality of micro prisms of the prism film can destroy a condition for total internal reflection. In this case, the reflected light of which total internal reflection originally occurs on an air interface (that is, the top surface, far away from the light guide plate, of the cover plate) can be emitted from the prism film, enters an air layer and the image sensor, and is collected by the image sensor.

The prism film further includes a body. The plurality of micro prisms is located on a side, facing the air layer, of the body. A bottom surface of each micro prism is connected to the body. In an implementation, a bottom surface of each micro prism is parallel to the second bonding layer, a first angle is formed between a tilt surface of each micro prism and a bottom surface of the micro prism, and a sum of the emergence angle at which the emergent light is emitted from the third grating and the critical angle between the prism film and the external air is less than the first angle.

In an optional embodiment, an air layer is formed between the second bonding layer and the image sensor. The electronic device further includes a grating layer. The grating layer is located on a side, close to the second bonding layer, of the air layer. The grating layer is configured to diffract the reflected light to form sensed light, and make the sensed light enter the image sensor after the sensed light passes through the air layer. In this case, the image sensor can collect the reflected light of which total internal reflection occurs on the air interface (that is, the top surface, far away from the light guide plate, of the cover plate) such that the electronic device implements pattern detection.

In an optional embodiment, there is one grating group. A bottom surface, connected to the first bonding layer, of the cover plate includes a first short side and a first long side. The first long side is perpendicular to the first short side. A length of the first long side is greater than a length of the first short side. The light incident surface of the second grating part faces the first grating part. The light emergent surface of the second grating part faces the third grating part.

The light incident surface of the second grating part is parallel to the first short side, and the light emergent surface of the second grating part is parallel to the first long side, or the light emergent surface of the second grating part is parallel to the first short side, and the light incident surface of the second grating part is parallel to the first long side.

In this embodiment, one of the light incident surfaces and the light emergent surface of the second grating part is parallel to the first long side, the other one of the light incident surfaces and the light emergent surface of the second grating part is parallel to the first short side, and positions of the first grating part and the third grating part that are connected to the second grating part vary with the second grating part. Therefore, an arrangement position of each grating part of the light guide plate is highly matched with a shape of the bottom surface of the cover plate, and the light emergent surface of the third grating part can better correspond to the display region of the cover plate such that the electronic device has a larger recognition region, and use experience of the electronic device is better.

In an optional embodiment, for a display zone of the display panel, a display region is formed on the bottom surface of the cover plate. The bottom surface of the cover plate further includes a black-edged region provided around the display region. A projection of the first grating part onto the bottom surface of the cover plate falls within the black-edged region. A projection of the second grating part onto the bottom surface of the cover plate falls within the black-edged region. A projection of the third grating part onto the bottom surface of the cover plate falls within the display region.

In this implementation, arrangement of the grating parts of the grating group of the light guide plate is based on the display region of the cover plate and the black-edged region, that is, based on the display zone of the display panel such that the light emergent surface of the third grating can better adapt to the display zone of the display panel. This helps the electronic device implement full-screen detection or large-area detection.

In an optional embodiment, diffraction efficiency of the second grating part progressively increases in a direction parallel to the light emergent surface of the second grating part and away from the light incident surface of the second grating part.

In this implementation, when a light beam is transmitted in the second grating part, a part of light is diffracted by the second grating each time the light beam is in contact with the second grating. In addition, a longer distance from the first grating part indicates weaker energy of the light beam. The second grating part progressively increases diffraction efficiency of the second grating part in a direction away from the first grating part such that light formed by diffracting the light beam by the second grating can maintain same or similar light intensity, and light emergent intensity of the light emergent surface of the third grating part tends to be consistent.

The second grating may increase diffraction efficiency by increasing a grating duty ratio (a ratio of a grating tooth width to a grating period) or increasing a grating depth (that is, a grating tooth height). In this implementation, the second grating may increase the diffraction efficiency by maintaining the grating depth unchanged and increasing the grating duty ratio. In this way, machining difficulty of the second grating is reduced.

In an optional embodiment, the second grating part includes at least two grating regions, and a direction in which the at least two grating regions are arranged is parallel to the light emergent surface of the second grating part, and diffraction efficiency of each grating region progressively increases in a direction parallel to the light emergent surface of the second grating part and away from the light incident surface of the second grating part.

That is, diffraction efficiency of the second grating part cyclically progressively increases in a direction parallel to the light emergent surface of the second grating part and away from the light incident surface of the second grating part. For example, the second grating part includes an upper grating region close to the first grating part and a lower grating region away from the first grating part. A duty ratio of the upper grating region progressively increases in a direction parallel to the light emergent surface of the second grating part and away from the light incident surface of the second grating part. A duty ratio of the lower grating region progressively increases in the direction parallel to the light emergent surface of the second grating part and away from the light incident surface of the second grating part, instead of continuing to increase based on the duty ratio of the upper grating region. In an implementation, diffraction efficiency change rules of different grating regions may be the same.

In this implementation, the second grating part includes the plurality of grating regions, diffraction efficiency of each grating region is separately set, and a progressive increase amplitude of diffraction efficiency of a single grating region is comparatively small. Therefore, a difficulty, caused by an excessively large progressive increase amplitude of diffraction efficiency (for example, an excessively large duty ratio change range), in machining can be overcome.

In an optional embodiment, there are two grating groups. The two grating groups are arranged axisymmetrically or centrosymmetrically. In this embodiment, because there are two grating groups, the two grating groups may be jointly configured to provide detection light for a detection process of the electronic device such that light intensity of the detection light of the electronic device is more sufficient. In this way, detection precision of the electronic device is improved. Because the two grating groups are arranged axisymmetrically or centrosymmetrically, and the display zone of the display panel is in a regular shape, light emergent regions corresponding to the two grating groups can better adapt to the display zone of the display panel. This helps the electronic device implement full-screen detection or large-area detection.

In an optional embodiment, a bottom surface, connected to the first bonding layer, of the cover plate includes a first short side and a first long side. The first long side is perpendicular to the first short side. A length of the first long side is greater than a length of the first short side. In each of the grating groups, a light incident surface of the second grating part faces the first grating part, and a light emergent surface of the second grating part faces the third grating part.

A light incident surface of the second grating part of one of the grating groups is parallel to the first short side, and a light emergent surface of the second grating part is parallel to the first long side, or a light incident surface of the second grating part of one of the grating groups is parallel to the first long side, and a light emergent surface of the second grating part is parallel to the first short side.

In this embodiment, because the two grating groups are arranged axisymmetrically or centrosymmetrically, one of the light incident surface and the light emergent surface of the second grating part of one of the grating groups is parallel to the first long side, the other one of the light incident surface and the light emergent surface of the second grating part is parallel to the first short side, and positions of the first grating part and the third grating part that are connected to the second grating part vary with the second grating part. Therefore, an arrangement position of each grating part of the light guide plate is highly matched with a shape of the bottom surface of the cover plate, and the light emergent surface of the third grating part can better correspond to the display region of the cover plate such that the electronic device has a larger recognition region, and use experience of the electronic device is better.

In an optional embodiment, for a display zone of the display panel, a display region is formed on the bottom surface of the cover plate, and the bottom surface of the cover plate further includes a black-edged region provided around the display region. A projection of the first grating part of each grating group onto the bottom surface of the cover plate falls within the black-edged region. A projection of the second grating part of each grating group onto the bottom surface of the cover plate falls within the black-edged region or the display region. A projection of the third grating part of each grating group onto the bottom surface of the cover plate falls within the display region.

In this embodiment, arrangement of grating parts of the two grating groups of the light guide plate is based on the display region of the cover plate and the black-edged region, that is, based on the display zone of the display panel such that the light emergent surface of the third grating can better adapt to the display zone of the display panel. This helps the electronic device implement full-screen detection or large-area detection.

In an optional embodiment, the light source includes a laser and a collimation lens. The collimation lens is configured to adjust light emitted by the laser to a collimated light beam, to form the emitted light.

In this embodiment, the emitted light is adjusted to the collimated beam by the collimation lens, an optical path along which the emitted light enters the light guide plate is guided and restricted by the gratings of the light guide plate, the emergent light and the reflected light are also limited to collimated light beams, and the light guide plate can provide the collimated light beam through the entire light emergent surface. Therefore, an optical image formed by the reflected light entering the image sensor directly corresponds to a to-be-detected pattern (such as a fingerprint or a palm print), and there is no need to provide an additional imaging optical path in the electronic device. In this way, a detection structure of the electronic device is simplified, and utilization of light energy is improved.

In an optional embodiment, the electronic device further includes a light pipe. The light pipe is located on a side, facing the display panel, of the light guide plate and is located around the display panel. The light pipe includes a light incident end surface and a light emergent end surface that are disposed opposite to each other. The light incident end surface is configured to receive the emitted light entering the light pipe. The light emergent end surface is configured to enable the emitted light to be emitted from the light pipe and enter the first grating part.

In this embodiment, the emitted light can enter the first grating part through the light guide plate, and the light pipe can guide light. Therefore, the light source does not need to be directly placed under the first grating part, that is, the light source does not need to be placed around the display panel. In this way, a size occupied for a peripheral region of the screen assembly can be reduced, and a size of the periphery of the screen assembly can be reduced to a size of one light pipe, reducing a width of a black edge of the screen assembly.

The light pipe may be of a cylindrical structure or a cuboid structure. A material of the light pipe may be polycarbonate (PC) or glass.

In an optional embodiment, the electronic device further includes a light pipe. The light pipe is located on a side, facing the display panel, of the light guide plate and is located around the display panel. The light pipe includes a light incident end surface, a reflection surface, and a light emergent end surface. The light source is located on a side, away from the light guide plate, of the display panel. The light incident end surface is configured to receive the emitted light entering the light pipe. The reflection surface is configured to reflect the emitted light entering the light pipe, and the light emergent end surface is configured to enable the reflected emitted light to be emitted from the light pipe and enter the first grating part.

In this embodiment, the light pipe may change a light propagation direction such that the light source can be arranged under the display panel, or even under the display zone of the display panel. Therefore, the light source does not need to occupy peripheral space of the screen assembly. In this way, a size requirement on a bezel region (corresponding to a black-edged region of the cover plate) of the screen assembly is reduced, and it is helpful for the electronic device to implement a narrow bezel.

This application further provides an electronic device, including a cover plate, a first bonding layer, a light guide plate, and a second bonding layer that are sequentially disposed in a stacked manner. Both a refractive index of the first bonding layer and a refractive index of the second bonding layer are less than the refractive index of the light guide plate. The electronic device further includes an image sensor and a light source. The image sensor is located on a side, away from the light guide plate, of the second bonding layer. The light source is located on a side, facing the image sensor, of the light guide plate. The light guide plate includes one or more grating groups. Each grating group includes a first grating part, a second grating part, and a third grating part. The first grating part and the third grating part are respectively located on two adjacent sides of the second grating part. A light incident surface of the first grating part backs on the cover plate. A light emergent surface of the third grating part faces the cover plate. An area of the light emergent surface of the third grating part is greater than an area of the light incident surface of the first grating part. The light source is configured to emit emitted light. The light source includes one or more light-emitting units. The first grating part is configured to receive the emitted light through a light incident surface of the first grating part, diffract the emitted light to form first light, and enable the first light to enter the second grating part. The second grating part is configured to diffract the first light to form second light and third light such that total internal reflection of the second light occurs in the second grating part, and the third light enters the third grating part. The third grating part is configured to diffract the third light to form fourth light and emergent light such that total internal reflection of the fourth light occurs in the third grating part, and the emergent light is emitted through the light emergent surface of the third grating part and then enters the cover plate. The image sensor is configured to receive reflected light that passes through the light guide plate, to form image data of a to-be-detected pattern. The reflected light is light formed by totally reflecting the emergent light by a region that is not in contact with the to-be-detected pattern and that is on a top surface, away from the light guide plate, of the cover plate, or the reflected light is light formed by reflecting the emergent light by the to-be-detected pattern. For specific implementation of each component of the electronic device, refer to the foregoing part.

This application further discloses a light guide plate applied to the foregoing electronic device.

This application further discloses a light guide module assembly, including the light guide plate and the light source of the foregoing electronic device.

This application further discloses a light guide module assembly, including the light guide plate, the light source, and the image sensor of the foregoing electronic device.

This application further discloses a screen module assembly, including a display screen, and the light guide plate, the light source, and the image sensor of the foregoing electronic device.

DESCRIPTION OF EMBODIMENTS

The following describes implementations of this application with reference to the accompanying drawings in the implementations of this application.

An embodiment of this application provides an electronic device. The electronic device may be a mobile phone, a tablet computer, an electronic reader, a notebook computer, a vehicle-mounted device, a wearable device, or the like. The electronic device has a pattern detection function. The electronic device can be configured to detect a to-be-detected pattern. The to-be-detected pattern includes but is not limited to a user fingerprint, a user palm print, or the like. This embodiment of this application is described using an example in which the electronic device is configured to detect a user fingerprint, that is, the electronic device has a fingerprint detection function.

In an embodiment, the electronic device can detect a to-be-detected pattern in front of the electronic device (that is, a position that a screen of the electronic device faces). In another embodiment, the electronic device can detect a to-be-detected pattern in the rear of the electronic device. In still another embodiment, the electronic device can detect a to-be-detected pattern in front of the electronic device, and can further detect a to-be-detected pattern in the rear of the electronic device. In another embodiment, the electronic device can detect a to-be-detected pattern on a side of the electronic device.

Figure 1:
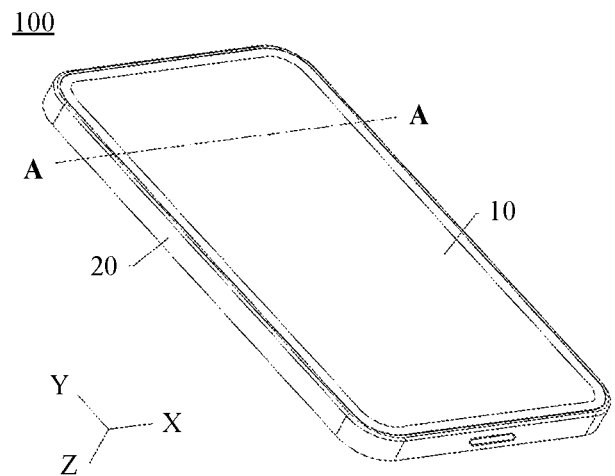
FIG. 1 is a schematic structural diagram of an electronic device according to an embodiment of this application.

FIG. 1 is a schematic structural diagram of an electronic device 100 according to an embodiment of this application. In FIG. 1, description is provided using an example in which the electronic device 100 is a mobile phone. In FIG. 1, a length direction of the electronic device 100 is defined as a direction X, a width direction of the electronic device 100 is defined as a direction Y, and a thickness direction of the electronic device 100 is defined as a direction Z. A plane of the directions X and Y is a plane XY.

The electronic device 100 includes a screen assembly 10 and a housing 20. The screen assembly 10 is mounted on the housing 20. An internal cavity of the electronic device 100 is enclosed by the screen assembly 10 and the housing 20 together. Components such as a processor, a mainboard, and a battery of the electronic device 100 are accommodated in the internal cavity of the electronic device 100. The screen assembly 10 is parallel to the plane XY. The housing 20 includes a bezel and a rear cover. The screen assembly 10 and the rear cover are respectively disposed on two opposite sides of the bezel. The rear cover and the bezel may be integrally formed, or may be assembled to form an integral structure.

Figure 2:
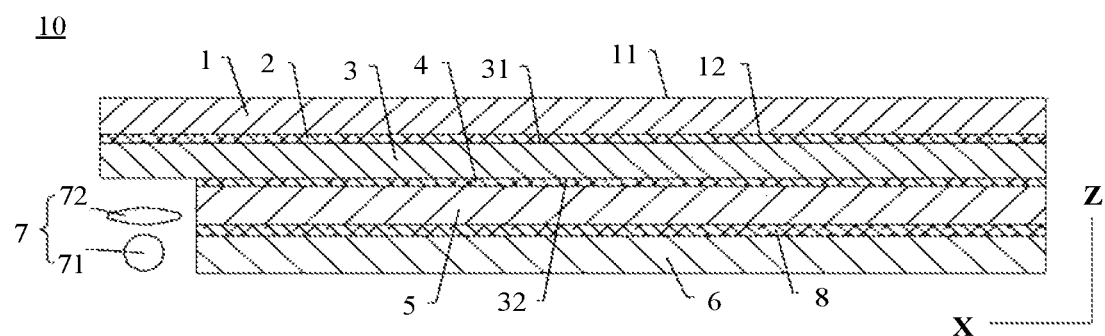
FIG. 2 is a schematic structural diagram of a structure, along a line A-A in a first embodiment, of a screen assembly of the electronic device shown in FIG. 1.
Figure 3:
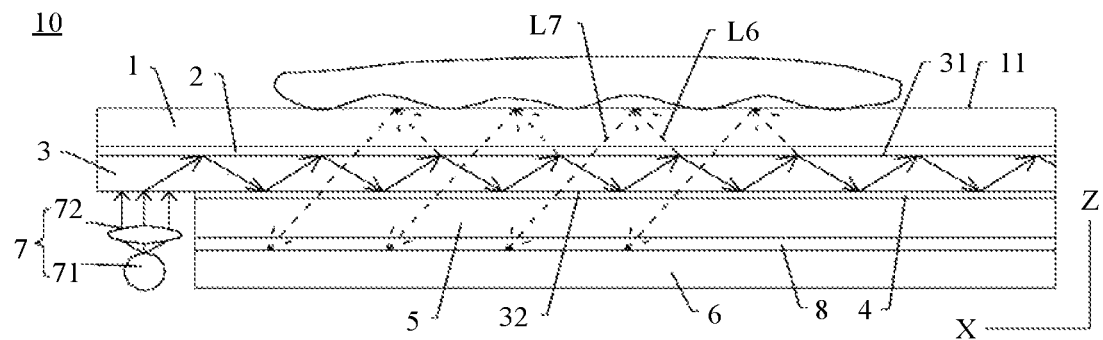
FIG. 3 is a schematic diagram of the structure in FIG. 2 in a used state.

Reference is still made to FIG. 2 and FIG. 3. FIG. 2 is a schematic structural diagram of a structure, along a line A-A in a first embodiment, of the screen assembly 10 of the electronic device 100 in FIG. 1. FIG. 3 is a schematic diagram of the structure shown in FIG. 2 in a used state. In FIG. 3, a cross-section line in the structure is omitted to clearly show a light transmission path.

The screen assembly 10 of the electronic device 100 includes a cover plate 1, a first bonding layer 2, a light guide plate (LGP) 3, a second bonding layer 4, and a display panel 5 that are sequentially disposed in a stacked manner. In this embodiment of this application, a light-emitting direction of the display panel 5 is defined as an "up" direction, and a direction opposite to the light-emitting direction of the display panel 5 is defined as a "down" direction. The "up" and "down" directions are two orientations of the Z direction. In this embodiment, the cover plate 1 is a front cover plate of the electronic device 100. The display panel 5 is located under the cover plate 1. The first bonding layer 2 is located under the cover plate 1. The light guide plate 3 is located under the first bonding layer 2. The second bonding layer 4 is located under the light guide plate 3. The display panel 5 is located under the second bonding layer 4.

The cover plate 1 is made of a translucent material. For example, when the display panel 5 is a rigid panel, the cover plate 1 may be a translucent cover glass (CG). When the display panel 5 is a flexible panel, the cover plate 1 may be made of a flexible polymer material, to prevent penetration of water vapor and oxygen. The cover plate 1 can protect the display panel 5. The display panel 5 is configured to display an image. For example, the display panel 5 can generate a user interface. The display panel 5 may be an organic light-emitting diode (OLED) panel. In another embodiment, the display panel 5 may alternatively be a liquid-crystal display (LCD) panel or a micro light-emitting diode LED) panel.

The first bonding layer 2, the light guide plate 3, and the second bonding layer 4 all are made of a translucent material. Both a refractive index of the first bonding layer 2 and a refractive index of the second bonding layer 4 are less than a refractive index of the light guide plate 3. The refractive index of the light guide plate 3 is greater than the refractive index of the first bonding layer 2. Therefore, when light is emitted to the first bonding layer 2 through the light guide plate 3, and an incidence angle of the light is less than a critical angle between the light guide plate 3 and the first bonding layer 2, total internal reflection (TIR) of the light occurs on a top surface 31, connected to the first bonding layer 2, of the light guide plate 3. The refractive index of the light guide plate 3 is greater than the refractive index of the second bonding layer 4. Therefore, when light is emitted to the second bonding layer 4 through the light guide plate 3, and an incidence angle of the light is less than a critical angle between the light guide plate 3 and the second bonding layer 4, total internal reflection of the light occurs on a bottom surface 32, connected to the second bonding layer 4, of the light guide plate 3. The top surface 31 of the light guide plate 3 and the bottom surface 32 of the light guide plate 3 are respectively located on two opposite sides of the light guide plate 3.

The screen assembly 10 of the electronic device 100 further includes an image sensor 6 and a light source. The image sensor 6 is located on a side, away from the light guide plate 3, of the second bonding layer 4. The light source includes one or more light-emitting units 7. A quantity of light-emitting units may be selected with reference to a quantity and positions of grating groups included in the light guide plate such that light can be conducted on the light guide plate.

The display panel 5 is stacked on a side, away from the light guide plate 3, of the second bonding layer 4. The image sensor 6 is located on a side, away from the light guide plate 3, of the display panel 5. The image sensor 6 is located under the display panel 5. The image sensor 6 is configured to sense light, and convert an optical image on a photosensitive surface of the image sensor 6 into an electrical signal that has a corresponding proportion relationship with the optical image. The image sensor 6 is configured to recognize a to-be-detected pattern in front of the electronic device 100. The processor of the electronic device 100 can obtain a corresponding optical image based on the electrical signal. The image sensor 6 may include a plurality of photodetectors (PD). The plurality of photodetectors may be arranged in an array. A region in which the plurality of photodetectors is arranged may be used to sense light passing through an entire display zone of the display panel 5 such that the screen assembly 10 implements full-screen detection. The region in which the plurality of photodetectors is arranged may alternatively be used to sense light passing through a local display zone of the display panel 5 such that the screen assembly 10 implements local detection.

The light source is located on a side, facing the display panel 5, of the light guide plate 3. The light source is located under the light guide plate 3. The light source is configured to emit light that can be sensed by the image sensor 6. This embodiment of this application is described using an example in which "the light emitted by the light source is infrared light, and the image sensor 6 senses the infrared light". In another embodiment, the light emitted by the light source may alternatively be visible light or invisible light such as ultraviolet light.

In this embodiment, infrared light emitted by the light source can enter the light guide plate 3, and a structure and a parameter of the light guide plate 3 and an incidence angle of the infrared light can be set to implement total internal reflection of a part of the infrared light entering the light guide plate 3 (as shown by solid-line arrows in FIG. 3) in the light guide plate 3 for forward transmission. The part of the infrared light (as shown by dashed-arrows in FIG. 3) enters the cover plate 1 through the first bonding layer 2, and is reflected by a top surface 11, away from the light guide plate 3, of the cover plate 1, or is reflected by the to-be-detected pattern above the cover plate 1. The reflected infrared light sequentially passes through the first bonding layer 2, the light guide plate 3, the second bonding layer 4, and the display panel 5, and then enters the image sensor 6.

When being emitted to the top surface 11 of the cover plate 1, the light may be totally reflected in a region that is not in contact with the to-be-detected pattern and that is on the top surface 11 of the cover plate 1. In this case, an incidence angle at which the infrared light is emitted to the top surface 11 of the cover plate 1 needs to be greater than or equal to a critical angle between the cover plate 1 and the external air.

In a use environment, the electronic device 100 can be configured to recognize a user fingerprint. As shown in FIG. 3, when a user's finger is in touch with the cover plate 1, ridges of a fingerprint of the user's finger are in contact with the cover plate 1. A refractive index of human skin is greater than a refractive index of the air. Therefore, a condition for total internal reflection in regions on the top surface 11 of the cover plate 1 that are in contact with the ridges of the fingerprint (that is, regions in contact with the to-be-detected pattern) is damaged, and most infrared light emitted to the region is absorbed and scattered by the user's finger and cannot return to the image sensor 6, or energy of light returning to the image sensor 6 is weak, and finally a dark zone of a fingerprint image is present on the image sensor 6. However, valleys of the fingerprint of the user's finger are not in contact with the cover plate 1. Therefore, a condition for total internal reflection in regions on the top surface 11 of the cover plate 1 that are opposite to the valleys of the fingerprint (that is, regions not in contact with the to-be-detected pattern) is still maintained, the infrared light emitted to the regions is totally reflected, and can still pass through the light guide plate 3 and the display panel 5 to reach the image sensor 6, and finally a bright zone of the fingerprint image is formed on the image sensor 6.

In another use environment, the electronic device 100 may also be configured to recognize a palm print of the user or another touch action of the user. For a recognition manner, refer to the fingerprint recognition manner. Details are not described herein again.

In this embodiment, the electronic device 100 can implement detection (for example, fingerprint detection, palm print detection, or touch action detection) through the image sensor 6 disposed under the display panel 5. The image sensor 6 performs detection in an optical detection manner. Compared with a capacitive detection solution or an ultrasonic detection solution, optical detection can resolve a problem that it is difficult for a detection signal to penetrate through the display panel 5.

Because the detection light of the image sensor 6 is provided by the light source, and the electronic device 100 no longer uses light of the display panel 5 for detection, no additional imaging optical path needs to be provided in the electronic device 100, and the detection light provided by the light source can be fully received by the image sensor 6 in a detection process of the image sensor 6. In this case, light energy utilization of the light source is high, intensity of the detection light of the image sensor 6 is sufficient, and a comparatively clear optical image of the to-be-detected pattern (for example, a fingerprint or a palm print) can be formed on the photosensitive surface of the image sensor 6. In addition, thanks to a high signal-to-noise ratio of the optical image, the electronic device 100 can perform accurate recognition based on the electrical signal of the image sensor 6. Therefore, the electronic device 100 has comparatively high recognition precision.

In the detection process of the image sensor 6, the detection light is transmitted in the cover plate 1 and under the cover plate 1, and is not emitted from the cover plate 1 or recognized by human eyes. Therefore, the detection light does not affect normal display of the display panel 5. In addition, a detection action of the image sensor 6 and a display action of the display panel 5 can be performed separately or simultaneously.

Optionally, the electronic device 100 further includes a third bonding layer 8. The third bonding layer 8 is located between the display panel 5 and the image sensor 6. The third bonding layer 8 is made of a transparent material such that the infrared light can smoothly pass through the third bonding layer 8 and enter the image sensor 6. The third bonding layer 8 may be made of an optically clear adhesive (OCA) material.

In another embodiment, the incidence angle at which the infrared light is emitted to the top surface 11 of the cover plate 1 may alternatively be less than the critical angle between the cover plate 1 and the external air. This part of infrared light is reflected by the to-be-detected pattern above the cover plate 1 and then enters the image sensor 6. This embodiment is described below.

Referring to FIG. 2 and FIG. 3, the light-emitting unit 7 of the light source includes a laser 71 and a collimation lens 72. The collimation lens 72 is configured to adjust light emitted by the laser 71 to a collimated light beam, to form emitted light. A light-emitting point of the laser 71 is located within a focal length of the collimation lens 72. The laser 71 may be a laser diode (LD). Because the emitted light is a collimated light beam, a direction of the emitted light is highly controllable. Emergent light in a preset direction can be formed by guiding the emitted light by the light guide plate 3, to provide sufficient detection light in the detection process of the image sensor 6. In this way, detection reliability of the electronic device 100 is further improved, and light energy utilization of the light source can also be improved.

Optionally, the collimation lens 72 may be a single lens (for example, a plano-convex lens or a biconvex lens), two plano-convex lenses, or a doublet. In an embodiment, the laser 71 may be a laser-diode array. In this case, the collimation lens 72 may be a microlens array.

Figure 4:
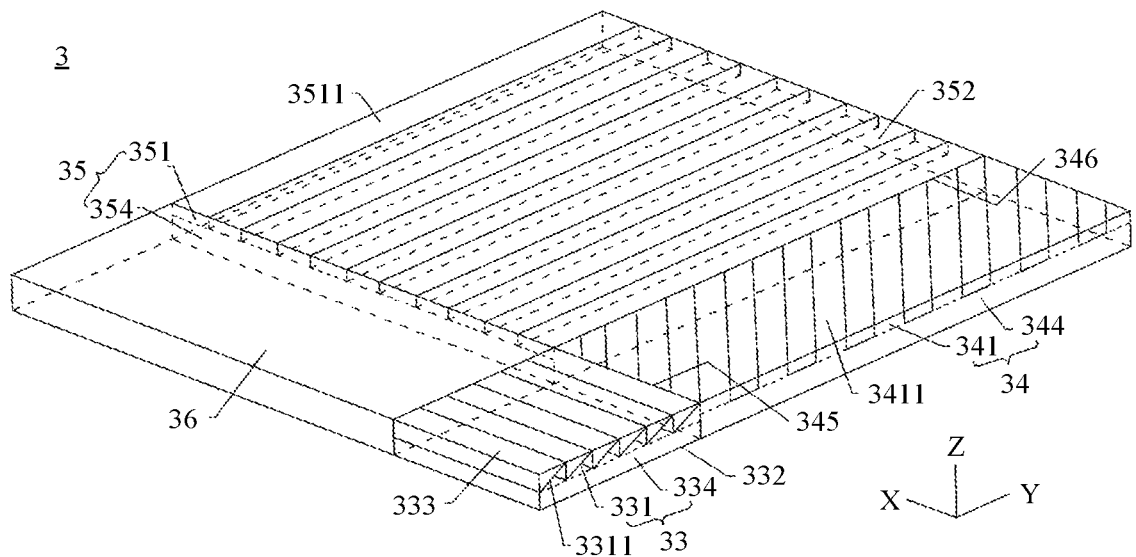
FIG. 4 is a schematic diagram of a three-dimensional structure of the light guide plate in FIG. 2 in an embodiment.
Figure 5:
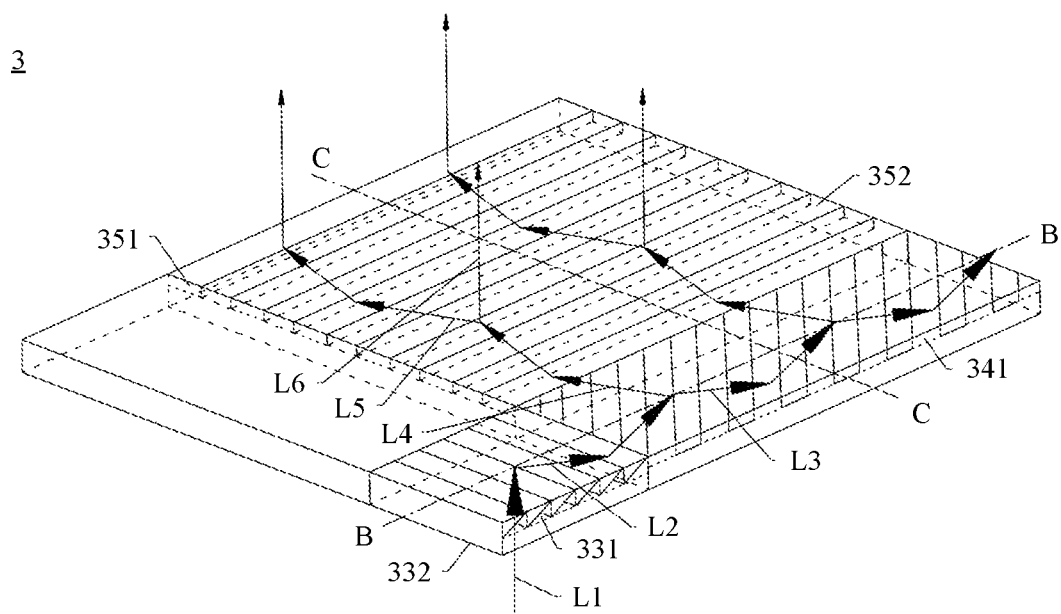
FIG. 5 is a schematic diagram of transmission of a possible optical path of the light guide plate shown in FIG. 4.
Figure 6:
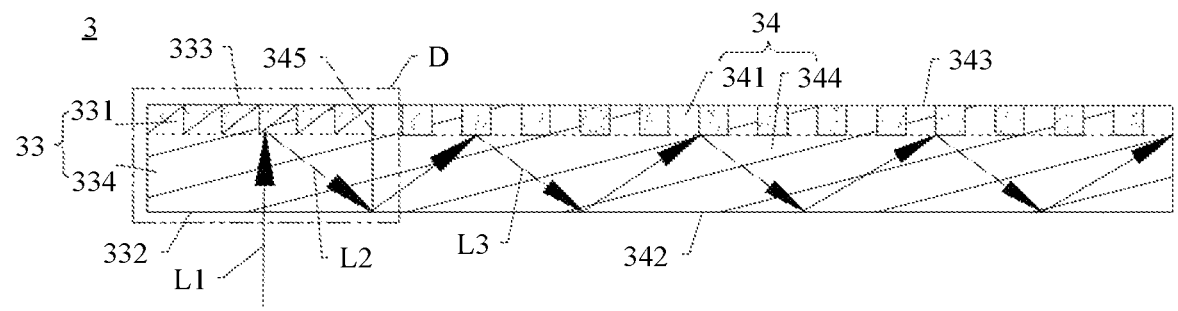
FIG. 6 is a schematic diagram of a part, at a line B-B, of the optical path shown in FIG. 5.
Figure 7:
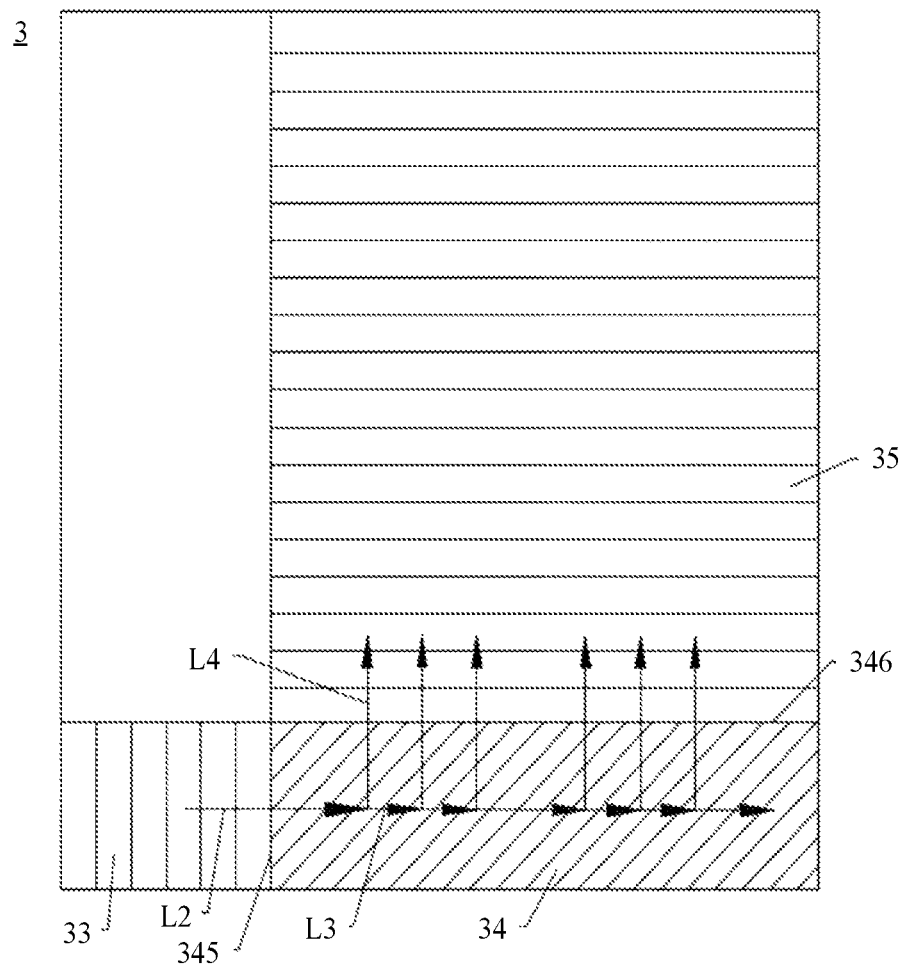
FIG. 7 is a schematic diagram of a part, in a top-view light guide plate, of the optical path shown in FIG. 5.
Figure 8:
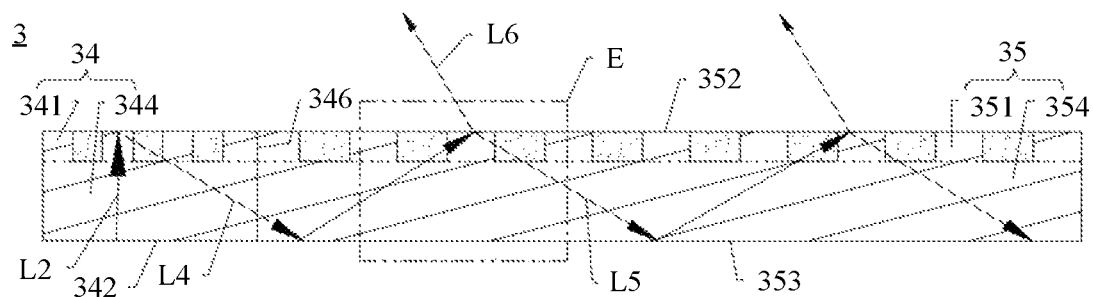
FIG. 8 is a schematic diagram of a part, at a line C-C, of the optical path shown in FIG. 5.

Reference is made to FIG. 4 to FIG. 8. FIG. 4 is a schematic three-dimensional structural diagram of the light guide plate 3 in FIG. 2 in an embodiment, FIG. 5 is a schematic diagram of possible optical path transmission of the light guide plate 3 shown in FIG. 4. FIG. 6 is a schematic diagram of a part, at a line B-B, of the optical path shown in FIG. 5. FIG. 7 is a schematic diagram of a part, in the top-view light guide plate 3, of the optical path shown in FIG. 5. FIG. 8 is a schematic diagram of a part, at a line C-C, of the optical path shown in FIG. 5.

The light guide plate 3 includes one or more grating groups 30. Each grating group 30 includes a first grating part 33, a second grating part 34, and a third grating part 35. The first grating part 33, the second grating part 34, and the third grating part 35 are laid on a plane parallel to the cover plate 1 (that is, a plane parallel to the plane XY). The light guide plate 3 includes a plurality of gratings. The plurality of gratings is located in different grating parts. The grating is an optical device, and the grating includes a series of periodic grating teeth. A center distance between two adjacent grating teeth is a grating period. The grating period has the same magnitude level as the optical wavelength. Similarly, a height of each grating tooth of the grating has the same magnitude level as the optical wavelength.

The first grating part 33 and the third grating part 35 are respectively located on two adjacent sides of the second grating part 34. The second grating part 34 includes a light incident surface 345 and a light emergent surface 346 that are adjacent to each other. A length of a projection of the light emergent surface 346 of the second grating part 34 onto the cover plate 1 is greater than a length of a projection of the light incident surface 345 of the second grating part 34 onto the cover plate 1. The light incident surface 345 of the second grating part 34 is disposed facing the first grating part 33. The light emergent surface 346 of the second grating part 34 is disposed facing the third grating part 35. In this embodiment, the second grating part 34 is approximately in a cuboid shape. The light emergent surface 346 of the second grating part 34 is approximately perpendicular to the light incident surface 345 of the second grating part 34. In another embodiment, the second grating part 34 may alternatively be in another shape, and another position relationship may alternatively exist between the light emergent surface 346 of the second grating part 34 and the light incident surface 345 of the second grating part 34, for example, an included angle between 75° and 105° is formed between the light emergent surface 346 and the light incident surface 345. The shape and the position relationship are not strictly limited in this application.

In this embodiment, the first grating part 33 is connected to the second grating part 34, and the third grating part 35 is connected to the second grating part 34. For example, the first grating part 33 is connected to the light incident surface 345 of the second grating part 34. A surface, connected to the light incident surface 345 of the second grating part 34, of the first grating part 33 is a light emergent surface of the first grating part 33 (which coincides with the light incident surface 345 of the second grating part 34 and is not marked in the figure). The third grating part 35 is connected to the light emergent surface 346 of the second grating part 34. A surface, connected to the light emergent surface 346 of the second grating part 34, of the third grating part 35 is a light incident surface of the third grating part 35 (which coincides with the light emergent surface 346 of the second grating part 34 and is not marked in the figure). In another embodiment, the first grating part 33 and the second grating part 34 may alternatively be disposed at an interval. In this case, the light emergent surface of the first grating part 33 faces the light incident surface 345 of the second grating part 34, and a spacing is formed between the light incident surface 345 and the light emergent surface. Alternatively, the third grating part 35 and the second grating part 34 may be disposed at an interval. In this case, the light incident surface of the third grating part 35 faces the light emergent surface 346 of the second grating part 34, and a spacing is formed between the light incident surface and the light emergent surface 346.

A light incident surface 332 of the first grating part 33 backs on the cover plate 1. A light emergent surface 352 of the third grating part 35 faces the cover plate 1. An area of the light emergent surface 352 of the third grating part 35 is greater than an area of the light incident surface 332 of the first grating part 33. In this application, parameters of gratings and substrates of the first grating part 33, the second grating part 34, and the third grating part 35 are designed such that the first grating part 33, the second grating part 34, and the third grating part 35 can satisfy respective required functions. The first grating part 33 may also be referred to as an input coupler (IC). The first grating part 33 is configured to couple the emitted light from the light source into the light guide plate 3 through the light incident surface 332 of the first grating part 33 such that the light entering the light guide plate 3 is transmitted through total internal reflection in the light guide plate 3, and enters the second grating part 34 through the light incident surface 345 of the second grating part 34. A quantity and positions of light-emitting units 7 of the light source are set based on requirements of the first grating parts 33 of all the grating groups 30. A light-emitting unit 7 is disposed under a light incident surface 332 of each first grating part 33, to provide emitted light. When there is one grating group 30, there is one light-emitting unit 7. When there are at least two grating groups 30, there is at least one light-emitting unit 7. For example, when light incident surfaces 332 of at least two first grating parts 33 are combined, all the first grating parts 33 that are combined together may share a same light-emitting unit 7, or each first grating part 33 may correspond to one light-emitting unit 7. The second grating part 34 may also be referred to as an exit pupil expander (EPE), or may be referred to as a two-dimensional grating expansion region. The second grating part 34 is configured to enable total internal reflection of a part of light entering the second grating part 34 to continue to occur in the second grating part 34, and enable the part of light entering the second grating part 34 to be emitted through the light emergent surface 346 of the second grating part 34 to the third grating part 35 after the part of light entering the second grating part 34 is diffracted. The third grating part 35 may also be referred to as an output coupler (OC). The third grating part 35 is configured to enable total internal reflection of a part of light entering the third grating part 35 to continue to occur in the third grating part 35, and enable the part of light entering the third grating part 35 to be emitted through the light emergent surface 352 of the third grating part 35 after the part of light entering the third grating part 35 is diffracted.

Details are as follows.

As shown in FIG. 5 and FIG. 6, the light source is configured to emit emitted light L1. The first grating part 33 is configured to receive the emitted light L1 through the light incident surface 332 of the first grating part 33, diffract the emitted light L1 to form first light L2, and enable the first light L2 to enter the second grating part 34. In this embodiment, a size of the first grating part 33 is designed such that a part of the first light L2 can directly enter the second grating part 34, and a part of the first light L2 can enter the second grating part 34 after total internal reflection of the part of the first light L2 occurs in the first grating part 33. That is, when the emitted light L1 is diffracted in the first grating part 33 to form the first light L2 and the first light L2 is reflected back, a part of the first light L2 directly enters the second grating part 34 through the light incident surface 345 of the second grating part 34, and a part of the first light L2 enters the second grating part 34 through the light incident surface 345 of the second grating part 34 after total internal reflection of the part of the first light L2 occurs in the first grating part 33 and a transmission direction of the part of the first light L2 is changed. In this embodiment, a diffraction angle of the first light L2 may be greater than or equal to the critical angle between the light guide plate 3 and the first bonding layer 2, and greater than or equal to the critical angle between the light guide plate 3 and the second bonding layer 4 such that total internal reflection of the first light L2 can occur in the light guide plate 3. In this way, utilization of the emitted light L1 is improved.

It should be noted that, in this application, names of various light (for example, second light and fourth light) all are light type names, and do not represent a name of a light beam shown in the figure. In addition, the light beam shown in FIG. 5 is merely an example, and does not represent actual light beam composition. In practice, various light beams all may include one or more light beams. A width of each light beam is not limited, and whether widths of the light beams are equal is not limited.

As shown in FIG. 5 to FIG. 7, the second grating part 34 is configured to form second light L3 based on the first light L2, and form, based on L3, third light L4 entering the third grating part. Further, the second light L3 is propagated in the second grating part 34 through total internal reflection, that is, the light may continue to be transmitted in a direction away from the light incident surface 345 of the second grating part 34. During specific implementation, for example, the grating and the substrate of the second grating part described in this application may cooperate with each other such that both the grating and a bottom surface of the substrate have a total internal reflection capability. In this way, the second light L3 is propagated between the grating and the substrate through total internal reflection. It should be noted that, in this application, total internal reflection in the grating may also be understood as level-0 diffraction. In addition, the second light L3 is diffracted by the second grating part (which may be further diffracted by the grating of the second grating part described below), to generate third light L4 entering the third grating part 35.

For example, in this embodiment of this application, light (for example, the first light L2) emitted to the grating of the second grating part 34 is diffracted to form two light beams, where one of the light beams (for example, the second light L3) continues to be transmitted in the second grating part 34 through total internal reflection (for example, propagated between the grating and the bottom surface of the substrate), and the other light beam (for example, the third light L4) enters the third grating part 35. When being emitted to the grating of the second grating part 34 again, the totally reflected light (for example, the second light L3) is still diffracted by the grating of the second grating part 34 to form two new light beams, where one of the light beams continues to be transmitted in the second grating part 34 through total internal reflection, and the other light beam enters the third grating part 35. A part of the light entering the second grating part 34 is always totally reflected and transmitted in a direction away from the light incident surface 345 of the second grating part 34, and the grating of the second grating part 34 can receive the light in each position and form diffracted light emitted to the third grating part 35. Therefore, the entire light emergent surface 346 of the second grating part 34 can emit light.

As shown in FIG. 5 and FIG. 8, the third grating part 35 is configured to form fourth light L5 based on the third light L4, and form emergent light L6 based on L5. Further, the fourth light L5 is propagated in the third grating part 35 through total internal reflection, that is, the light may continue to be transmitted in a direction away from the light emergent surface 346 of the second grating part 34 (that is, a direction shown by an arrow of L5 in FIG. 5). During specific implementation, for example, the grating and the substrate of the third grating part described in this application may cooperate with each other such that both the grating and the substrate have a total internal reflection capability. In this way, the fourth light L5 is propagated between the grating and the substrate through total internal reflection. It should be noted that, in this application, total internal reflection of the grating may also be understood as level-0 diffraction. The third grating part 35 is further configured to enable the emergent light L6 to be emitted through the light emergent surface 352 of the third grating part 35 and then enter the cover plate 1. The emergent light L6 can enter the cover plate 1 through the first bonding layer 2.

For example, in this embodiment of this application, light (for example, the third light L4) emitted to the grating of the third grating part 35 is diffracted to form two light beams, where one of the light beams (for example, the fourth light L5) continues to be transmitted in the third grating part 35 through total internal reflection (for example, propagated between the grating and the bottom surface of the substrate), and the other light beam (for example, the emergent light L6) is emitted from the light emergent surface 352 of the third grating part 35. When being emitted to the grating of the third grating part 35 again, the totally reflected light (for example, the fourth light L5) is still diffracted by the grating of the third grating part 35 to form two new light beams, where one of the light beams continues to be transmitted in the third grating part 35 through total internal reflection, and the other light beam enters the light emergent surface 352 of the third grating part 35. A part of the light entering the third grating part 35 is always totally reflected and transmitted in a direction away from the light emergent surface 346 of the second grating part 34, and the entire light emergent surface 346 of the second grating part 34 can emit light. Therefore, the grating of the third grating part 35 can receive the light in each position and form diffracted light emitted from the third grating part 35. In this case, the entire light emergent surface 352 of the third grating part 35 can emit light. A diffraction angle of the emergent light L6 is less than the critical angle between the light guide plate 3 and the first bonding layer 2 such that the emergent light L6 can be emitted from the light guide plate 3 through the light emergent surface 352 of the third grating part 35.

As shown in FIG. 3, FIG. 5, and FIG. 8, the image sensor 6 is configured to receive reflected light L7 passing through the light guide plate 3, to form image data of the to-be-detected pattern. The reflected light L7 is light formed by totally reflecting the emergent light L6 by a region that is not in contact with the to-be-detected pattern and that is on a top surface 11, away from the light guide plate 3, of the cover plate 1. In this embodiment, an incidence angle of the emergent light L6 on the top surface 11 of the cover plate 1 is greater than or equal to the critical angle between the cover plate 1 and the external air, and total internal reflection of the emergent light L6 occurs on the top surface 11 of the cover plate 1. When a grating surface of the grating of the third grating part 35 is parallel to the top surface 11 of the cover plate 1, a diffraction angle of the emergent light L6 is greater than or equal to the critical angle between the cover plate 1 and the external air. In this case, the incidence angle of the emergent light L6 on the top surface 11 of the cover plate 1 is also greater than or equal to the critical angle between the cover plate 1 and the external air.

The reflected light L7 entering the image sensor 6 sequentially passes through the cover plate 1, the first bonding layer 2, the light guide plate 3, the second bonding layer 4, and the display panel 5. The image sensor 6 forms a corresponding electrical signal based on the reflected light L7 sensed by the image sensor 6. To ensure that the reflected light L7 smoothly enters the image sensor 6, no air layer is reserved between the image sensor 6 and the display panel 5.

In this embodiment, an optical path transmission structure in which a plurality of gratings are cascaded is formed using the first grating part 33, the second grating part 34, and the third grating part 35 of the light guide plate 3 such that light of the light source can be transmitted from the light incident surface 332 of the first grating part 33 to the light emergent surface 352 of the third grating part 35. Because the area of the light emergent surface 352 of the third grating part 35 is greater than the area of the light incident surface 332 of the first grating part 33, the light guide plate 3 can expand a coverage area of a single light-emitting unit 7 of the light source from a small area to a large area. In this way, it is helpful for the electronic device 100 to minimize a quantity of light-emitting units 7 of the light source while implementing full-screen detection. Compared with a conventional solution in which a surface light source is added under the image sensor 6 to provide detection light, the electronic device 100 in this embodiment reduces a size of the entire screen assembly 10 in a thickness direction. In this way, it is avoided that a size of the entire electronic device 100 increases because of a great increase in thickness of the screen assembly of the electronic device 100.

The emitted light L1 is adjusted to a collimated light beam by the collimation lens 72, an optical path along which the emitted light L1 enters the light guide plate 3 is guided and restricted by the gratings of the light guide plate, the emergent light L6 and the reflected light L7 are also limited to collimated light beams, and the light guide plate 3 can provide the collimated light beam through the entire light emergent surface 352 of the third grating part 35. Therefore, an optical image formed by the reflected light L7 entering the image sensor 6 directly corresponds to a to-be-detected pattern (such as a fingerprint or a palm print), and there is no need to provide an additional imaging optical path in the electronic device 100. In this way, a detection structure of the electronic device 100 is simplified, and utilization of light energy is improved.

This embodiment of this application is described using an example in which "both the top surface 31 and the bottom surface 32 of the light guide plate 3 are approximately parallel to the cover plate 1". A top surface of each grating part (for example, the first grating part 33, the second grating part 34, or the third grating part 35) of the light guide plate 3 is a part of the top surface 31 of the light guide plate 3, and a bottom surface of each grating group 30 is a part of the bottom surface 32 of the light guide plate 3. In another embodiment, the top surface 31 of the light guide plate 3 and the bottom surface 32 of the light guide plate 3 may alternatively be relatively inclined, that is, an included angle can be formed between the top surface 31 of the light guide plate 3 and the bottom surface 32 of the light guide plate 3.

Optionally, as shown in FIG. 4, the light guide plate 3 may further include a connection part 36. The connection part 36 is connected to the first grating part 33 and the third grating part 35. The connection part 36, the first grating part 33, the second grating part 34, and the third grating part 35 jointly form a regular cuboid.

Referring to FIG. 4 to FIG. 6, the first grating part 33 includes a first grating 331 and a first substrate 334. The first grating 331 is stacked on a side, close to the cover plate 1, of the first substrate 334. The first grating 331 is located on an upper side of the first substrate 334. A part of the light guide plate 3 corresponding to a region in which the first grating 331 is located is the first grating part 33. The first grating 331 is configured to diffract the emitted light to form the first light. The first substrate 334 is configured to transmit the first light. It may be understood that the first substrate 334 may be further configured to transmit other light entering the first substrate 334. A grating surface of the first grating 331 is a top surface 333 of the first grating part 33. The top surface 333 of the first grating part 33 is a part of the top surface 31 of the light guide plate 3. The top surface 333 of the first grating part 33 and the light incident surface 332 of the first grating part 33 are disposed opposite to each other. The light emergent surface of the first grating part 33 is located between the light incident surface 331 and the top surface 333 of the first grating part 33. The first grating 331 may be processed and formed in a manner such as nanoimprinting, a holographic technology, or laser direct writing.

There is a plurality of implementations for composition of the first grating 331.

In an implementation, a plurality of grating grooves of the first grating 331 are obtained through machining on the substrate of the light guide plate 3, to form a plurality of grating teeth of the first grating 331. The grating teeth and the grating grooves of the first grating 331 are disposed alternately at a same layer. The first substrate 334 is a substrate of a part, stacked with the first grating 331, of the light guide plate 3. The grating groove of the first grating 331 is filled with air. When the top surface 31 of the light guide plate 3 is connected to the cover plate 1 using the first bonding layer 2, a part of the first bonding layer 2 is filled in the plurality of grating grooves of the first gratings 331. In this case, a machining manner of the first grating 331 is comparatively simple, and helps reduce machining costs of the light guide plate 3.

In another implementation, a plurality of grating grooves of the first grating 331 are obtained through machining on the substrate of the light guide plate 3, to form a plurality of grating teeth of the first grating 331. In addition, a translucent material is filled in the grating grooves of the first grating 331. A refractive index of the translucent material is lower than a refractive index of the substrate of the light guide plate 3. This embodiment of this application is described using this case as an example. In this case, a surface, facing the cover plate 1, of the first grating 331 is a plane. This helps reduce a difficulty in attaching the cover plate 1 to the first grating part 33, to improve assembly precision of the screen assembly 10.

In another embodiment, the first grating 331 may alternatively be located in the middle of the light guide plate 3.

Referring to FIG. 4 to FIG. 6, and FIG. 8, optionally, the second grating part 34 includes a second grating 341 and a second substrate 344. The second grating 341 is stacked on a side, close to the cover plate 1, of the second substrate 344. The second grating 341 is located on an upper side of the second substrate 344. A part of the light guide plate 3 corresponding to a region in which the second grating 341 is located is the second grating part 34. The second grating 341 is configured to diffract the first light to form the second light and the third light. The second substrate 344 is configured to transmit the second light. It may be understood that the second substrate 344 may be further configured to transmit other light entering the second substrate 344. A grating surface of the second grating 341 is a top surface 343 of the second grating part 34. The top surface 343 of the second grating part 34 is a part of the top surface 31 of the light guide plate 3. The second grating part 34 further includes a bottom surface 342 disposed opposite to the top surface 343. Both the light incident surface 345 of the second grating part 34 and the light emergent surface 346 of the second grating part 34 are located between the top surface 343 and the bottom surface 342. For a forming manner and composition of the second grating 341, refer to a forming manner and composition of the first grating 331. In another embodiment, the second grating 341 may alternatively be stacked on a side, away from the cover plate 1, of the second grating part 34.

Optionally, the third grating part 35 includes a third grating 351 and a third substrate 354. The third grating 351 is stacked on a side, close to the cover plate 1, of the third substrate 354. The third grating 351 is located on an upper side of the third substrate 354. A part of the light guide plate 3 corresponding to a region in which the third grating 351 is located is the third grating part 35. The third grating 351 is configured to diffract the third light to form the fourth light and the emergent light. The third substrate 354 is configured to transmit the fourth light. It may be understood that the third substrate 354 is further configured to transmit other light entering the third substrate 354. A grating surface of the third grating 351 is a top surface of the third grating part 35, that is, the light emergent surface 352 of the third grating part 35. The third grating part 35 further includes a bottom surface 353 disposed opposite to the light emergent surface 352 of the third grating part 35. A light incident surface of the third grating part is located between the light emergent surface 352 and the bottom surface 353 of the third grating part 35. For a forming manner and composition of the third grating 351, refer to a forming manner and composition of the first grating 331. In another embodiment, the third grating 351 may alternatively be located on a side, away from the cover plate 1, of the third grating part 35.

Optionally, referring to FIG. 2 and FIG. 3 together, the substrate of the light guide plate 3 may be made of optical plastic, for example, PC, polymethyl methacrylate (PMMA), or polydimethylsilane (PDMS), or a glass material. This embodiment of this application is described using an example in which "the light guide plate 3 is made of a polycarbonate material, and a refractive index of the light guide plate 3 is 1.57". In this case, a machining difficulty of the light guide plate 3 is small, and an angle at which light is propagated in the light guide plate 3 is easier to implement.

Optionally, the first bonding layer 2 may be made of an optically clear adhesive (OCA) material. The second bonding layer 4 may be made of an OCA material. The refractive index of the first bonding layer 2 may be the same as or different from the refractive index of the second bonding layer 4. An optically clear adhesive with a refractive index ranging from 1.3 to 1.51 may be selected for the first bonding layer 2. An optically clear adhesive with a refractive index ranging from 1.3 to 1.51 may be selected for the second bonding layer 4. In another embodiment, another material with a refractive index less than that of the light guide plate may be selected for the first bonding layer 2 and the second bonding layer 4.

This embodiment of this application is described using an example in which "the refractive index of the first bonding layer 2 is the same as the refractive index of the second bonding layer 4, and both the refractive indexes are 1.3". In this case, the critical angle between the light guide plate 3 and the first bonding layer 2 is approximately 55°, and the critical angle between the light guide plate 3 and the second bonding layer 4 is approximately 55°. In this way, when an incidence angle (for example, 75°) at which light transmitted in the light guide plate 3 is emitted to the top surface 31 of the light guide plate 3 is greater than or equal to 55°, total internal reflection can occur on the top surface 31 of the light guide plate 3, and when an incidence angle (for example, 75) at which the light transmitted in the light guide plate 3 is emitted to the bottom surface 32 of the light guide plate 3 is greater than or equal to 55°, total internal reflection can occur on the bottom surface 32 of the light guide plate 3.

Figure 9:
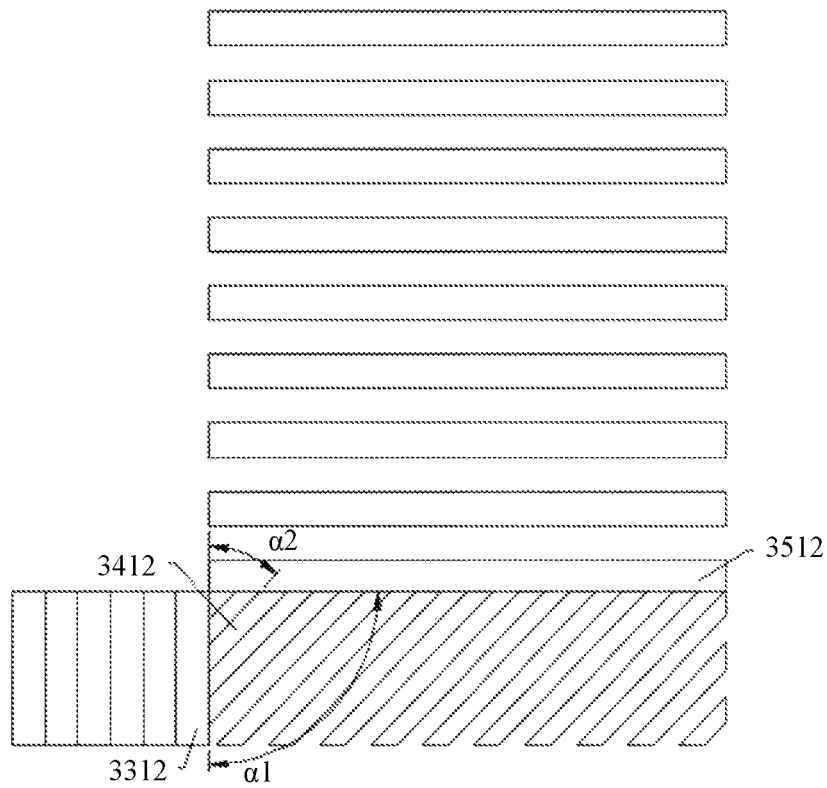
FIG. 9 is a schematic diagram of projections of grating serrated surfaces of a plurality of gratings of the light guide plate shown in FIG. 4 onto a cover plate.

Referring to FIG. 4 and FIG. 9, FIG. 9 is a schematic diagram of a projection, onto the cover plate 1, of grating serrated surfaces of the plurality of gratings of the light guide plate 3 shown in FIG. 4. FIG. 9 shows a projection 3312 of a grating serrated surface 3311 of the first grating 331 onto the cover plate 1, a projection 3412 of a grating serrated surface 3411 of the second grating 341 onto the cover plate 1, and a projection 3512 of a grating serrated surface 3511 of the third grating 351 onto the cover plate 1.

There is a plurality of grating serrated surfaces 3311 of the first grating 331, there are a plurality of projections 3312 accordingly, and the plurality of projections 3312 are parallel to each other. There is a plurality of grating serrated surfaces 3411 of the second grating 341, there are a plurality of projections 3412 accordingly, and the plurality of projections 3412 are parallel to each other. There is a plurality of grating serrated surfaces 3511 of the third grating 351, there are a plurality of projections 3512 accordingly, and the plurality of projections 3512 are parallel to each other.

A first included angle α1 is formed between the projection 3512 of the grating serrated surface 3511 of the third grating 351 onto the cover plate 1 and the projection 3312 of the grating serrated surface 3311 of the first grating 331 onto the cover plate 1. A second included angle α2 is formed between the projection 3412 of the grating serrated surface 3411 of the second grating 341 onto the cover plate 1 and the projection 3312 of the grating serrated surface 3311 of the first grating 331 onto the cover plate 1. The second included angle α2 is equal to a half of the first included angle α1.

In this embodiment, a relative position relationship between the grating serrated surface 3311 of the first grating 331, the grating serrated surface 3411 of the second grating 341, and the grating serrated surface 3511 of the third grating 351 is set such that the second grating 341 can diffract the first light L2 from the first grating part 33 to form the third light L4, and enable the third light L4 to enter the third grating part 35.

For example, the first included angle α1 is 90°, that is, the projection 3512 of the grating serrated surface 3511 of the third grating 351 onto the cover plate 1 is perpendicular to the projection 3312 of the grating serrated surface 3311 of the first grating 331 onto the cover plate 1. The second included angle α2 is 45°. The second grating 341 can enable light entering the second grating part 34 through the first grating part 33 to rotate by 90° and then enter the third grating part 35.

Figure 10:
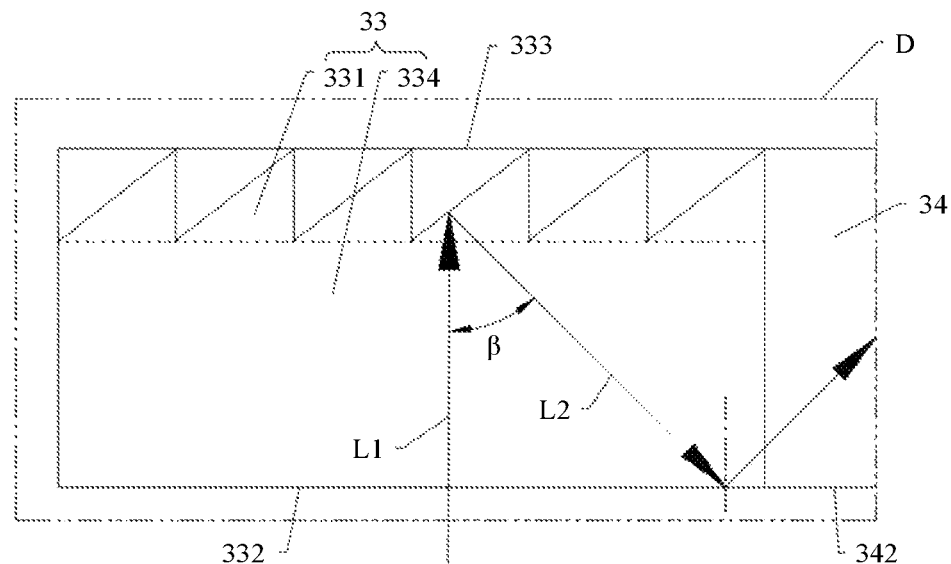
FIG. 10 is a schematic diagram of an optical path of a structure in FIG. 6 in a position D.

Reference is made to FIG. 6 and FIG. 10. FIG. 10 is a schematic diagram of an optical path of a structure in a position D in FIG. 6. In FIG. 10, a cross-section line of the structure is omitted to show the diagram of the optical path more clearly.

The emitted light L1 can be perpendicularly incident to the first grating 331. For example, an optical axis of the collimation lens 72 (referring to FIG. 3) may be perpendicular to the grating surface (the top surface 333 of the first grating part 33 in this embodiment) of the first grating 331 such that the emitted light L1 is perpendicularly incident to the first grating 331. A grating surface of the first grating 331 is parallel to the cover plate 1. The emitted light L1 is perpendicularly incident to the first grating 331, that is, the emitted light L1 is perpendicularly incident to the grating surface of the first grating 331. In this embodiment, the emitted light L1 is perpendicularly incident to the first grating 331, and therefore, the emitted light L1 is perpendicularly incident to the light guide plate 3. The first light L2 is level-1 diffracted light formed by diffracting the emitted light L1 by the first grating 331.

A wavelength of the emitted light L1 is λ, a diffraction angle of the first light L2 is β, a refractive index of the substrate of the light guide plate 3 is n, and a period d of the first grating 331 satisfies formula (1):

$$d = \frac{\lambda}{n \times \sin\beta}. \quad (1)$$

In this embodiment, an incidence angle of the emitted light L1 is 0°. The first grating 331 satisfies a grating equation d'×(sin 0°+sin α)=mλ, m=1, and d'=d×n. In this case, the first grating 331 can accurately diffract the emitted light L1, to form the first light L2 that meets a requirement in order to ensure accuracy of the optical path in the light guide plate 3.

In this embodiment, the incidence angle at which the first light L2 is emitted to the light incident surface 332 of the first grating part 33 needs to be greater than or equal to the critical angle between the light guide plate 3 and the second bonding layer 4 such that total internal reflection of the first light L2 occurs on the bottom surface of the first grating part 33 (that is, the light incident surface 332 of the first grating part 33). Because the light incident surface 332 of the first grating part 33 is parallel to the top surface 333 of the first grating part 33, that is, parallel to the grating surface of the first grating 331, the diffraction angle of the first light L2 is equal to the incidence angle of the first light L2 on the light incident surface 332 of the first grating part 33. In this case, the diffraction angle of the first light L2 is greater than or equal to the critical angle between the light guide plate 3 and the second bonding layer 4. This embodiment is described using an example in which "the incidence angle of the first light L2 on the bottom surface of the first grating part 33 is 75° (that is, β=75°), the wavelength of the emitted light L1 meets λ=850 nm, and the refractive index of the substrate of the light guide plate 3 meets n=1.57". It may be learned from formula (1) that d=850 nm/sin 75°/1.57=560.5 nm. Similarly, when the diffraction angle of the first light L2 is greater than or equal to the critical angle between the light guide plate 3 and the second bonding layer 4, the first light L2 may alternatively directly enter the second grating part 34, and then total internal reflection of the first light L2 occurs on the bottom surface 342 of the second grating part 34.

The first grating 331 is a blazed grating or a multi-level phase grating (or a binary optical device). In this case, the first grating 331 can transfer most energy of the emitted light L1 to level-1 diffracted light, improving light energy utilization efficiency. This embodiment is described using an example in which "the first grating 331 is a blazed grating". The grating serrated surface 3311 of the first grating 331 is inclined relative to the grating surface of the first grating 331, and a blazed angle is formed between the grating serrated surface 3311 and the grating surface of the first grating 331.

When the emitted light L1 is perpendicularly incident to the grating surface of the first grating 331, the first grating 331 diffracts the emitted light L1 to form the first light L2, where a diffraction angle of the first light L2 is twice the blazed angle. In this embodiment, when the diffraction angle of the first light L2 is 75°, the blazed angle is 37.5°.

The grating surface of the first grating 331 is covered with a thin metal layer that can reflect light, to further improve light energy utilization efficiency. A material of the thin metal layer may be aluminum, silver, gold, or the like. The thin metal layer may be machined and formed through sputtering, vapor deposition, chemical plating, or the like.

In another embodiment, the first grating 331 may alternatively be a common grating. In this application, the common grating generally refers to a grating structure in which a groove plane of a grating is parallel to a grating plane of the grating. In this embodiment, a parameter of the first grating 331 is set such that the emitted light L1 is diffracted by the first grating 331 to form the first light L2.

Referring to FIG. 5 to FIG. 7, the second light L3 is level-0 diffracted light formed by diffracting the first light L2 by the second grating 341. A diffraction angle of the second light L3 is equal to an incidence angle at which the second light L3 is emitted to the second grating 341. The third light L4 is level-1 diffracted light formed by diffracting the first light L2 by the second grating 341.

With reference to FIG. 9, because the grating serrated surface 3411 of the second grating 341 rotates by a second included angle α2 (for example, 45°) relative to the grating serrated surface 3311 of the first grating 331, the level-1 diffracted light formed after the first light L2 is in contact with the second grating 341 is deflected twice a second included angle α2 (for example, 90°) relative to the grating serrated surface 3311 of the first grating 331. In this case, the third light L4 can enter the third grating part 35.

A wavelength of the emitted light L1 is λ. A diffraction angle of the first light L2 is β. An incidence angle at which the first light L2 is incident to the second grating 341 is equal to the diffraction angle of the first light L2. A refractive index of the substrate of the light guide plate 3 is n. The period d of the first grating 331 satisfies formula (2):

$$d = \frac{\lambda}{\sqrt{2} \times n \times \sin\beta}. \quad (2)$$

In this embodiment, the second grating 341 is located on a side, close to the cover plate 1, of the second grating part 34, the grating surface of the second grating 341 (that is, the top surface 343 of the second grating part 34 in this embodiment) is parallel to the bottom surface of the first grating part 33 (that is, the light incident surface 332 of the first grating part 33), the bottom surface 342 of the second grating part 34 and the light incident surface 332 of the first grating part 33 are coplanar, and the grating surface of the first grating 331 is parallel to the light incident surface 332 of the first grating part 33 A part of the first light L2 enters the second grating 341 after total internal reflection of the part of the first light L2 occurs on the light incident surface 332 of the first grating part 33, and an incidence angle at which the part of first light L2 is incident to the second grating 341 is equal to the diffraction angle of the first light L2. A part of the first light L2 enters the second grating part 34 and enters the second grating 341 after total internal reflection of the part of the first light L2 occurs on the bottom surface 342 of the second grating part 34, and an incidence angle at which the part of the first light L2 is incident to the second grating 341 is also equal to the diffraction angle of the first light L2.

In this embodiment, the second grating 341 that meets the requirement of the foregoing formula can accurately diffract the first light, to form the second light L3 and the third light L4 that meet the requirement. In this way, accuracy of an optical path in the light guide plate 3 is ensured.

As shown in FIG. 7, an optical path difference between the incident light L2 of the second grating 341 is d'×√2× sin β, where d'=d×n. There is no optical path difference between the emergent light L4 (that is, the level-1 diffracted light) of the second grating 341, that is, the optical path difference is zero. The second grating 341 satisfies d'×√2× sin β+0=mλ, where m=1. For example, if λ=850 nm and n=1.57, d=396 nm.

A diffraction angle of the third light L4 is equal to the incidence angle at which the first light L2 is emitted to the second grating 341, that is, is equal to the diffraction angle of the first light L2.

The second grating 341 may be a common grating.

Figure 11:
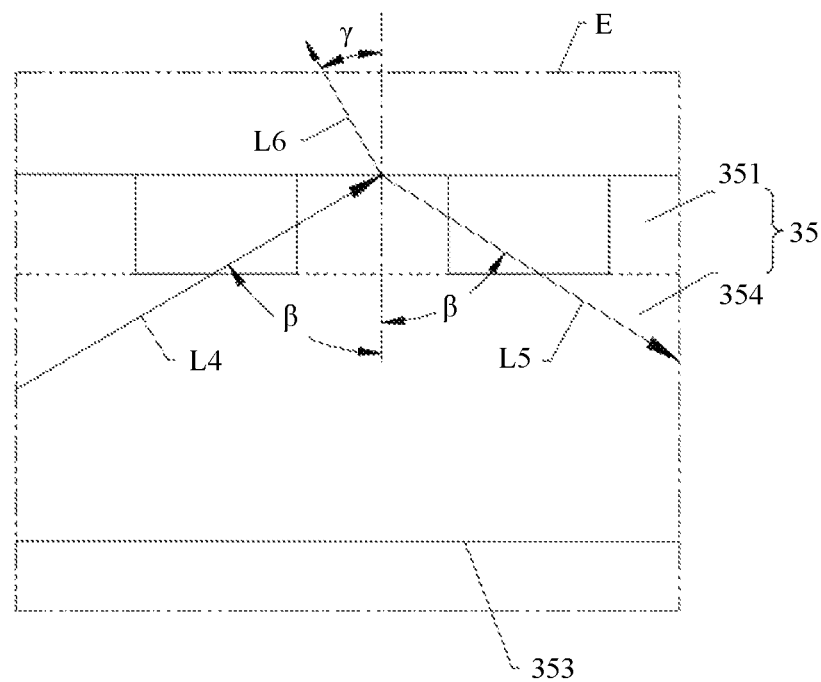
FIG. 11 is a schematic diagram of an optical path of a structure in FIG. 8 in a position E.

Reference is made to FIG. 8 and FIG. 11. FIG. 11 is a schematic diagram of an optical path of a structure in a position E in FIG. 8. In FIG. 11, a cross-section line of the structure is omitted to show the diagram of the optical path more clearly.

The fourth light L5 is level-0 diffracted light formed by diffracting the third light L4 by the third grating 351. A diffraction angle of the fourth light L5 is equal to an incidence angle at which the third light L4 is emitted to the third grating 351. A bottom surface 353 of the third grating part 35 and the bottom surface 342 of the second grating part 34 are coplanar, the grating surface of the second grating 341 (that is, the top surface 343 of the second grating part 34 in this embodiment) is parallel to the bottom surface 342 of the second grating part 34, and total internal reflection of the third light L4 occurs on the bottom surface 353 of the third grating part 35. Therefore, the incidence angle at which the third light L4 is emitted to the third grating 351 is equal to a diffraction angle at which the third light L4 is emitted from the second grating 341, that is, is equal to the diffraction angle of the first light L2. The emergent light L6 is level-1 diffracted light formed by diffracting the third light L4 by the third grating 351.

A wavelength of the emitted light L1 is λ, the diffraction angle of the first light L2 is β, the incidence angle at which the third light L4 is incident to the third grating 351 is equal to the diffraction angle of the first light L2, an emergence angle at which the emergent light L6 is emitted from the third grating 351 is γ, a refractive index of the substrate of the light guide plate 3 is n, and a period d of the first grating 331 satisfies formula (3):

$$d = \frac{\lambda}{n \times (\sin\beta + \sin\gamma)}. \quad (3)$$

In this embodiment, the third grating 351 satisfies a grating equation: d'×(sin β+sin γ)=mλ, m=1, and d'=d×n. In this case, the third grating 351 can accurately diffract the third light L4, to form the fourth light L5 and the emergent light L6 that meet a requirement. In this way, accuracy of an optical path in the light guide plate 3 is ensured.

In another embodiment, the third grating 351 may also satisfy a grating equation d'×(sin β−sin γ)=mλ, where m=1, and d'=d×n.

Optionally, the display panel 5 is a flexible organic light-emitting diode panel. There is no air layer in the display panel 5. An emergence angle at which the emergent light L6 is emitted from the light emergent surface 352 of the third grating part 35 is greater than or equal to a critical angle between the cover plate 1 and the external air such that the reflected light L7 is light formed by totally reflecting the emergent light L6 by a region that is not in contact with the to-be-detected pattern and that is on the top surface 11, away from of the light guide plate 3, of the cover plate 1. In this embodiment, because the third grating 351 is stacked above the third substrate 354, the emergence angle at which the emergent light L6 is emitted from the light emergent surface 352 of the third grating part 35 is the emergence angle at which the emergent light L6 is emitted from the third grating 351, to be specific, γ. An emergence angle of the emergent light L6 is less than the critical angle between the light guide plate 3 and the first bonding layer 2, and is greater than or equal to the critical angle between the cover plate 1 and the external air. The emergent light L6 can be emitted from the cover plate 1 through the light emergent surface 352 of the third grating part 35, and total internal reflection of the emergent light L6 occurs on the top surface 11 of the cover plate 1. In this application, when the cover plate 1 is a cover glass, and a refractive index of the cover plate 1 is 1.5, a third critical angle is equal to 40°. In an embodiment, it is assumed that the emergence angle is equal to 45°, d=850 nm/1.57/(sin 75°+sin 45°)=330 nm may be obtained based on formula (3).

In this embodiment, because the reflected light is light formed by totally reflecting the emergent light L6 on the top surface of the cover plate 1, a loss of the reflected light in a transmission process is small, and light intensity of the reflected light is comparatively high. This helps improve recognition precision of the image sensor 6 such that the electronic device 100 has comparatively high detection accuracy.

Figure 12:
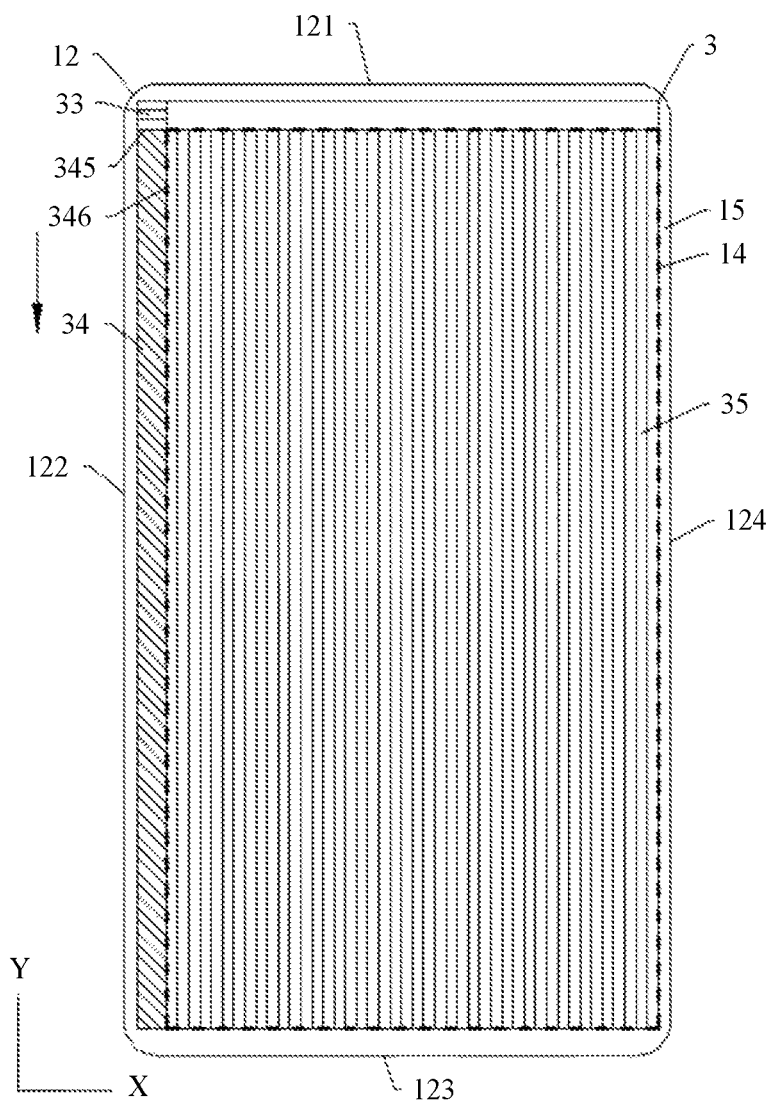
FIG. 12 is a schematic structural diagram of a position relationship between a light guide plate and a bottom surface of a cover plate in FIG. 2 in a first implementation.

Reference is made to FIG. 2, FIG. 4, and FIG. 12, FIG. 12 is a schematic structural diagram of the position relationship between the light guide plate 3 and a bottom surface 12 of the cover plate 1 in FIG. 2 in a first implementation. FIG. 12 is a top view.

The cover plate 1 further includes the bottom surface 12 connected to the first bonding layer 2. The bottom surface 12 of the cover plate 1 is disposed opposite to the top surface 11 of the cover plate 1. The bottom surface 12 of the cover plate 1 includes a first short side 121 and a first long side 122. This implementation is described using an example in which "the bottom surface 12 of the cover plate 1 is rectangular". The first long side 122 is perpendicular to the first short side 121. A length of the first long side 122 is greater than a length of the first short side 121. The first long side 122 extends in a length direction Y of the electronic device 100, and the first short side 121 extends in a width direction X of the electronic device 100. The bottom surface 12 of the cover plate 1 further includes a second short side 123 disposed opposite to the first short side 121 and a second long side 124 disposed opposite to the first long side 122. The second short side 123 is parallel to the first short side 121. The second long side 124 is parallel to the first long side 122. This application is described using an example in which "the first short side 121 is a top side of the bottom surface 12 of the cover plate 1, the second short side 123 is a bottom side of the bottom surface 12 of the cover plate 1, the first long side 122 is a left side of the bottom surface 12 of the cover plate 1, and the second long side 124 is a right side of the bottom surface 12 of the cover plate 1".

When there is one grating group 30, there is one light-emitting unit 7 of the light source. In this implementation, the light guide plate 3 may be of the structure shown in FIG. 4. The light incident surface 345 of the second grating part 34 faces the first grating part 33. The light emergent surface 346 of the second grating part 34 faces the third grating part 35. The light incident surface 345 of the second grating part 34 is parallel to the first short side 121. The light emergent surface 346 of the second grating part 34 is parallel to the first long side 122. In this case, the second grating part 34 is approximately rectangular. A position of each grating part of the light guide plate 3 matches a shape of the bottom surface 12 of the cover plate 1, and the light emergent surface 352 of the third grating part 35 can better correspond to the display region of the cover plate 1 such that the electronic device 100 has a larger recognition region.

The display zone of the display panel 5 forms the display region 14 (a region shown by a bold dashed-line box in FIG. 12) on the bottom surface 12 of the cover plate 1. The bottom surface 12 of the cover plate 1 further includes a black-edge region 15 provided around the display region 14. The display region 14 is used to allow light to pass through in order to display a picture. The black-edge area 15 is used to block light. The display region 14 on the bottom surface 12 is the display region of the cover plate 1. The black-edged region 15 on the bottom surface 12 is the black-edged region of the cover plate 1.

A projection of the third grating part 35 onto the bottom surface 12 of the cover plate 1 falls within the display region 14. For example, a projection of the light emergent surface 352 of the third grating part 35 onto the bottom surface 12 of the cover plate 1 may cover the display region 14 such that the electronic device 100 can implement full-screen detection. Certainly, the projection of the light emergent surface 352 of the third grating part 35 onto the bottom surface 12 of the cover plate 1 may also cover a part of the display region 14 such that the electronic device 100 can implement detection in a specified region on a display interface of the electronic device 100. In another embodiment, the projection of the third grating part 35 onto the bottom surface 12 of the cover plate 1 may alternatively be slightly larger than the display region 14, that is, the projection covers the entire display region 14 and covers a part of an edge region, adjacent to the display region 14, of the black-edge region 15.

A projection of the first grating part 33 onto the bottom surface 12 of the cover plate 1 falls within the black-edge region 15. A projection of the second grating part 34 onto the bottom surface 12 of the cover plate 1 may fall within the black-edge region 15. In another implementation, the projection of the second grating part 34 onto the bottom surface 12 of the cover plate 1 may also fall within the display region 14.

In this implementation, arrangement of each grating part of the grating group 30 of the light guide plate 3 matches a shape of the cover plate 1, and is based on the display region 14 and the black-edge region 15 of the cover plate 1, that is, based on the display zone of the display panel 5. In this way, the light emergent surface 352 of the third grating 35 can better adapt to the display zone of the display panel 5. This helps the electronic device 100 implement full-screen detection.

Optionally, the first grating part 33 may be placed at an upper left corner of the cover plate 1. The second grating part 34 may be placed at a left edge of the cover plate 1. The third grating part 35 is located on the right of the second grating part 34. The first grating part 33 is located between the second grating part 34 and the first short side 121, and the third grating part 35 is located between the second grating part 34 and the second long side 124.

In this implementation, because the light guide plate 3 uses an optical path transmission structure in which the plurality of gratings is cascaded, a coverage area of a single light-emitting unit 7 of the light source is extended to the light emergent surface 352 of the third grating part 35 such that light energy of the light source is fully utilized. In this way, a recognition region corresponding to a single light-emitting unit 7 of the light source is larger, and does not occupy excessive peripheral space of the screen assembly 10. This helps the electronic device 100 implement large-screen detection and obtain a narrow bezel.

In another implementation, the first grating part 33 may alternatively be placed at a lower left corner of the cover plate 1, the second grating part 34 may be placed at a left edge of the cover plate 1, and the third grating part 35 is located on the right of the second grating part 34. Alternatively, the first grating part 33 may be placed at an upper right corner or a lower right corner of the cover plate 1, the second grating part 34 may be placed at a right edge of the cover plate 1, and the third grating part 35 is located on the left of the second grating part 34.

Optionally, diffraction efficiency of the second grating part 34 progressively increases in a direction (as shown by a straight line with an arrow in FIG. 12) parallel to the light emergent surface 346 of the second grating part 34 and away from the light incident surface 345 of the second grating part 34. For example, the second grating part 34 includes a first part and a second part, and the first part is located between the first grating part 33 and the second part, that is, the first part is closer to the first grating part 33 than the second part. In this case, diffraction efficiency of the first part is lower than diffraction efficiency of the second part. In short, the diffraction efficiency of the second grating part 34 progressively increases in a direction away from the first grating part 33.

In an implementation of this application, when a light beam is transmitted in the second grating part 34, each time the light beam is in contact with the second grating 341, a part of light is diffracted by the second grating 341, and a longer distance from the first grating part 33 leads to weaker energy of the light beam. The diffraction efficiency of the second grating part 34 progressively increases in the direction away from the first grating part 33 such that light formed by diffracting the light beam by the second grating 341 can maintain same or similar light intensity. In this way, light emergent intensity of the light emergent surface 352 of the third grating part 35 tends to be consistent.

The second grating 341 may increase the diffraction efficiency by increasing a grating duty ratio (a ratio of a grating tooth width to a grating period) or a grating depth (that is, a grating tooth height). In this implementation, the diffraction efficiency is increased by maintaining the grating depth of the second grating 341 unchanged and increasing the grating duty period. In this way, machining difficulty of the second grating 341 is reduced.

Optionally, diffraction efficiency of the third grating part 35 progressively increases in a direction perpendicular to the light incident surface of the third grating part and far away from the light incident surface of the third grating part. That is, the diffraction efficiency of the third grating part 35 increases in the direction away from the second grating part 34. In this implementation, when a light beam is transmitted in the third grating part 35, each time the light beam is in contact with the third grating 351, a part of light is diffracted by the third grating 351 and then emitted from the third grating part 35, and a longer distance from the second grating part 34 leads to weaker energy of the light beam. The diffraction efficiency of the third grating part 35 progressively increases in the direction away from the second grating part 34 such that light formed by diffracting the light beam by the third grating 351 can maintain same or similar light intensity. In this way, light emergent intensity of the light emergent surface 352 of the third grating part 35 is the same or tends to be consistent.

Figure 13:
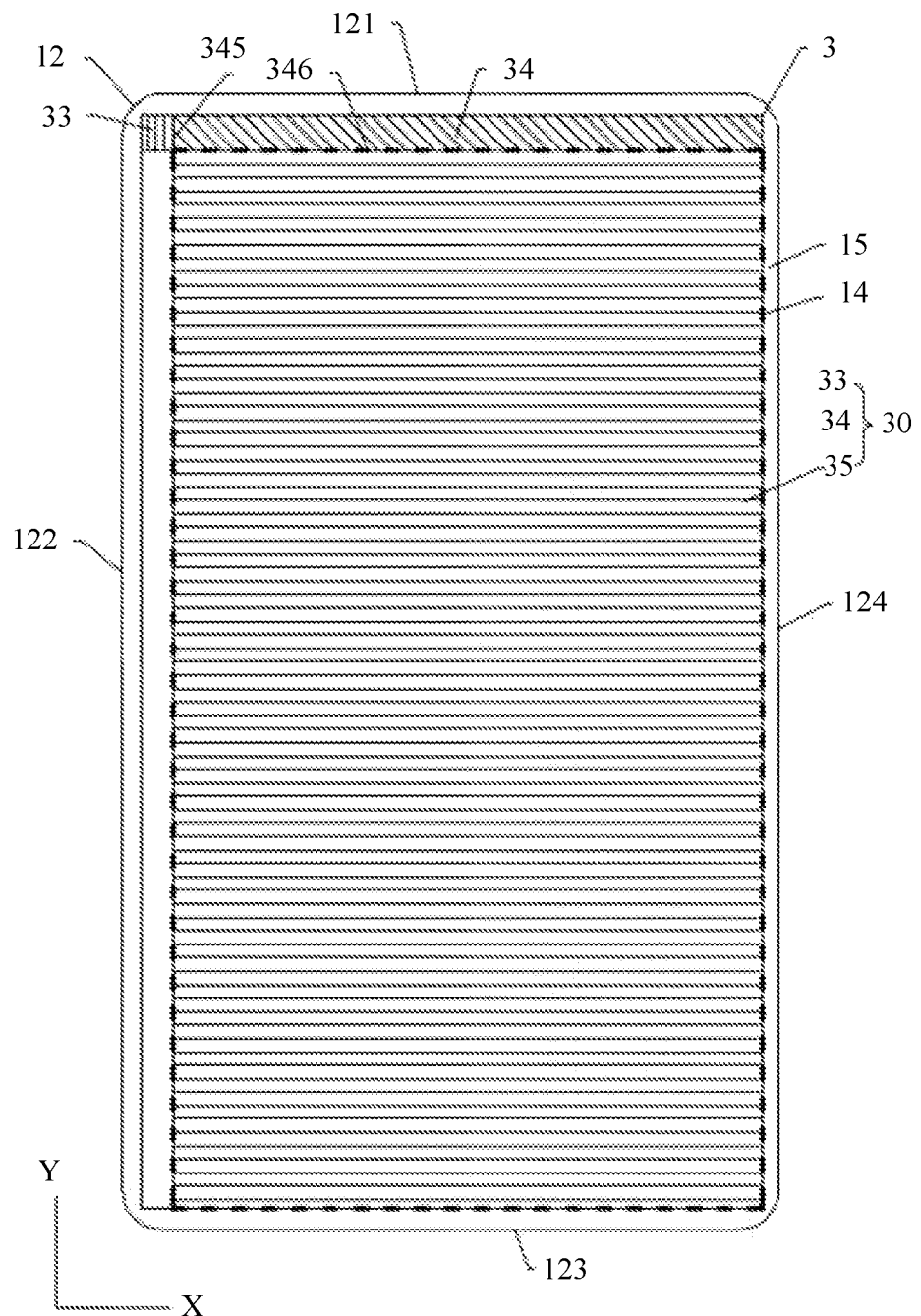
FIG. 13 is a schematic structural diagram of the position relationship between the light guide plate and the bottom surface of the cover plate in FIG. 2 in a second implementation.

Reference is made to FIG. 13. FIG. 13 is a schematic structural diagram of the position relationship between the light guide plate 3 and the bottom surface 12 of the cover plate 1 in FIG. 2 in a second implementation. FIG. 13 is a top view. Most technical content in this implementation that is the same as that in the foregoing implementation is not described again.

The light emergent surface 346 of the second grating part 34 is parallel to the first short side 121. The light incident surface 345 of the second grating part 34 is parallel to the first long side 122. For example, the first grating part 33 may be placed at an upper left corner (or a lower left corner, an upper right corner, or a lower right corner) of the cover plate 1. The second grating part 34 may be placed at a top edge (or a bottom edge) of the cover plate 1. The third grating part 35 is located at the bottom (or on the top) of the second grating part 34. The first grating part 33 is located between the second grating part 34 and the first long side 122 (or the second long side 124), and the third grating part 35 is located between the second grating part 34 and the second short side 123 (or the first short side 121).

Optionally, a projection of the third grating part 35 onto the bottom surface 12 of the cover plate 1 falls within the display region 14. Projections of the second grating part 34 and the first grating part 33 onto the bottom surface 12 of the cover plate 1 fall within the black-edge region 15.

Figure 14:
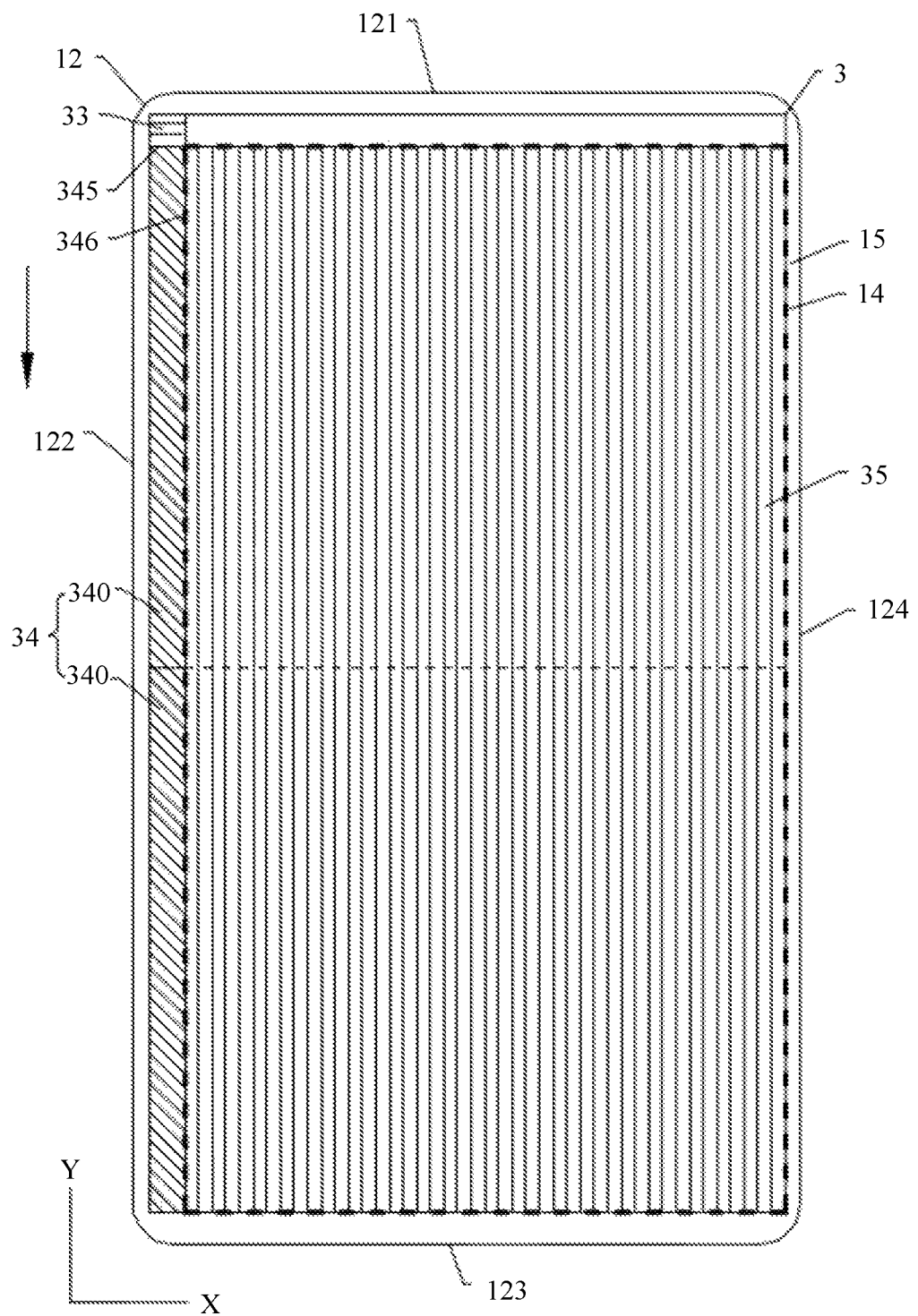
FIG. 14 is a schematic structural diagram of the position relationship between the light guide plate and the bottom surface of the cover plate in FIG. 2 in a third implementation.

Reference is made to FIG. 14. FIG. 14 is a schematic structural diagram of the position relationship between the light guide plate 3 and the bottom surface 12 of the cover plate 1 in FIG. 2 in a third implementation. FIG. 14 is a top view. Most technical content in this implementation that is the same as that in the foregoing implementation is not described again.

The second grating part 34 includes at least two grating regions 340. A direction in which the at least two grating regions 340 are arranged is parallel to the light emergent surface 346 of the second grating part 34. Diffraction efficiency of each grating region 340 progressively increases in a direction (as shown by a straight line with an arrow in FIG. 14) parallel to the light emergent surface 346 of the second grating part 34 and away from the light incident surface 345 of the second grating part 34. That is, the diffraction efficiency of the second grating part 34 cyclically progressively increases a plurality of times in the direction parallel to the light emergent surface 346 of the second grating part 34 and away from the light incident surface 345 of the second grating part 34. For example, the second grating part 34 includes an upper grating region close to the first grating part 33 and a lower grating region located on a side, away from the first grating part 33, of the upper grating region. A duty ratio of the upper grating region progressively increases in a direction parallel to the light emergent surface 346 of the second grating part 34 and away from the light incident surface 345 of the second grating part 34. A duty ratio of the lower grating region progressively increases in the direction parallel to the light emergent surface 346 of the second grating part 34 and away from the light incident surface 345 of the second grating part 34, instead of continuing to increase based on the duty ratio of the upper grating region. In an implementation, diffraction efficiency change rules of different grating regions may be the same.

In this implementation, the second grating part 34 is divided into a plurality of grating regions 340, diffraction efficiency of the grating regions 340 is separately set, and a diffraction efficiency increase amplitude of a single grating region 340 is comparatively small. Therefore, a difficulty, caused by an excessively large progressive increase amplitude of diffraction efficiency (for example, an excessively large duty ratio change range), in machining can be overcome.

The light emergent surface of the third grating part 35 may be roughly divided into at least two light emergent areas. The at least two light emitting regions one-to-one correspond to the at least two grating regions 340. Light intensity of light beams diffracted from a same grating region 340 is the same or similar. Therefore, intensity of light emitted from a same light-emitting region is similar or tends to be consistent.

In this implementation, although diffraction efficiency of each grating region 340 progressively increases in the direction parallel to the light emergent surface 346 of the second grating part 34 and away from the light incident surface 345 of the second grating part 34, intensity of the light beam in the second grating part 34 progressively decreases in the direction parallel to the light emergent surface 346 of the second grating part 34 and away from the light incident surface 345 of the second grating part 34. Therefore, overall intensity of the light of the at least two light-emitting regions progressively decreases in the direction away from the light incident surface 345 of the second grating part 34.

Optionally, a projection of the third grating part 35 onto the bottom surface 12 of the cover plate 1 falls within the display region 14. Projections of the second grating part 34 and the first grating part 33 onto the bottom surface 12 of the cover plate 1 fall within the black-edge region 15.

Figure 15:
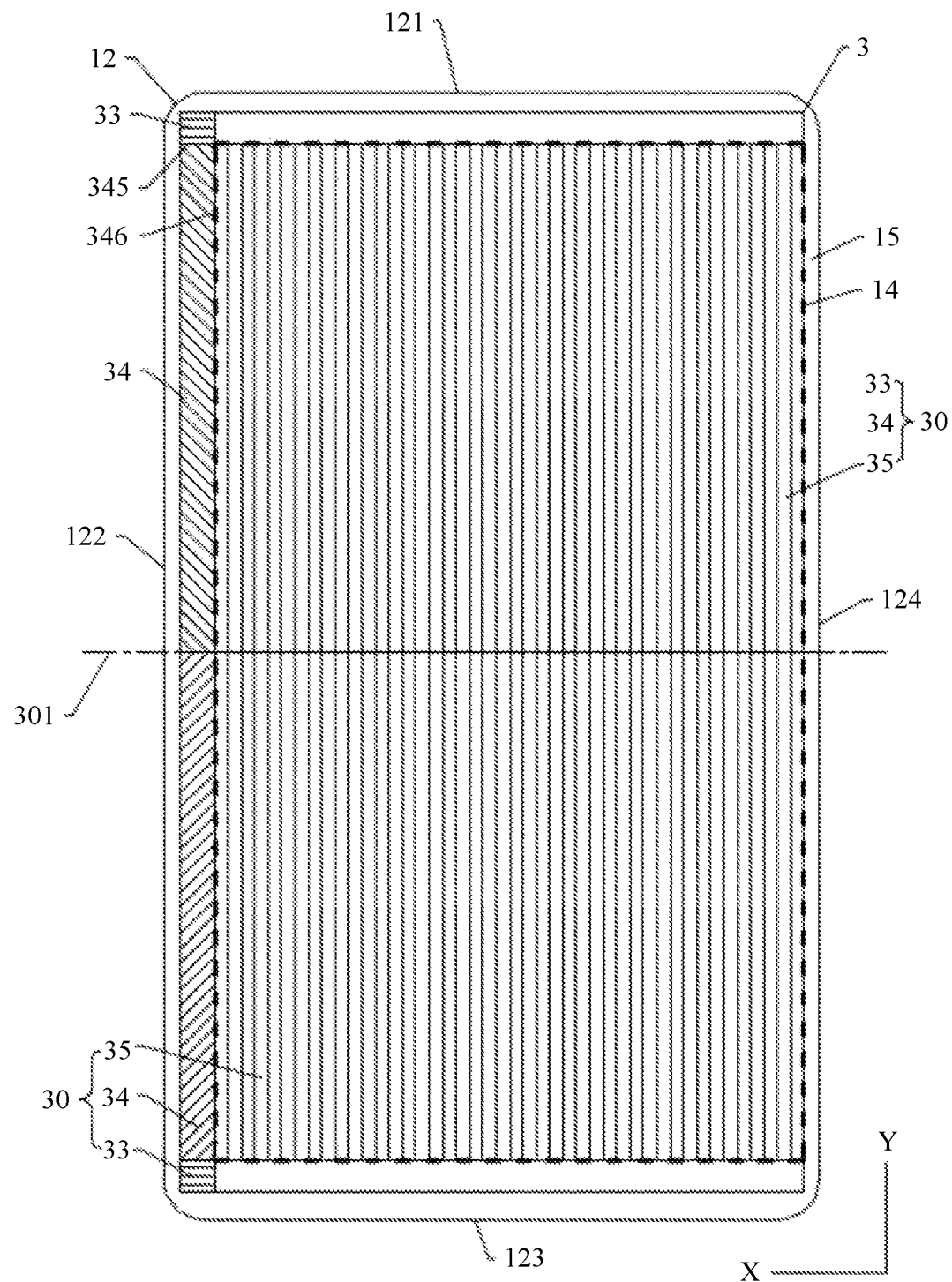
FIG. 15 is a schematic structural diagram of the position relationship between the light guide plate and the bottom surface of the cover plate in FIG. 2 in a fourth implementation.

Reference is made to FIG. 15. FIG. 15 is a schematic structural diagram of the position relationship between the light guide plate 3 and the bottom surface 12 of the cover plate 1 in FIG. 2 in the fourth implementation. FIG. 15 is a top view. Most technical content in this implementation that is the same as that in the foregoing implementation is not described again.

There are two grating groups 30. For structures of the first grating part 33, the second grating part 34, the third grating part 35 of each grating group 30, and a position relationship between the first grating part 33, the second grating part 34, and the third grating part 35 of each grating group 30, refer to the embodiment shown in FIG. 4. In this embodiment, because there are two grating groups 30, the two grating groups 30 may be configured to jointly provide detection light for a detection process of the electronic device 100 such that light intensity of the detection light of the electronic device 100 is more sufficient. In this way, detection precision of the electronic device 100 is improved.

The two grating groups 30 are arranged in an axisymmetric manner. Because the two groups of grating groups 30 are arranged in an axisymmetric manner, and the display zone of the display panel 5 is in a regular shape, light emergent regions corresponding to the two groups of grating groups 30 can better adapt to the display zone of the display panel 5. This helps the electronic device 100 implement full-screen detection or large-area detection. There are also two light-emitting units 7 (referring to FIG. 2) of the light source, and positions of the two light-emitting units 7 change with a position of the first grating part 33. Light emergent surfaces of third grating parts 35 of the two grating groups 30 jointly form a light emergent zone of the light guide plate 3, and a region, facing the light emergent zone, of the cover plate 1 is a detection region.

Optionally, the bottom surface 12, connected to the first bonding layer 2, of the cover plate 1 includes a first short side 121 and a first long side 122. The first long side 122 is perpendicular to the first short side 121. A length of the first long side 122 is greater than a length of the first short side 121. The bottom surface 12 of the cover plate 1 further includes a second short side 123 disposed opposite to the first short side 121 and a second long side 124 disposed opposite to the first long side 122. The second short side 123 is parallel to the first short side 121. The second long side 124 is parallel to the first long side 122. This application is described using an example in which "the first short side 121 is a top side of the bottom surface 12 of the cover plate 1, the second short side 123 is a bottom side of the bottom surface 12 of the cover plate 1, the first long side 122 is a left side of the bottom surface 12 of the cover plate 1, and the second long side 124 is a right side of the bottom surface 12 of the cover plate 1".

The light incident surface 345 of the second grating part 34 faces the first grating part 33. The light emergent surface 346 of the second grating part 34 faces the third grating part 35.

A light incident surface 345 of a second grating part 34 of one of the grating groups 30 is parallel to the first short side 121, and a light emergent surface 346 of the second grating part 34 is parallel to the first long side 122. In this implementation, a symmetry axis 301 of the two grating groups 30 is parallel to the first short side 121. The symmetry axis 301 is approximately located in the middle of the bottom surface 12 of the cover plate 1. A spacing between the symmetry axis 301 and the first short side 121 may be equal to a spacing between the symmetry axis 301 and the second short side 123. The light emergent surfaces 352 of the third grating parts 35 of the two grating groups 30 may be combined to form a complete light emergent zone.

For example, a first grating part 33 of one of the grating groups 30 is placed at an upper left corner (or upper right corner) of the cover plate 1, a second grating part 34 is placed at a left edge (or a right edge) of the cover plate 1, the first grating part 33 is located between the second grating part 34 and the first short side 121, a third grating part 35 is located on the right (or left) of the second grating part 34, and the third grating part 35 is located between the second grating part 34 and the second long side 124 (or the first long side 122).

A first grating part 33 of the other grating group 30 is placed at a lower left corner (or a lower right corner) of the cover plate 1, a second grating part 34 is placed at a left edge (or a right edge) of the cover plate 1. The first grating part 33 is located between the second grating part 34 and the second short side 123, a third grating part 35 is located on the (or left) of the second grating part 34, and the third grating part 35 is located between the second grating part 34 and the second long side 124 (or the first long side 122).

Optionally, a projection of the first grating part 33 of each grating group 30 onto the bottom surface 12 of the cover plate 1 falls within the black-edge region 15. A projection of the third grating part 35 of each grating group 30 onto the bottom surface 12 of the cover plate 1 falls within the display region 14. Projections of the third grating parts 35 of the two grating groups 30 onto the bottom surface 12 of the cover plate 1 may cover the display region 14 after being combined. A projection of the second grating part 34 of each grating group 30 onto the bottom surface 12 of the cover plate 1 may fall within the black-edge region 15. In another implementation, a projection of each of the second grating parts 34 of the two grating groups 30 onto the bottom surface 12 of the cover plate 1 may also fall within the display region 14.

Figure 16:
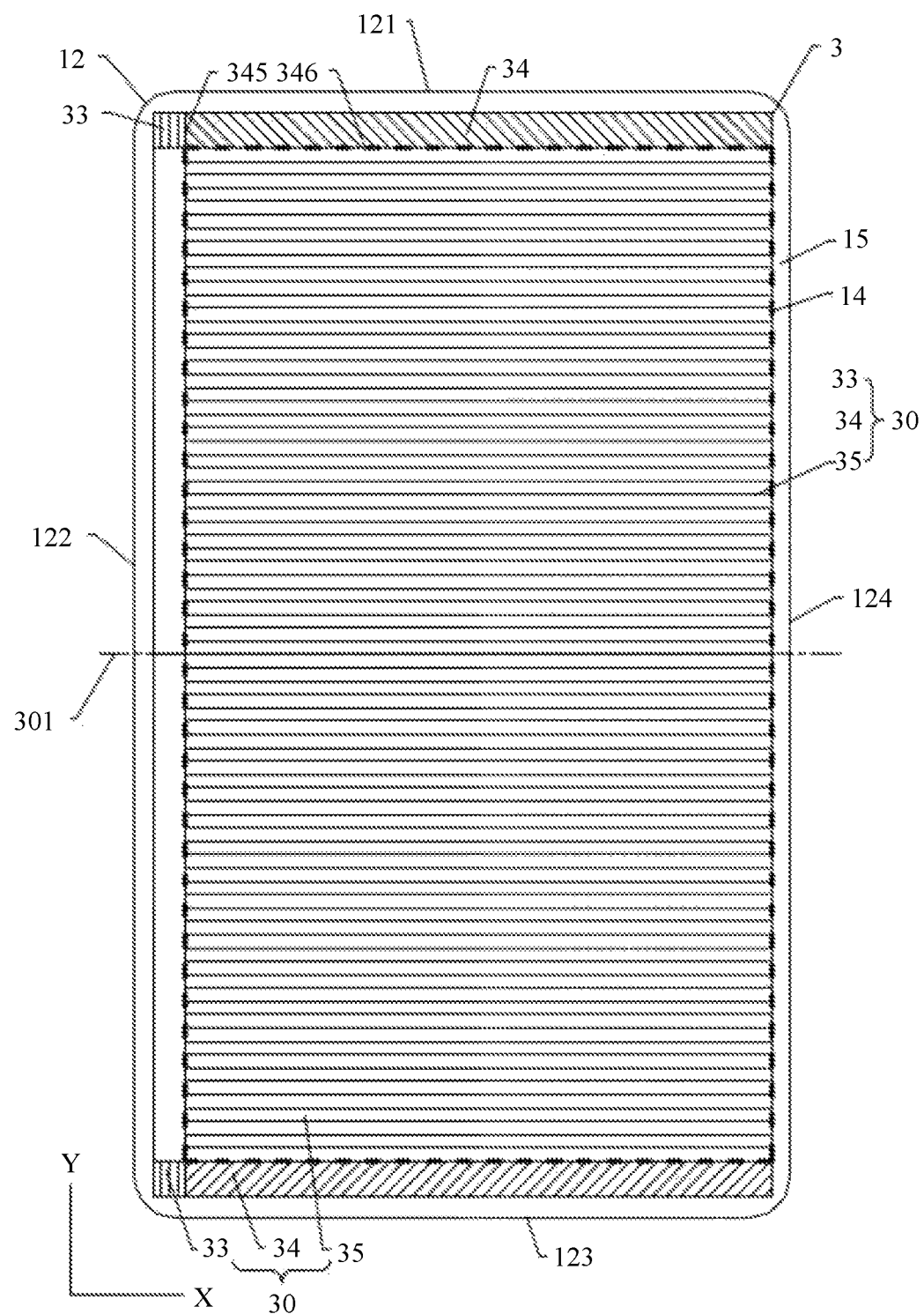
FIG. 16 is a schematic structural diagram of the position relationship between the light guide plate and the bottom surface of the cover plate in FIG. 2 in a fifth implementation.

Reference is made to FIG. 16. FIG. 16 is a schematic structural diagram of the position relationship between the light guide plate 3 and the bottom surface 12 of the cover plate 1 in FIG. 2 in a fifth implementation. FIG. 16 is a top view. Most technical content in this implementation that is the same as that in the foregoing implementation is not described again.

A light incident surface 345 of a second grating part 34 of one of the two axisymmetric grating groups 30 is parallel to the first long side 122, and a light emergent surface 346 of the second grating part 34 of the grating group 30 is parallel to the first short side 121. In this implementation, a symmetry axis 301 of the two grating groups 30 is parallel to the first short side 121. The symmetry axis 301 is approximately located in the middle of the bottom surface 12 of the cover plate 1. A spacing between the symmetry axis 301 and the first short side 121 may be equal to a spacing between the symmetry axis 301 and the second short side 123. Light emergent surfaces 352 of the third grating parts 35 of the two grating groups 30 may be combined to form a complete light emergent zone.

For example, a first grating part 33 of one of the grating groups 30 is placed at an upper left corner (or upper right corner) of the cover plate 1, a second grating part 34 is placed at a top edge of the cover plate 1, the first grating part 33 is located between the second grating part 34 and the first long side 122 (or the second long side 124), a third grating part 35 is located at the bottom of the second grating part 34, and the third grating part 35 is located between the second grating part 34 and the second short side 123.

A first grating part 33 of the other grating group 30 is placed at a lower left corner (or a lower right corner) of the cover plate 1, a second grating part 34 is placed at a bottom edge of the cover plate 1, the first grating part 33 is located between the second grating part 34 and the first long side 122 (or the second long side 124), a third grating part 35 is located on the top of the second grating part 34, and the third grating part 35 is located between the second grating part 34 and the first short side 121.

In another implementation, a first grating part 33 of one of the two axisymmetric grating groups 30 is placed at a right edge (or a left edge) in the middle of the cover plate 1, a second grating part 34 is placed in the middle of the cover plate 1, the first grating part 33 is located between the second grating part 34 and the first long side 122 (or the second long side 124), a third grating part 35 is located on the top of the second grating part 34, and the third grating part 35 is located between the second grating part 34 and the first short side 121.

A first grating part 33 of the other grating group 30 is placed at a right edge (or a left edge) in the middle of the cover plate 1, a second grating part 34 is placed in the middle of the cover plate 1, the first grating part 33 is located between the second grating part 34 and the first long side 122 (or the second long side 124), a third grating part 35 is located at the bottom of the second grating part 34, and the third grating part 35 is located between the second grating part 34 and the second short side 123.

In this implementation, the first grating parts 33 of the two grating groups 30 may be combined together, the two first grating parts 33 may be configured to receive light from a same light-emitting unit 7. In this case, one light-emitting unit 7 may correspond to two grating groups 30, reducing a quantity of light-emitting units 7 of the light source.

Optionally, a projection of the first grating part 33 of each grating group 30 onto the bottom surface 12 of the cover plate 1 falls within the black-edge region 15. A projection of the third grating part 35 of each grating group 30 onto the bottom surface 12 of the cover plate 1 falls within the display region 14. Projections of the third grating parts 35 of the two grating groups 30 onto the bottom surface 12 of the cover plate 1 may cover the display region 14 after being combined. A projection of the second grating part 34 of each grating group 30 onto the bottom surface 12 of the cover plate 1 may fall within the black-edge region 15. In another implementation, projections of the second grating parts 34 of the two grating groups 30 onto the bottom surface 12 of the cover plate 1 may also fall within the display region 14.

Figure 17:
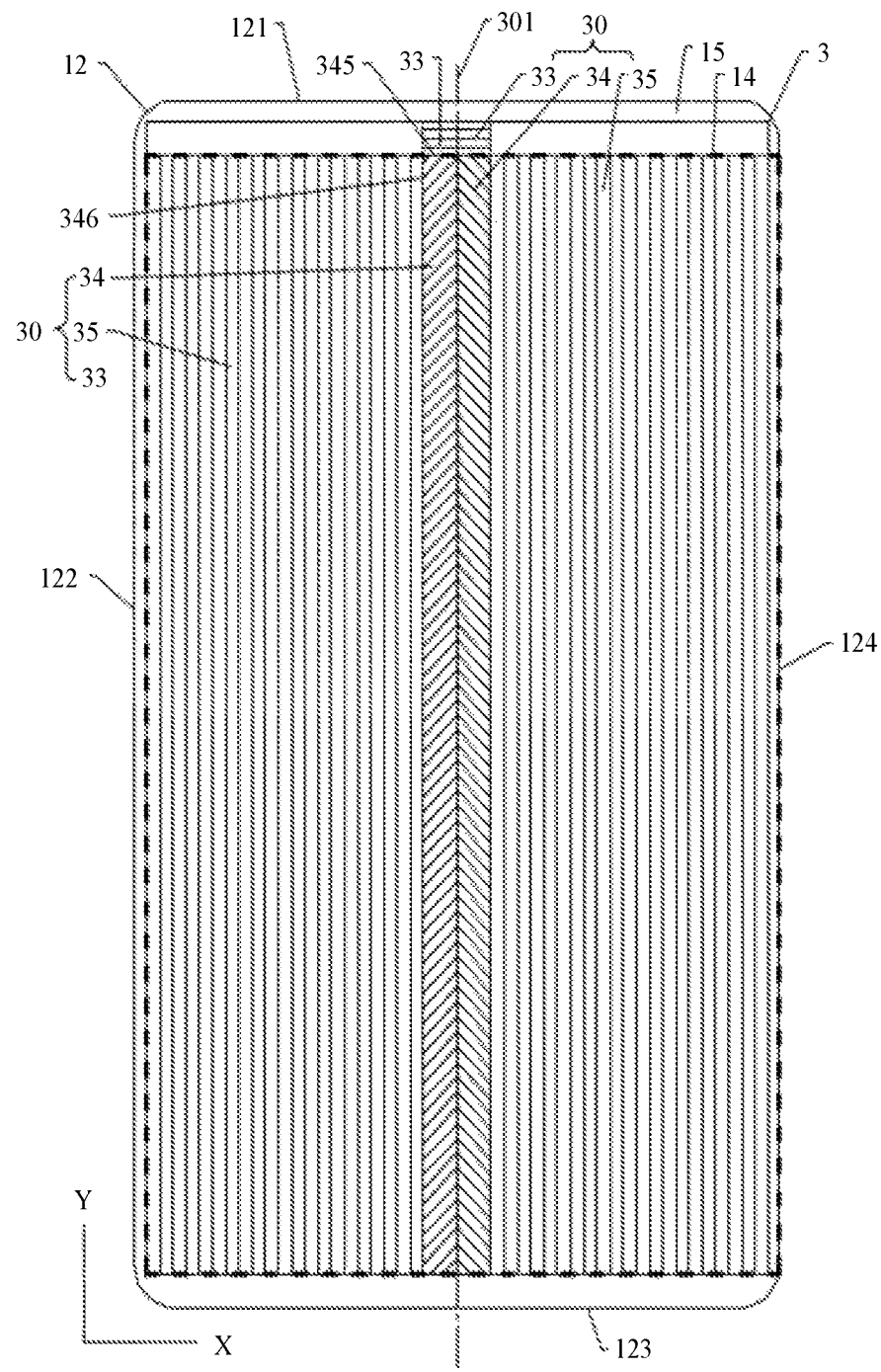
FIG. 17 is a schematic structural diagram of the position relationship between the light guide plate and the bottom surface of the cover plate in FIG. 2 in a sixth implementation.

Reference is made to FIG. 17. FIG. 17 is a schematic structural diagram of the position relationship between the light guide plate 3 and the bottom surface 12 of the cover plate 1 in FIG. 2 in a sixth implementation. FIG. 17 is a top view. Most technical content in this implementation that is the same as that in the foregoing implementation is not described again.

A light incident surface 345 of a second grating part 34 of one of two axisymmetric grating groups 30 is parallel to the first short side 121, and a light emergent surface 346 of the second grating part 34 is parallel to the first long side 122. In this implementation, a symmetry axis 301 of the two grating groups 30 is parallel to the first long side 122. The symmetry axis 301 is approximately located in the middle of the bottom surface 12 of the cover plate 1. A spacing between the symmetry axis 301 and the first long side 122 may be equal to a spacing between the symmetry axis 301 and the second long side 124.

For example, a first grating part 33 of one of the grating groups 30 is placed in the middle of the top (or the middle of the bottom) of the cover plate 1, a second grating part 34 is placed in the middle of the cover plate 1, the first grating part 33 is located between the second grating part 34 and the first short side 121 (or the second short side 123), the third grating part 35 is located on the left of the second grating part 34, and the third grating part 35 is located between the second grating part 34 and the first long side 122.

A first grating part 33 of the other grating group 30 is placed in the middle of the top (or the middle of the bottom) of the cover plate 1, a second grating part 34 is placed in the middle of the cover plate 1, the first grating part 33 is located between the second grating part 34 and the first short side 121 (or the second short side 123), the third grating part 35 is located on the right of the second grating part 34, and the third grating part 35 is located between the second grating part 34 and the second long side 124.

In this implementation, the first grating parts 33 of the two grating groups 30 may be combined together, the two first grating parts 33 may be configured to receive light from a same light-emitting unit 7, and one light-emitting unit 7 may correspond to two grating groups 30. In this way, a quantity of light-emitting units 7 of the light source is reduced.

Optionally, projections of the first grating parts 33 of the two grating groups 30 onto the bottom surface 12 of the cover plate 1 may fall within the black-edge region 15. Projections of the third grating parts 35 of the two grating groups 30 onto the bottom surface 12 of the cover plate 1 may fall within the display region 14. Projections of the second grating parts 34 of the two grating groups 30 onto the bottom surface 12 of the cover plate 1 may fall within the display region 14.

In another implementation, a first grating part 33 of one of the two axisymmetric grating groups 30 is placed at an upper left corner (or a lower left corner) of the cover plate 1, a second grating part 34 is placed at a left edge of the cover plate 1, the first grating part 33 is located between the second grating part 34 and the first short side 121 (or the second short side 123), the third grating part 35 is located on the right of the second grating part 34, and the third grating part 35 is located between the second grating part 34 and the second long side 124.

A first grating part 33 of the other grating group 30 is placed at an upper right corner (or a lower right corner) of the cover plate 1, the second grating part 34 is placed at a right edge of the cover plate 1, the first grating part 33 is located between the second grating part 34 and the first short side 121 (or the second short side 123), the third grating part 35 is located on the left of the second grating part 34, and the third grating part 35 is located between the second grating part 34 and the first long side 122.

Figure 18:
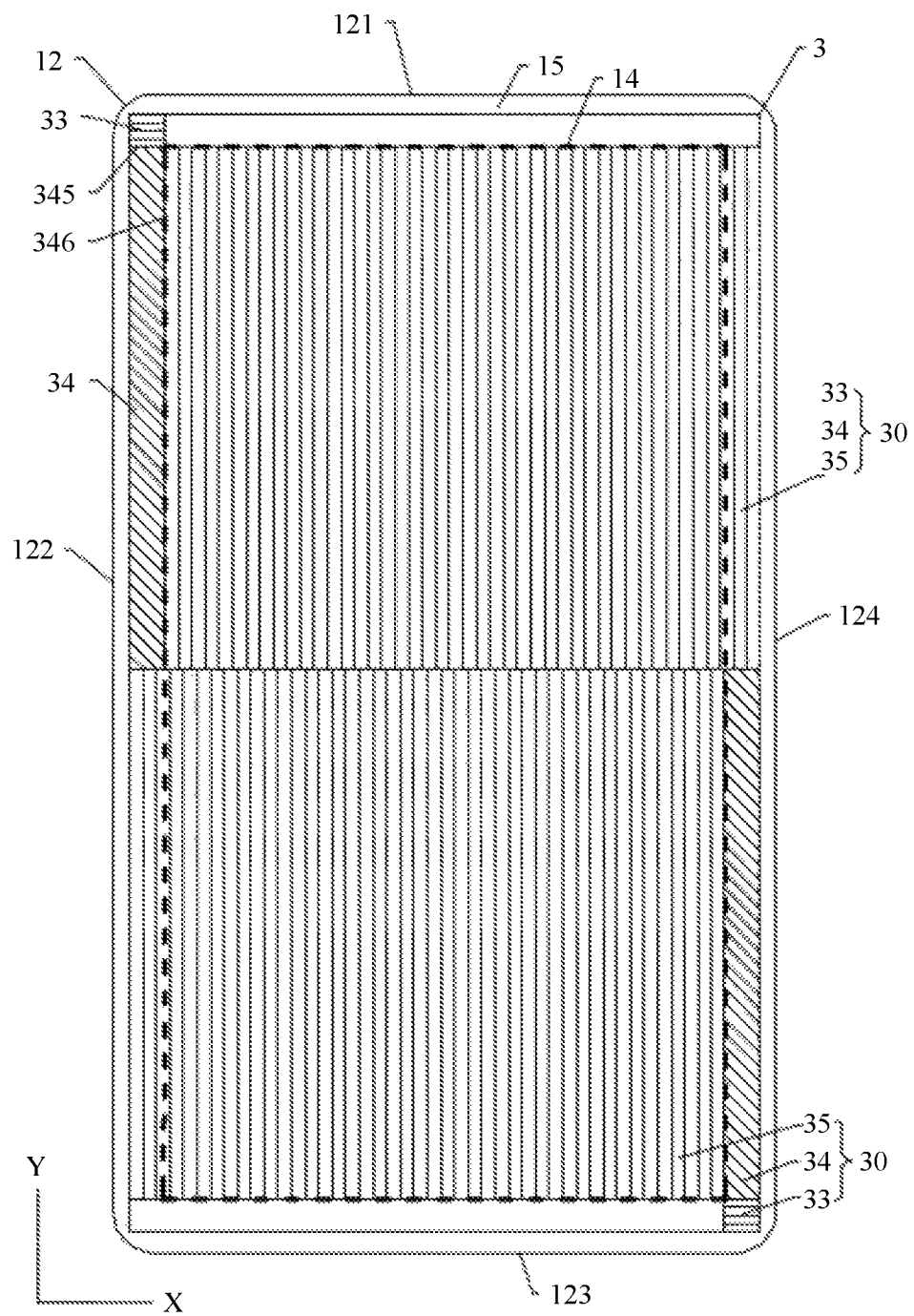
FIG. 18 is a schematic structural diagram of the position relationship between the light guide plate and the bottom surface of the cover plate in FIG. 2 in a seventh implementation.

Reference is made to FIG. 18. FIG. 18 is a schematic structural diagram of the position relationship between the light guide plate 3 and the bottom surface 12 of the cover plate 1 in FIG. 2 in a seventh implementation. FIG. 18 is a top view. Most technical content in this implementation that is the same as that in the foregoing implementation is not described again.

There are two grating groups 30. The two grating groups 30 are arranged centrosymmetrically. Because the two grating groups 30 are arranged centrosymmetrically, and the display zone of the display panel 5 is in a regular shape, light emergent regions corresponding to the two grating groups 30 can better adapt to the display zone of the display panel 5. This helps the electronic device 100 implement full-screen detection or large-area detection. A symmetric center of the two grating groups 30 is located in the center of the light guide plate 3. A light incident surface 345 of a second grating part 34 of one of the grating groups 30 is parallel to the first short side 121, and a light emergent surface 346 of the second grating part 34 is parallel to the first long side 122.

A first grating part 33 of one of the grating groups 30 is placed at an upper left corner (or an upper right corner) of the cover plate 1, a second grating part 34 is placed at a left edge (or a right edge) of the cover plate 1, the first grating part 33 is located between the second grating part 34 and the first short side 121, a third grating part 35 is located on the (or the left) of the second grating part 34, and the third grating part 35 is located between the second grating part 34 and the second long side 124 (or the first long side 122).

A first grating part 33 of the other grating group 30 is placed at a lower right corner (or a lower left corner) of the cover plate 1, a second grating part 34 is placed at a right edge (a left edge) of the cover plate 1, the first grating part 33 is located between the second grating part 34 and the second short side 123, a third grating part 35 is located on the left (or right) of the second grating part 34, and the third grating part 35 is located between the second grating part 34 and the first long side 122 (or the second long side 124).

Optionally, projections of the first grating parts 33 of the two grating groups 30 onto the bottom surface 12 of the cover plate 1 may fall within the black-edge region 15. Projections of the second grating parts 34 of the two grating groups 30 onto the bottom surface 12 of the cover plate 1 may fall within the black-edge region 15. A part of projections of the third grating parts 35 of the two grating groups 30 onto the bottom surface 12 of the cover plate 1 may fall within the display region 14, and a part of the projections may fall within the black-edge area 15. Parts, falling into the display region 14, of the projections of the third grating parts 35 of the two grating groups 30 onto the bottom surface 12 of the cover plate 1 may cover the display region 14 after being combined. In another embodiment, projections of the second grating parts 34 of the two grating groups 30 onto the bottom surface 12 of the cover plate 1 may fall within the display region 14, and projections of the third grating parts 35 of the two grating groups 30 onto the bottom surface 12 of the cover plate 1 fall within the display region 14.

Figure 19:
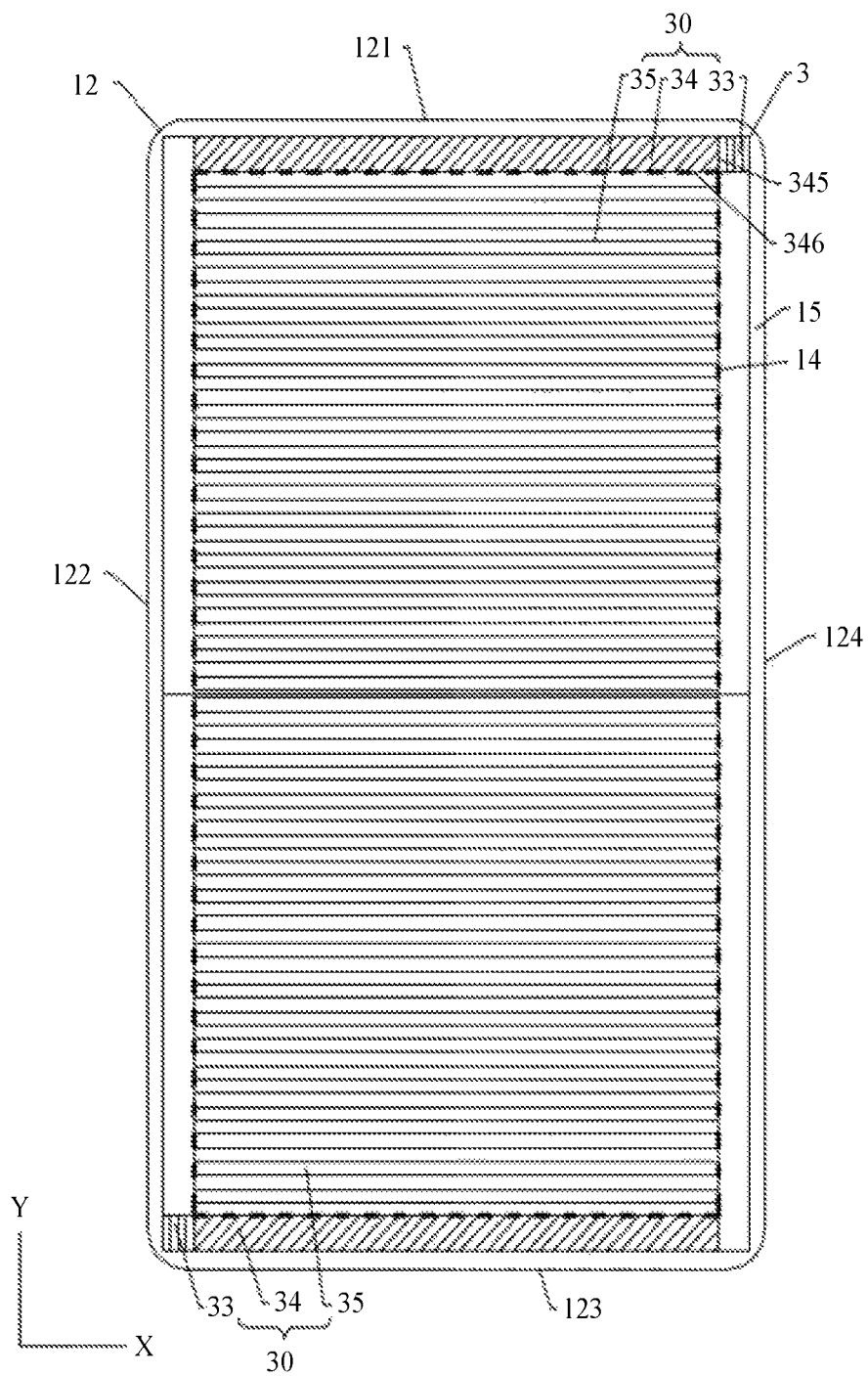
FIG. 19 is a schematic structural diagram of the position relationship between the light guide plate and the bottom surface of the cover plate in FIG. 2 in an eighth implementation.

Reference is made to FIG. 19. FIG. 19 is a schematic structural diagram of the position relationship between the light guide plate 3 and the bottom surface 12 of the cover plate 1 in FIG. 2 in an eighth implementation. FIG. 19 is a top view. Most technical content in this implementation that is the same as that in the foregoing implementation is not described again.

There are two grating groups 30. The two grating groups 30 are arranged centrosymmetrically. A symmetric center of the two grating groups 30 is located in the center of the light guide plate 3. A light incident surface 345 of a second grating part 34 of one of the grating groups 30 is parallel to the first long side 122, and a light emergent surface 346 of the second grating part 34 is parallel to the first short side 121.

For example, a first grating part 33 of one of the grating groups 30 is placed at an upper right corner (or an upper left corner) of the cover plate 1, a second grating part 34 is placed at a top edge of the cover plate 1, the first grating part 33 is located between the second grating part 34 and the second long side 124 (or the first long side 122), a third grating part 35 is located at the bottom of the second grating part 34, and the third grating part 35 is located between the second grating part 34 and the second short side 123.

A first grating part 33 of the other grating group 30 is placed at a lower left corner (or a lower right corner) of the cover plate 1, a second grating part 34 is placed at a bottom edge of the cover plate 1, the first grating part 33 is located between the second grating part 34 and the first long side 122 (or the second long side 124), a third grating part 35 is located on the top of the second grating part 34, and the third grating part 35 is located between the second grating part 34 and the first short side 121.

Optionally, projections of the first grating parts 33 of the two grating groups 30 onto the bottom surface 12 of the cover plate 1 may fall within the black-edge region 15. Projections of the third grating parts 35 of the two grating groups 30 onto the bottom surface 12 of the cover plate 1 may fall within the display region 14. Projections of the second grating parts 34 of the two grating groups 30 onto the bottom surface 12 of the cover plate 1 may fall within the black-edge region 15. In another embodiment, projections of the second grating parts 34 of the two grating groups 30 onto the bottom surface 12 of the cover plate 1 may fall within the display region 14.

In another implementation, a first grating part 33 of one of the two centrosymmetric grating groups 30 is placed at a right edge (or a left edge) in the middle of the cover plate 1, a second grating part 34 is placed in the middle of the cover plate 1, the first grating part 33 is located between the second grating part 34 and the first long side 122 (or the second long side 124), a third grating part 35 is located on the top of the second grating part 34, and the third grating part 35 is located between the second grating part 34 and the first short side 121.

A first grating part 33 of the other grating group 30 is placed at a left edge (or a right edge) in the middle of the cover plate 1, a second grating part 34 is placed in the middle of the cover plate 1, the first grating part 33 is located between the second grating part 34 and the second long side 124 (or the first long side 122), a third grating part 35 is located at the bottom of the second grating part 34, and the third grating part 35 is located between the second grating part 34 and the second short side 123.

Figure 20:
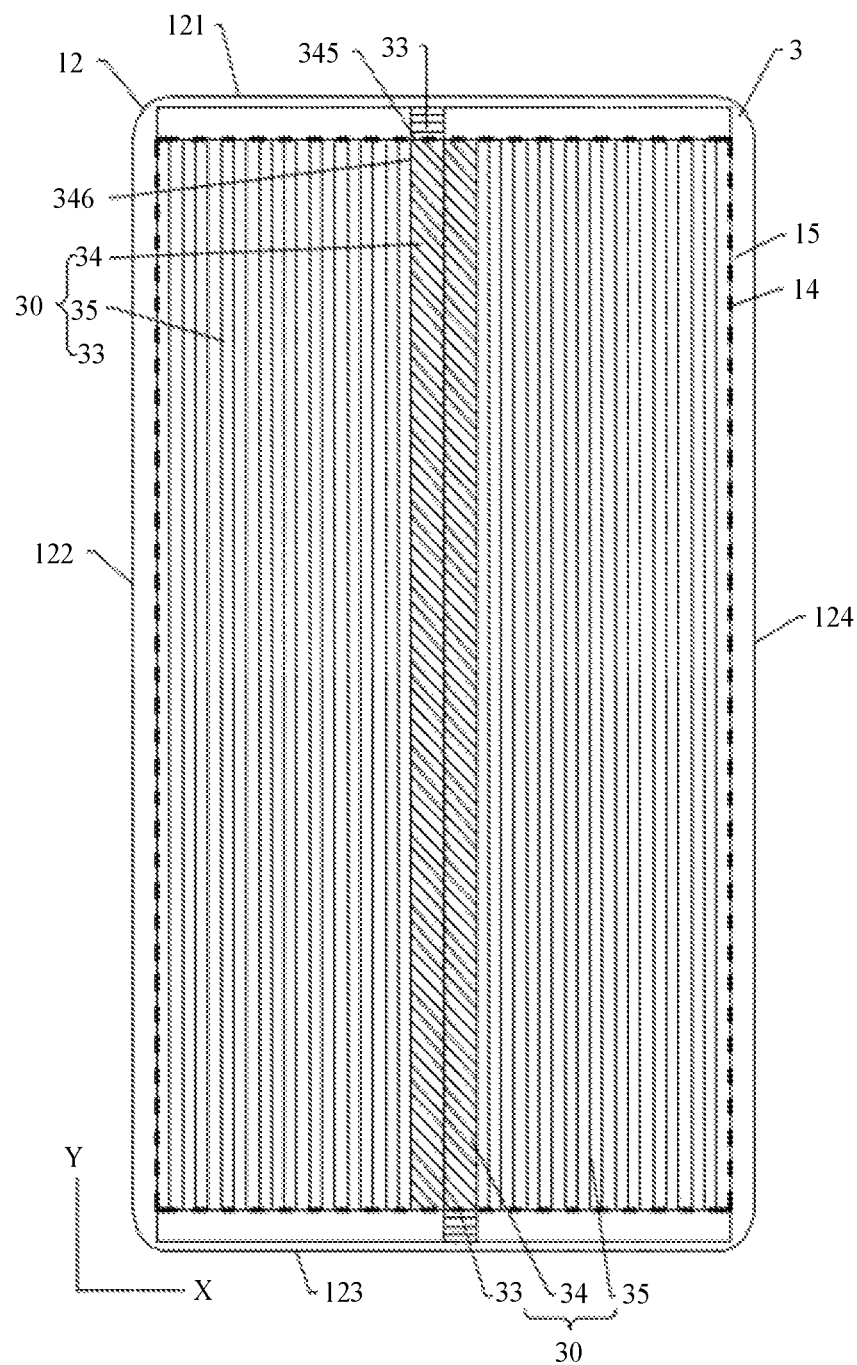
FIG. 20 is a schematic structural diagram of the position relationship between the light guide plate and the bottom surface of the cover plate in FIG. 2 in a ninth implementation.

Reference is made to FIG. 20. FIG. 20 is a schematic structural diagram of a position relationship between the light guide plate 3 and the bottom surface 12 of the cover plate 1 in FIG. 2 in a ninth implementation. FIG. 20 is a top view. Most technical content in this implementation that is the same as that in the foregoing implementation is not described again.

There are two grating groups 30. The two grating groups 30 are arranged centrosymmetrically. A symmetric center of the two grating groups 30 is located in the center of the light guide plate 3. A light incident surface 345 of a second grating part 34 of one of the grating groups 30 is parallel to the first short side 121, and a light emergent surface 346 of the second grating part 34 is parallel to the first long side 122.

For example, a first grating part 33 of one of the grating groups 30 is placed in the middle of the top (or the middle of the bottom) of the cover plate 1, a second grating part 34 is placed in the middle of the cover plate 1, the first grating part 33 is located between the second grating part 34 and the first short side 121 (or the second short side 123), the third grating part 35 is located on the left of the second grating part 34, and the third grating part 35 is located between the second grating part 34 and the first long side 122.

A first grating part 33 of the other grating group 30 is placed in the middle of the bottom (or the middle of the top) of the cover plate 1, a second grating part 34 is placed in the middle of the cover plate 1, the first grating part 33 is located between the second grating part 34 and the second short side 123 (or the first short side 121), the third grating part 35 is located on the right of the second grating part 34, and the third grating part 35 is located between the second grating part 34 and the second long side 124.

Optionally, projections of the first grating parts 33 of the two grating groups 30 onto the bottom surface 12 of the cover plate 1 may fall within the black-edge region 15. Projections of the third grating parts 35 of the two grating groups 30 onto the bottom surface 12 of the cover plate 1 may fall within the display region 14. Projections of the second grating parts 34 of the two grating groups 30 onto the bottom surface 12 of the cover plate 1 may fall within the display region 14.

In another implementation, a first grating part 33 of one of the two centrosymmetric grating groups 30 is disposed at an upper left corner (or a lower left corner) of the cover plate 1, a second grating part 34 is placed at a left edge of the cover plate 1, the first grating part 33 is located between the second grating part 34 and the first short side 121 (or the second short side 123), the third grating part 35 is located on the right of the second grating part 34, and the third grating part 35 is located between the second grating part 34 and the second long side 124.

A first grating part 33 of the other grating group 30 is placed at a lower right corner (or an upper right corner) of the cover plate 1, the second grating part 34 is placed at a right edge of the cover plate 1, the first grating part 33 is located between the second grating part 34 and the second short side 123 (or the first short side 121), the third grating part 35 is located on the left of the second grating part 34, and the third grating part 35 is located between the second grating part 34 and the first long side 122.

Figure 21:
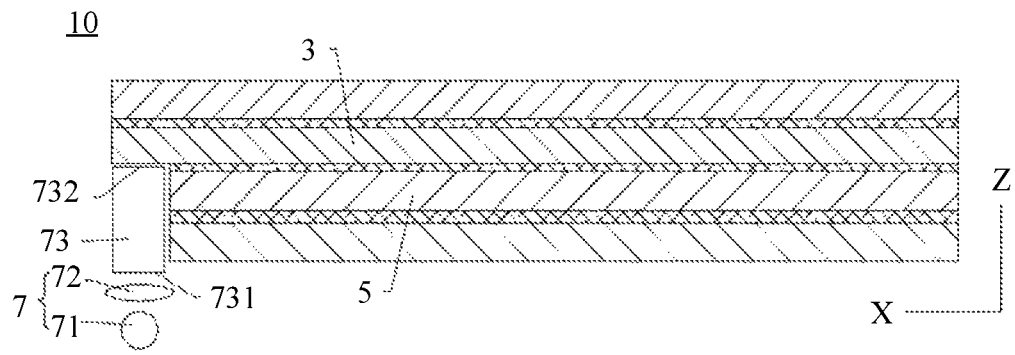
FIG. 21 is a schematic structural diagram of the structure, along the line A-A in a second embodiment, of the screen assembly of the electronic device shown in FIG. 1.

FIG. 21 is a schematic structural diagram of the structure, along a line A-A in a second embodiment, of the screen assembly 10 of the electronic device 100 shown in FIG. 1. Most technical content in this embodiment that is the same as that in the first embodiment is not described again.

The electronic device 100 further includes a light pipe 73. The light pipe 73 is located on a side, facing the display panel 5, of the light guide plate 3, and is located around the display panel 5. The light pipe 73 includes a light incident end surface 731 and a light emergent end surface 732. The collimation lens 72 is located between the laser 71 and the light guide pillar 73. The light incident end surface 731 is configured to receive the emitted light entering the light pipe 71. The light emergent end surface 732 is configured to enable the emitted light to be emitted from the light pipe 73 and enter the first grating part. Emitted light from the light source can enter the light pipe 73 through the light incident end surface 731, and enter the first grating part 33 after being emitted from the light pipe 73 through the light emergent end surface 732 (referring to FIG. 4).

In this embodiment, the emitted light can enter the first grating part 33 through the light guide plate 3, and the light pipe 73 can guide light. Therefore, the light source does not need to be directly placed under the first grating part 33, that is, the light source does not need to be placed around the display panel 5. In this case, a size occupied for a peripheral region of the screen assembly 10 can be reduced, and a size of the peripheral region of the screen assembly 10 can be reduced to a size of one light pipe 73. In this way, a width of a black edge of the screen assembly 10 is reduced.

The light pipe 73 may be of a cylindrical structure or a cuboid structure. A material of the light pipe 73 may be PC or glass.

Figure 22:
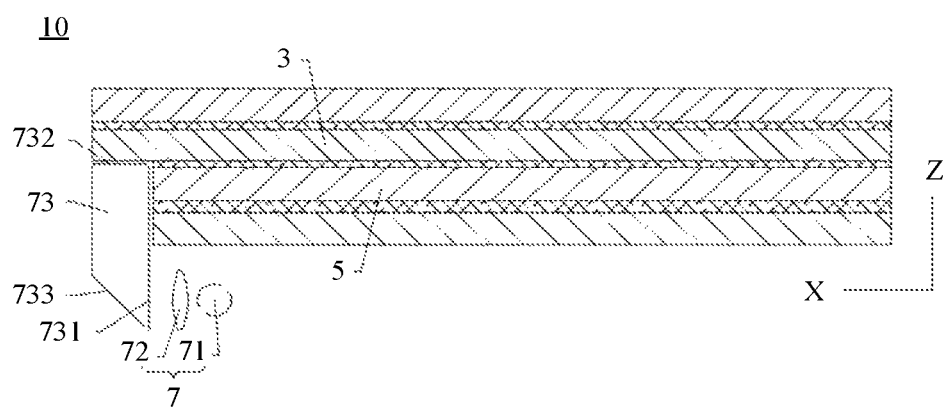
FIG. 22 is a schematic structural diagram of the structure, along the line A-A in a third embodiment, of the screen assembly of the electronic device shown in FIG. 1.

FIG. 22 is a schematic structural diagram of a structure, along a line A-A in a third embodiment, of the screen assembly 10 of the electronic device 100 in FIG. 1. Most technical content in this embodiment that is the same as that in the foregoing embodiment is not described again.

The electronic device 100 further includes a light pipe 73. The light pipe 73 is located on a side, facing the display panel 5, of the light guide plate 3, and is located around the display panel 5. The light pipe 73 includes a light incident end surface 731, a reflection surface 733, and a light emergent end surface 732. The light source is located on a side, away from the light guide plate 3, of the display panel 5. The light incident end surface 731 is configured to receive the emitted light entering the light pipe 73. The reflection surface 733 is configured to reflect the emitted light entering the light pipe 73. The light emergent end surface 732 is configured to enable the reflected emitted light to be emitted from the light pipe 73 and enter the first grating part 33. The emitted light can enter the light pipe 73 through the light incident end surface 731. The emitted light entering the light pipe 73 is emitted from the light pipe 73 through the light emergent end surface 732 after being reflected by the reflection surface 733, and enters the first grating part 33.

In this embodiment, the light pipe 73 can change a light propagation direction, in this case, the light source can be arranged under the display panel 5, and even under the display zone of the display panel 5. Therefore, the light source does not need to occupy peripheral space of the screen assembly 10. In this way, a size requirement on a bezel region (corresponding to a black-edge region of the cover plate 1) of the screen assembly 10 is reduced, and it is helpful for the electronic device 100 to implement a narrow bezel.

Figure 23:
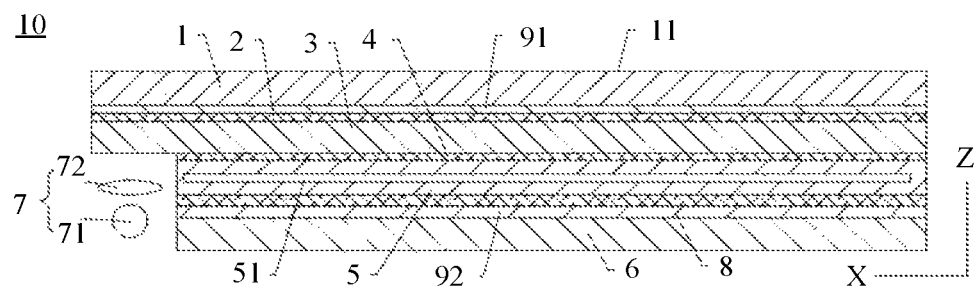
FIG. 23 is a schematic structural diagram of the structure, along the line A-A in a fourth embodiment, of the screen assembly of the electronic device shown in FIG. 1.
Figure 24:
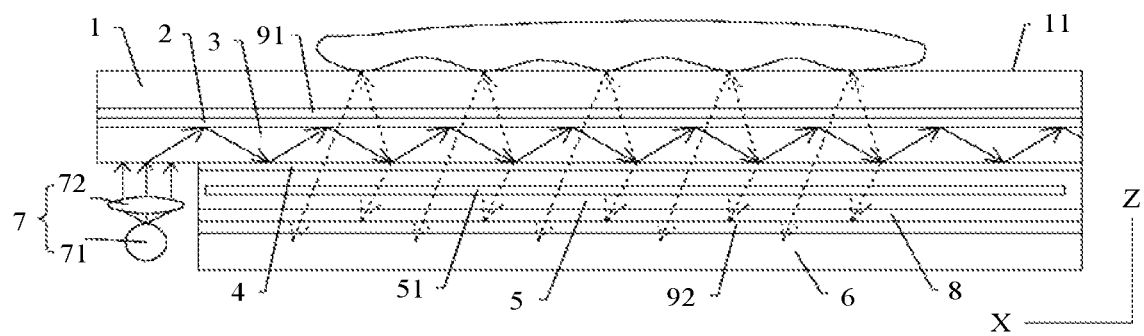
FIG. 24 is a schematic diagram of the structure in FIG. 23 in a used state.

Reference is made to FIG. 23 and FIG. 24. FIG. 23 is a schematic structural diagram of the structure, along the line A-A in a fourth embodiment, of the screen assembly 10 of the electronic device 100 in FIG. 1. FIG. 24 is a schematic structural diagram of the structure in FIG. 23 in a used state. In FIG. 24, a cross-section line in the structure is omitted to clearly show a light transmission path. Most technical content in this embodiment that is the same as that in the foregoing embodiment is not described again.

The image sensor 6 is configured to receive reflected light passing through the light guide plate 3, to form image data of a to-be-detected pattern. The reflected light is light formed by reflecting the emergent light by the to-be-detected pattern. That is, after being emitted from the cover plate 1 through the top surface 11 of the cover plate 1, the emergent light is reflected by the to-be-detected pattern to form reflected light.

In this embodiment, the display panel 5 is a rigid organic light-emitting diode panel. There is an air layer 51 inside the display panel 5. An emergence angle at which the emergent light is emitted from the light emergent surface 352 of the third grating part 351 is less than a critical angle between the cover plate 1 and external air such that the reflected light is light formed by reflecting the emergent light by the to-be-detected pattern. In this embodiment, because the third grating 351 is stacked above the third substrate 354, the emergence angle at which the emergent light is emitted from the light emergent surface 352 of the third grating part 351 is an emergence angle at which the emergent light is emitted from the third grating. The emergent light is emitted from the cover plate 1 and then reflected by the to-be-detected pattern above the cover plate 1 to form the reflected light, and the reflected light enters the image sensor 6 after passing through the cover plate 1, the light guide plate 3, and the display panel 5. In this case, because there is the air layer 51 inside the display panel 5, an image collection manner of the screen assembly 10 no longer depends on an optical path for total internal reflection, but collects reflected light reflected back by the to-be-detected pattern, to form image data of the corresponding to-be-detected pattern. The detection manner is simple and direct.

In another embodiment, the display panel 5 is a flexible organic light-emitting diode panel, there is no air layer inside the display panel 5, and an emergence angle may alternatively be less than a critical angle between the cover plate 1 and external air such that the reflected light is light formed by reflecting the emergent light by the to-be-detected pattern.

Optionally, the electronic device 100 further includes a quarter-wave plate 91 and a linear polarizer (POL) 92. The quarter-wave plate 91 is located between the cover plate 1 and the first bonding layer 2. The linear polarizer 92 is located between the image sensor 6 and the second bonding layer 4, for example, between the third bonding layer 8 and the image sensor 6. The light source is configured to emit linearly polarized emitted light. A polarization direction of the emitted light is perpendicular to a polarization direction of the linear polarizer 92.

In this embodiment, when being emitted from the top surface 11 of the cover plate 1, the light emitted from the light guide plate 3 is reflected by the to-be-detected pattern located above the cover plate 1. An incidence angle at which this part of light is incident to the top surface 11 of the cover plate 1 is less than the critical angle between the cover plate 1 and the external air.

In a use environment, the electronic device 100 can be configured to recognize a user fingerprint. As shown in FIG. 24, when a user's finger is in contact with the cover plate 1, ridges of a fingerprint of the user's finger are in contact with the cover plate 1, and the ridge of the finger reflects a part of light and absorbs a part of light. Because the reflected light passes through the quarter-wave plate 91 twice, the reflected light is deflected by 90° from an initial state such that the reflected light can pass through the linear polarizer 92 and enter the image sensor 6, and finally, a bright zone of a fingerprint image is present on the image sensor 6. However, a valley of the fingerprint of the user's finger is not in contact with the cover plate 1, more light emitted to a region, corresponding to the valley of the fingerprint, on the top surface 11 of the cover plate 1 is directly emitted, energy of reflected light is comparatively weak, and finally, a dark zone of the fingerprint image is present on the image sensor 6.

In another use environment, the electronic device 100 may also be configured to recognize a palm print of the user or another touch action of the user. For a recognition manner, refer to the fingerprint recognition manner. Details are not described herein again.

In this embodiment, no material having birefringence is used for a rigid display screen, therefore, a polarization state of light entering the display panel 5 is stable. When light is diffracted in the light guide plate 3 into stray light that is emitted to the display panel 5, the stray light cannot pass through the linear polarizer 92 because a polarization state of the light is perpendicular to the linear polarizer 92. The linear polarizer 92 can implement filtering such that light noise received by the image sensor 6 is low, and a signal-to-noise ratio of an optical image obtained by the image sensor 6 is high.

The linear polarizer 92 may be a wire grid polarizer, to filter out infrared light.

Figure 25:
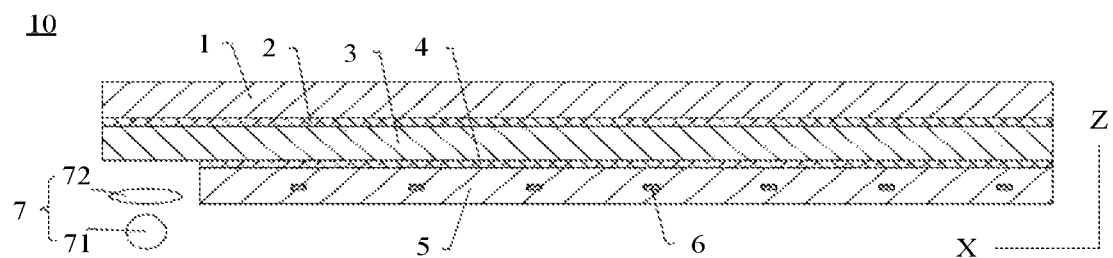
FIG. 25 is a schematic structural diagram of the structure, along the line A-A in a fifth embodiment, of the screen assembly of the electronic device shown in FIG. 1.
Figure 26:
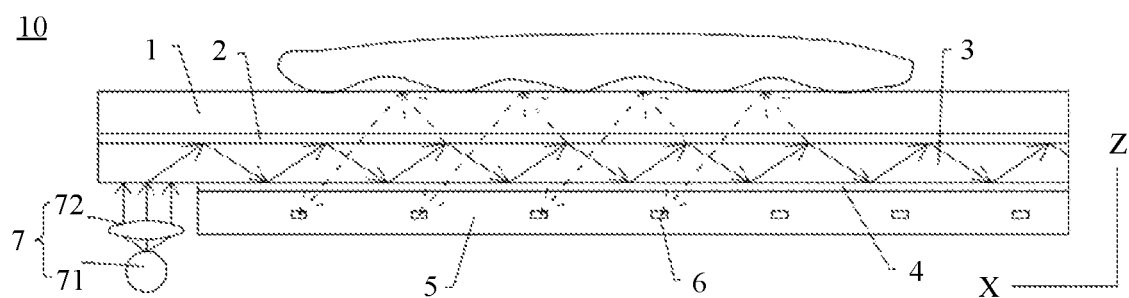
FIG. 26 is a schematic diagram of the structure in FIG. 25 in a used state.

Reference is made to FIG. 25 and FIG. 26. FIG. 25 is a schematic structural diagram of the structure, along a line A-A in a fifth embodiment, of the screen assembly 10 of the electronic device 100 in FIG. 1. FIG. 26 is a schematic structural diagram of the structure in FIG. 25 in a used state. In FIG. 26, a cross-section line in the structure is omitted to clearly show a light transmission path. Most technical content in this embodiment that is the same as that in the foregoing embodiment is not described again.

The image sensor 6 is located inside the display panel 5. In this embodiment, the image sensor 6 may be manufactured inside the display panel 5 using an in-cell technology (that is, the image sensor 6 is located between two package substrates that are oppositely disposed on the display panel 5). The image sensor 6 and a pixel layer of the display panel 5 may be arranged at a same layer. The image sensor 6 may be arranged between two adjacent subpixels.

In this embodiment, because the image sensor 6 is integrated into the display panel 5, system integration is improved, and costs of the electronic device 100 are reduced. Compared with the foregoing embodiment (in which the reflected light can be received by the image sensor 6 only after passing through the entire display panel 5), in this embodiment, the reflected light can be received by the image sensor 6 when entering the display panel 5. Therefore, an energy loss of the reflected light can be reduced, thereby improving signal strength and a signal-to-noise ratio.

Figure 27:
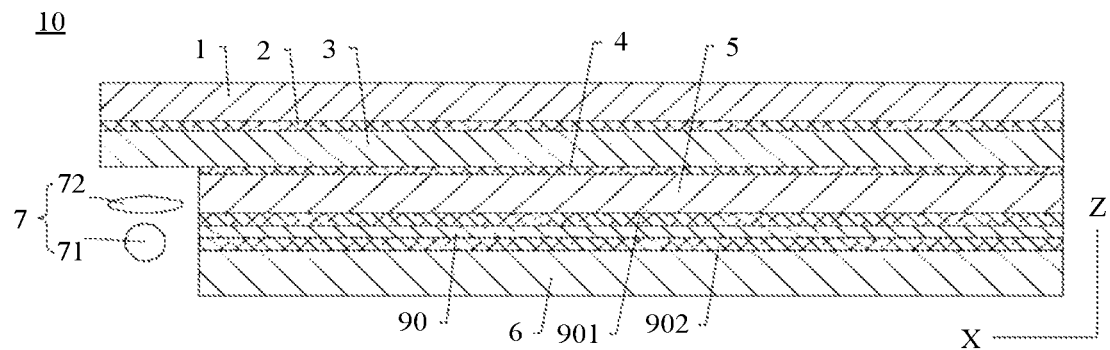
FIG. 27 is a schematic structural diagram of the structure, along the line A-A in a sixth embodiment, of the screen assembly of the electronic device shown in FIG. 1.
Figure 28:
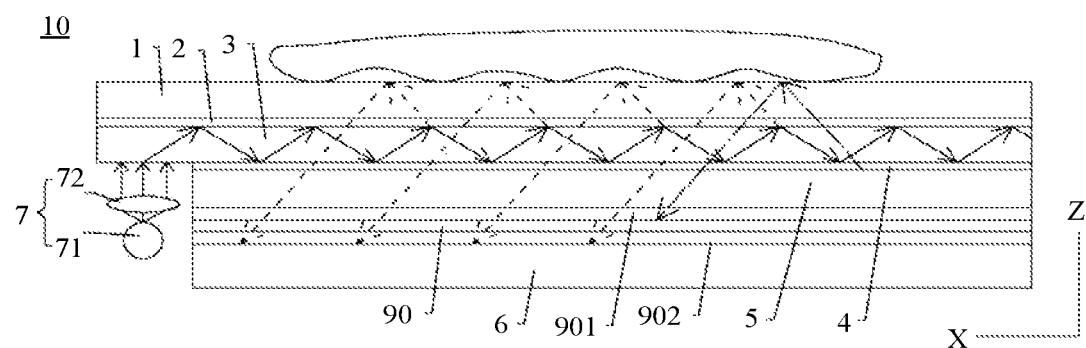
FIG. 28 is a schematic diagram of the structure in FIG. 27 in a used state.

Reference is made to FIG. 27 and FIG. 28. FIG. 27 is a schematic structural diagram of the structure, along the line A-A in a sixth embodiment, of the screen assembly 10 of the electronic device 100 in FIG. 1. FIG. 28 is a schematic structural diagram of the structure in FIG. 27 in a used state. In FIG. 28, a cross-section line in the structure is omitted to clearly show a light transmission path. Most technical content in this embodiment that is the same as that in the foregoing embodiment is not described again.

The screen assembly 10 of the electronic device 100 further includes a filtering layer 90. The filtering layer 90 is located on a side, facing the second bonding layer 4, of the image sensor 6, and is bonded to the image sensor 6. A refractive index of the filtering layer 90 is greater than or equal to 1.3. In this case, light passing through the second bonding layer 4 can smoothly enter the filtering layer 90.

The display panel 5 is located between the filtering layer 90 and the second bonding layer 4. The screen assembly 10 further includes a fourth bonding layer 901. The fourth bonding layer 901 is located between the display panel 5 and the filtering layer 90, and is bonded to the display panel 5 and the filtering layer 90. The screen assembly 10 further includes a fifth bonding layer 902. The fifth bonding layer 902 is located between the filtering layer 90 and the image sensor 6, and is bonded to the filtering layer 90 and the image sensor 6. A refractive index of the fourth bonding layer 901 is greater than or equal to 1.3. A refractive index of the fifth bonding layer 902 is greater than or equal to 1.3. In this case, light passing through the display panel 5 can smoothly pass through the fourth bonding layer 901, the filtering layer 90, and the second bonding layer 902, and enter the image sensor 6.

In an implementation, the filtering layer 90 is an optical filter. A light transmittance of the optical filter to light whose wavelength is equal to that of the emitted light is higher than light transmittance of the optical filter to other light. In consideration of a case such as a manufacturing tolerance, the light whose wavelength is equal to that of the emitted light may include light whose wavelength ranges from $(\lambda-5)$ nm to $(\lambda+5)$ nm, where $\lambda$ is a wavelength of the emitted light. For example, when $\lambda$ is 850 nm, the light whose wavelength is equal to that of the emitted light includes light whose wavelength ranges from 845 nm to 855 nm.

The optical filter may be a high-pass filter. For example, transmittance is higher than 50% or even 80% in a band range of above $(\lambda-5)$ nm (including $(\lambda-5)$ nm). The transmittance is less than 50% in a band range of less than $(\lambda-5)$ nm. A wavelength of a cut-off band of the high-pass filter closer to $(\lambda-5)$ nm leads to better performance. In practice, the wavelength of the cut-off band may be $(\lambda-45)$ nm or even a smaller value in consideration of material characteristics. Transmittance of the cut-off band may be less than 1%. The high-pass filter is easy to manufacture and is low in cost.

Alternatively, the optical filter may be a low-pass filter. For example, the transmittance is higher than 50% or even 80% in a band range less than $(\lambda+5)$ nm (including $(\lambda+5)$ nm). The transmittance is less than 50% in the band range greater than $(\lambda+5)$ nm. A wavelength of a cut-off band of the low-pass filter closer to $(\lambda+5)$ nm leads to better performance. In practice, the wavelength of the cut-off band may be $(\lambda+45)$ nm or even a larger value in consideration of material characteristics. Transmittance of the cut-off band may be less than 1%.

Alternatively, the optical filter may be a band-pass filter. For example, the transmittance is higher than 50% or even 80% in a band range from $(\lambda-5)$ nm to $(\lambda+5)$ nm (including endpoint values). The transmittance is less than 50% in the band range of less than $(\lambda-5)$ nm and greater than $(\lambda+5)$ nm. Wavelengths of a cut-off band of the high-pass filter closer to $(\lambda-5)$ nm and $(\lambda+5)$ lead to better performance. In practice, in consideration of material characteristics, the wavelengths of the cut-off band may be $(\lambda-45)$ nm or even a smaller value, and $(\lambda+45)$ nm or even a larger value. Transmittance of the cut-off band may be less than 1%.

In another implementation, the filtering layer 90 is an optical coated sheet. Light transmittance of the optical coated sheet to incident light having a specific incidence angle is higher than light transmittance to other incident light. For example, an emergence angle at which the emergent light is emitted from the third grating may be any angle from 40° to 60°.

The optical coated sheet may alternatively be a high-pass coated sheet, a low-pass coated sheet, or a band-pass coated sheet. Light transmittance of the optical coated sheet to incident light within a specific incidence angle range may be greater than or equal to 50%. The angle of the cut-off band of the optical coated sheet closer to $\gamma$ (the emergence angle at which the emitted light is emitted from the third light grating) leads to better performance. During actual machining, when the incidence angle is less than or equal to $\gamma-10°$ or greater than or equal to $\gamma+10°$, the transmittance is usually reduced to less than 1%.

In this embodiment, the filtering layer 90 of the electronic device 100 is used to transmit required light and intercept unnecessary light (light shown by a dotted line in FIG. 28) in order to filter out stray light. In this way, a signal-to-noise ratio of an optical image collected by the image sensor 6 is increased such that recognition precision of the electronic device 100 is higher.

Figure 29:
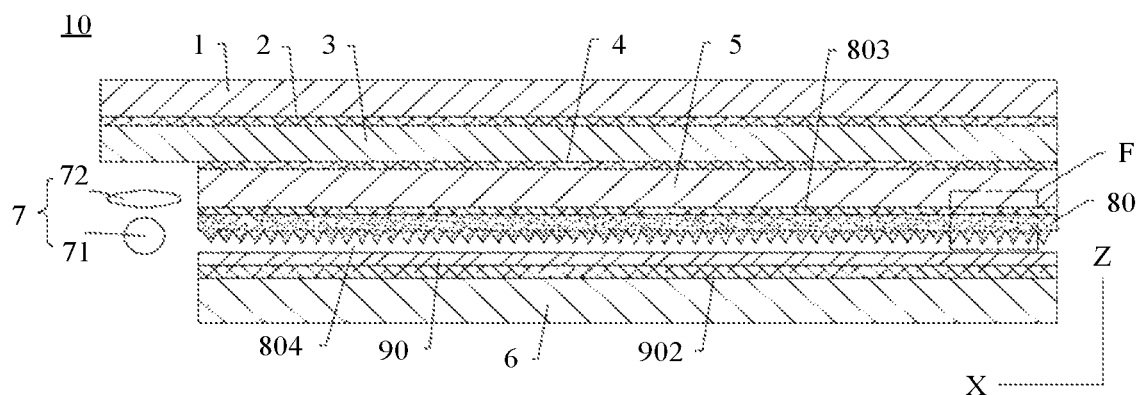
FIG. 29 is a schematic structural diagram of the structure, along the line A-A in a seventh embodiment, of the screen assembly of the electronic device shown in FIG. 1.
Figure 30:
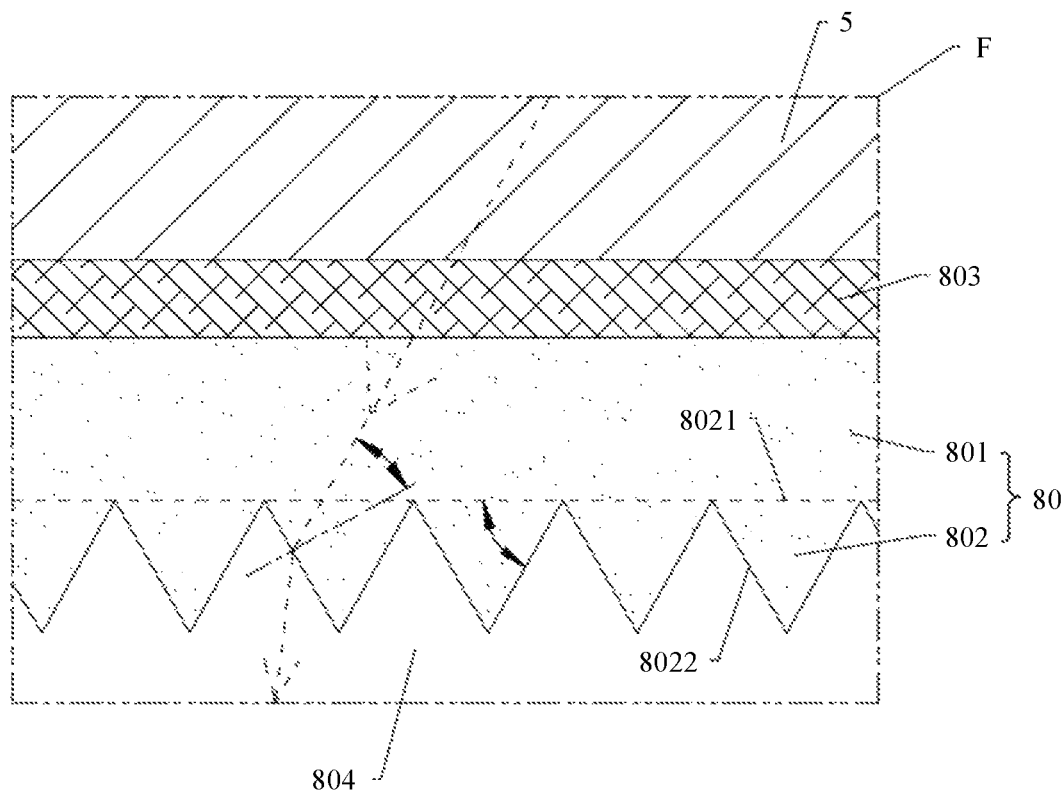
FIG. 30 is an enlarged schematic diagram of the structure in FIG. 29 in a position F.
Figure 31:
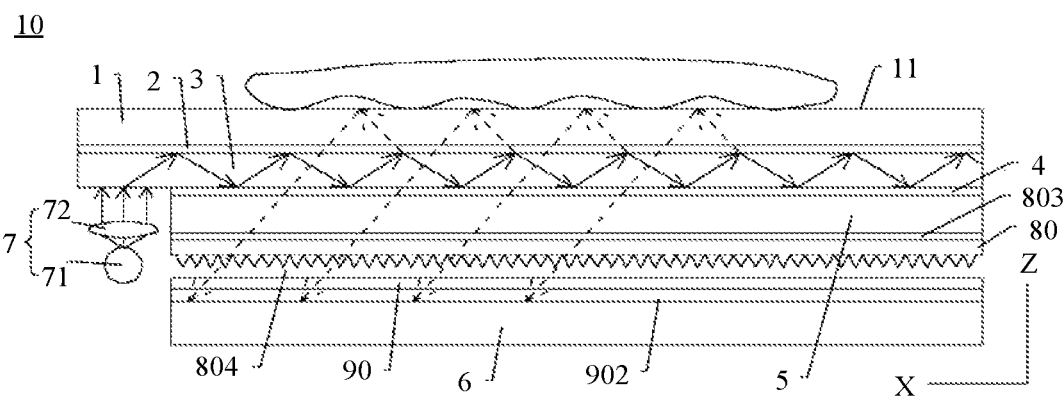
FIG. 31 is a schematic diagram of the structure in FIG. 29 in a used state.

Reference is made to FIG. 29 to FIG. 31. FIG. 29 is a schematic structural diagram of a structure, along a line A-A in a seventh embodiment, the screen assembly 10 of the electronic device 100 shown in FIG. 1. FIG. 30 is an enlarged schematic diagram of a structure in FIG. 29 in a position F. FIG. 31 is a schematic diagram of a structure in FIG. 29 in a used state. In FIG. 31, a cross-section line in the structure is omitted to clearly show a light transmission path. Most technical content in this embodiment that is the same as that in the foregoing embodiment is not described again.

In an optional embodiment, an air layer 804 is formed between the second bonding layer 4 and the image sensor 6. The electronic device 100 further includes a prism film 80. The prism film 80 is located on a side, close to the second bonding layer 4, of the air layer 804. The prism film 80 includes a plurality of micro prisms 802 arranged in an array, and an incidence angle of reflected light on an inclined surface 8022 of the micro prism 802 is less than a critical angle between the prism film 80 and external air. The reflected light is light formed by totally reflecting the emergent light by a region that is not in contact with the to-be-detected pattern, that is on a top surface 11, away from the light guide plate 3, of the cover plate 1, and that is emitted from the light guide plate 3.

In this embodiment, because an incidence angle of the reflected light on the inclined surface 8022 of the micro prism 802 is less than the critical angle between the prism film 80 and the external air, a plurality of micro prisms 802 in the prism film 80 can destroy a condition for total internal reflection. In this case, the reflected light of which total internal reflection originally occurs on an air interface (that is, the top surface 11, far away from of the light guide plate 3, the cover plate 1) can be emitted from the prism film 80 and enter the air layer 804 such that the reflected light enters the image sensor 6 and is collected by the image sensor 6.

The prism film 80 further includes a body 801. The plurality of micro prisms 802 are located on a side, facing the air layer 804, of the body 801. A bottom surface 8021 of each micro prism 802 is connected to the body 801. The plurality of micro prisms 802 and the body 801 are integrally formed. In an implementation, the bottom surface 8021 of each micro prism 802 is parallel to the second bonding layer 4, a first angle is formed between one inclined surface 8022 of each micro prism 802 and the bottom surface 8021 of the micro prism 802, and a sum of an emergence angle γ (referring to FIG. 11) at which the emergent light is emitted from the third grating 35 and a critical angle between the prism film 80 and the external air is less than the first angle.

The electronic device 100 further includes a sixth bonding layer 803. The sixth bonding layer 803 is located between the prism film 80 and the display panel 5, and is bonded to the prism film 80 and the display panel 5. A refractive index of the sixth bonding layer 803 is greater than or equal to 1.3.

In another embodiment, the reflected light may alternatively be light formed by reflecting, by the to-be-detected pattern, the emergent light emitted from the light guide plate 3.

Figure 32:
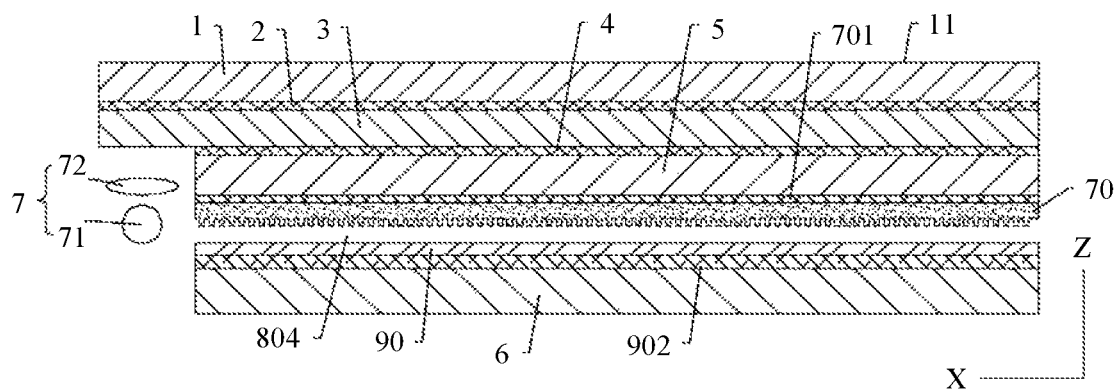
FIG. 32 is a schematic structural diagram of the structure, along the line A-A in an eighth embodiment, of the screen assembly of the electronic device shown in FIG. 1.
Figure 33:
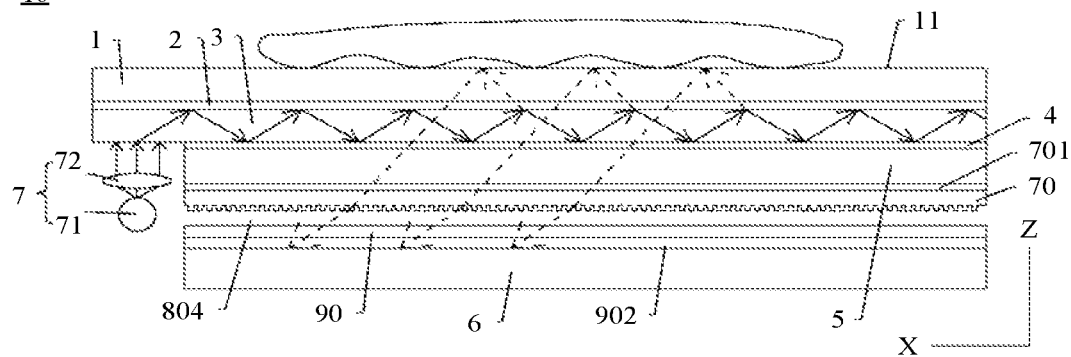
FIG. 33 is a schematic diagram of the structure in FIG. 32 in a used state.

Reference is made to FIG. 32 and FIG. 33. FIG. 32 is a schematic structural diagram of the structure, along the line A-A in an eighth embodiment, of the screen assembly 10 of the electronic device 100 in FIG. 1. FIG. 33 is a schematic structural diagram of the structure in FIG. 32 in a used state. In FIG. 33, a cross-section line in the structure is omitted to clearly show a light transmission path. Most technical content in this embodiment that is the same as that in the foregoing embodiment is not described again.

In an optional embodiment, an air layer 804 is formed between the second bonding layer 4 and the image sensor 6. The electronic device 100 further includes a grating layer 70. The grating layer 70 is located on a side, close to the second bonding layer 4, of the air layer 804. The grating layer 70 is configured to diffract reflected light to form sensed light, and enable the sensed light to pass through the air layer 804 and then enter the image sensor 6. In this case, the image sensor 6 can collect reflected light that is totally reflected on the air interface (that is, the top surface 11, away from the light guide plate 3, of the cover plate 1) such that the electronic device 100 implements pattern detection.

The electronic device 100 further includes a seventh bonding layer 701. The seventh bonding layer 701 is located between the grating layer 70 and the display panel 5, and is bonded to the grating layer 70 and the display panel 5. A refractive index of the seventh bonding layer 701 is greater than or equal to 1.3.

In another embodiment, the reflected light may alternatively be light formed by reflecting, by the to-be-detected pattern, the emergent light emitted from the light guide plate 3.

Figure 34:
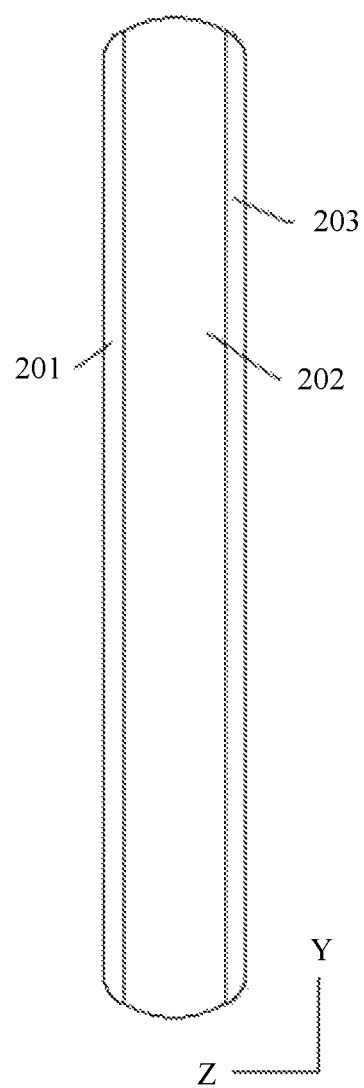
FIG. 34 is a schematic structural diagram of another electronic device according to an embodiment of this application.

FIG. 34 is a schematic structural diagram of another electronic device 200 according to an embodiment of this application. In FIG. 34, description is provided using an example in which the electronic device 200 is a mobile phone. In this embodiment, a length direction of the electronic device 200 is defined as a direction X, a width direction of the electronic device 200 is defined as a direction Y, and a thickness direction of the electronic device 200 is defined as a direction Z. A plane of the directions X and Y is a plane XY.

The electronic device 200 includes a screen assembly 201, a bezel 202, and a rear cover assembly 203. The screen assembly 201 and the rear cover assembly 203 are respectively installed on two opposite sides of the bezel 202. The screen assembly 201, the bezel 202, and the rear cover assembly 203 jointly surround to form an internal cavity of the entire electronic device. Components such as a processor, a mainboard, and a battery of the electronic device 200 are accommodated in the internal cavity of the electronic device 100.

In an implementation, a structure of the screen assembly 201 may be designed with reference to the structure of the screen assembly 10 of the electronic device 100 in the foregoing embodiment. In this case, the screen assembly 201 has a display function, and can implement pattern detection. In another implementation, the screen assembly 201 includes a front cover and a display panel fastened to a side, facing the rear cover assembly 203, of the front cover. In this case, a main difference between the screen assembly 201 and the screen assembly 10 lies in that the screen assembly 201 does not include a first bonding layer 2, a light guide plate 3, a second bonding layer 4, an image sensor 6, or a light source including a light-emitting unit 7, and the screen assembly 201 does not have a pattern detection function.

Figure 35:
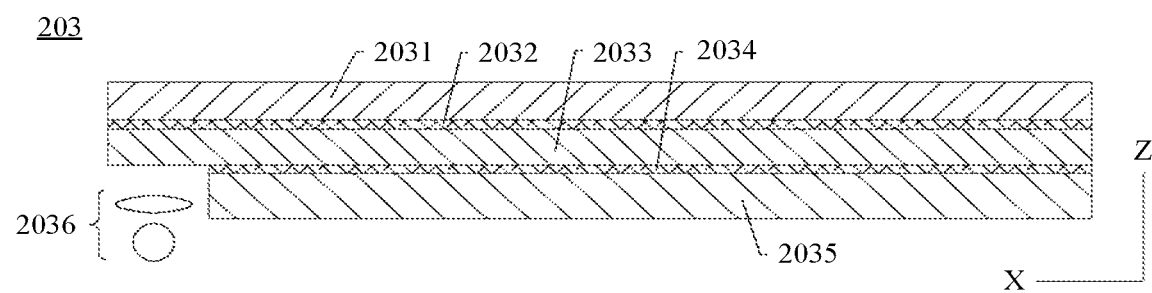
FIG. 35 is a schematic structural diagram of a rear cover assembly of the electronic device shown in FIG. 34.
Figure 36:
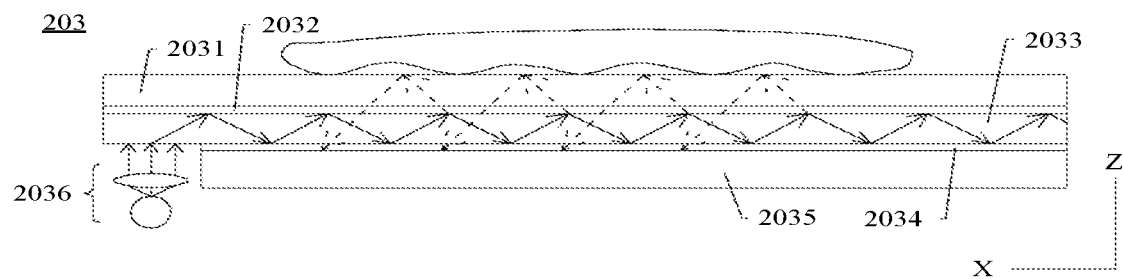
FIG. 36 is a schematic diagram of the structure in FIG. 35 in a used state.

Reference is made to FIG. 35 and FIG. 36. FIG. 35 is a schematic structural diagram of the rear cover assembly 203 of the electronic device 200 shown in FIG. 34. FIG. 36 is a schematic diagram of the structure in FIG. 35 in a used state. In FIG. 36, a cross-section line in the structure is omitted to clearly show a transmission path of emergent light.

In an embodiment, the rear cover assembly 203 of the electronic device 200 includes a cover plate 2031, a first bonding layer 2032, a light guide plate 2033, and a second bonding layer 2034 that are sequentially disposed in a stacked manner. A refractive index of each of the first bonding layer 2032 and the second bonding layer 2034 is less than a refractive index of the light guide plate 2033. The rear cover assembly 203 of the electronic device 200 further includes an image sensor 2035 and a light source 2036. The image sensor 2035 is located on a side, away from the light guide plate 2033, of the second bonding layer 2034. The light source 2036 is located on a side, facing the image sensor 2036, of the light guide plate 2033.

The cover plate 2031 of the electronic device 200 may be designed with reference to the cover plate 1 of the electronic device 100 in the foregoing embodiment. The first bonding layer 2032 may be designed with reference to the first bonding layer 2 of the electronic device 100 in the foregoing embodiment. The light guide plate 2033 may be designed with reference to the light guide plate 3 of the electronic device 100 in the foregoing embodiment. The second bonding layer 2034 may be designed with reference to the second bonding layer 4 of the electronic device 100 in the foregoing embodiment. The image sensor 2035 may be designed with reference to the image sensor 6 of the electronic device 100 in the foregoing embodiment. The light source 2036 may be designed with reference to the light source of the electronic device 100 including the light-emitting unit 7 in the foregoing embodiment. That is, most structures of the rear cover assembly 203 may be designed with reference to the structure of the screen assembly 10 of the electronic device 100 in the foregoing embodiment. Details are not described herein again.

In this embodiment, the cover plate 2031 is a rear cover plate (or a battery cover and is disposed opposite to a screen) of the electronic device 200. In this case, the image sensor 2035 is configured to recognize a to-be-detected pattern located behind the electronic device 200. Because the image sensor 2035 detects the to-be-detected pattern behind the electronic device 200, reflected light reflected by the to-be-detected pattern can enter the image sensor 2035 without passing through the screen. Intensity of the reflected light collected by the image sensor 2035 is high enough so that an accurate optical image can be obtained to form an accurate signal. In this way, pattern detection precision of the electronic device 200 is comparatively high.

In an embodiment, a filtering layer is disposed between the second bonding layer 2034 and the image sensor 2035. The filtering layer may be designed with reference to the filtering layer 90 of the electronic device 100 in the foregoing embodiment.

In an embodiment, an air layer is formed between the second bonding layer 2034 and the image sensor 2035. The electronic device 200 further includes a prism film or a grating layer. The prism film or the grating layer is located on a side, close to the second bonding layer, of the air layer 2034. For example, the prism film or the grating layer is bonded to the second bonding layer 2034. The prism film may be designed with reference to the prism film 80 of the electronic device 100 in the foregoing embodiment. The grating layer may be designed with reference to the grating layer 70 of the electronic device 100 in the foregoing embodiment.

In another embodiment, the cover plate may alternatively be a structure in another position of the electronic device, for example, a structure in a side bezel position of the electronic device.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An electronic device with a pattern detection function, the electronic device comprising:
    a light source configured to emit an emitted light;
    a cover plate comprising a top surface;
    a light guide plate that is disposed on the cover plate in a stacked manner, that has a first refractive index, and that comprises a plurality of grating groups, wherein each of the grating groups comprises:
        a first grating part comprising a first light incident surface, wherein the first grating part is configured to:
            receive the emitted light through the first light incident surface;
            diffract the emitted light to form a first light; and
            transmit the first light;
        a second grating part configured to:
            receive the first light;
            form, based on the first light, a second light to propagate in the second grating part;
            form, based on the second light, a third light; and
            transmit the third light; and
        a third grating part comprising a first light emergent surface, wherein the third grating part is configured to:
            receive the third light;
            form, based on the third light, a fourth light to propagate in the third grating part;
            form an emergent light based on the fourth light; and
            emit the emergent light from the first light emergent surface to enter the cover plate;
    an image sensor coupled to the light guide plate and configured to receive a reflected light that passes through the light guide plate to form image data of a to-be-detected pattern, wherein the reflected light is either:
        a fifth light formed when the emergent light is totally reflected away from the light guide plate by the top surface; or
        a sixth light formed when the emergent light is reflected from the to-be-detected pattern;
    a first bonding layer that is distinct from the cover plate and the light guide plate;
    a second bonding layer that is distinct from the cover plate and the light guide plate and that comprises a first side that is located away from the light guide plate, wherein the cover plate, the first bonding layer, the light guide plate, and the second bonding layer are sequentially disposed in the stacked manner, and wherein both a second refractive index of the first bonding layer and a third refractive index of the second bonding layer are less than the first refractive index; and
    a display panel disposed on the first side, wherein the display panel comprises a second side that is side located away from the light guide plate, and wherein the image sensor is either located inside the light guide plate or located on the second side.

2. The electronic device of claim 1, wherein the second grating part is further configured to:
    propagate the second light in the second grating part through a total internal reflection; and
    diffract the second light to form the third light.

3. The electronic device of claim 1, wherein the third grating part is further configured to:
    propagate the fourth light in the third grating part through a total internal reflection; and
    diffract the fourth light to form the emergent light.

4. The electronic device of claim 1, wherein the first grating part further comprises:
    a first substrate comprising a first third side that is proximate to the cover plate; and
    a first grating stacked on the first third side and configured to diffract the emitted light to form the first light,
    wherein the first substrate is configured to transmit the first light,
    wherein the second grating part comprises:
        a second substrate comprising:
            a fourth side that is proximate to the cover plate; and
            a fifth side that is located away from the cover plate; and
        a second grating stacked either on the fourth side or the fifth side and configured to:
            diffract the second light to form the third light; and
            cooperate with the second substrate to propagate the second light in the second grating part, and
    wherein the third grating part comprises:
        a third substrate comprising:
            a sixth side that is proximate to the cover plate; and
            a seventh side that is located away from the cover plate; and
        a third grating stacked on the fourth sixth side or the fifth seventh side and configured to:
            diffract the fourth light to form the emergent light; and
            cooperate with the third substrate to propagate the fourth light in the third grating part.

5. The electronic device of claim 4, wherein the third grating comprises a first grating serrated surface, wherein the first grating comprises a second grating serrated surface, wherein the second grating comprises a third grating serrated surface, wherein a first projection of the first grating serrated surface onto the cover plate and a second projection of the second grating serrated surface onto the cover plate forms a first included angle, wherein a third projection of the third grating serrated surface onto the cover plate and the second projection forms a second included angle, and wherein the second included angle is equal to a half of the first included angle.

6. The electronic device of claim 5, wherein the emitted light is perpendicularly incident to the first grating, and wherein the first light is a level-1 diffracted light.

7. The electronic device of claim 6, wherein the first grating is a blazed grating or a multi-level phase grating.

8. The electronic device of claim 7, wherein a wavelength of the emitted light is λ, wherein a diffraction angle of the first light is β, wherein an incidence angle when the third light is incident to the third grating is equal to the diffraction angle, wherein an emergence angle when the emergent light is emitted from the third grating is γ, wherein a first refractive index of the light guide plate is n, and wherein a period (d) of the first grating is based on a formula defined as:

$$d = \frac{\lambda}{n \times (\sin\beta + \sin\gamma)}.$$

9. The electronic device of claim 1, wherein the electronic device is a mobile phone, and wherein the cover layer is an outer layer of the mobile phone.

10. The electronic device of claim 1, further comprising:
a bonding layer, wherein the image sensor comprises a third side facing the bonding layer; and
a filtering layer located on the sixth third side and bonded to the image sensor, wherein a fourth refractive index of the filtering layer is greater than or equal to 1.3, and wherein:
when the filtering layer is an optical filter:
a first light transmittance of the optical filter for a seventh light in a selected band is higher than a second light transmittance of the optical filter for an eighth light outside the selected band; and
the selected band comprises a range from (λ−5) nanometers (nm) to (λ+5) nm, wherein λ is a wavelength of the emitted light; and
when the filtering layer is an optical coated sheet:
a third light transmittance of the optical coated sheet for a first incident light within a specific incident-angle range is higher than a fourth light transmittance of a second incident light outside the specific incident-angle range; and
the specific incident-angle range is γ to 90°, wherein γ is an emergence angle when the emergent light is emitted from the third grating.

11. The electronic device of claim 9, wherein the cover layer is configured to contact a finger of a user for fingerprint authentication.

12. The electronic device of claim 11, wherein the display panel is a flexible organic light-emitting diode (LED) panel, wherein the emergence angle is greater than or equal to a critical angle between the cover plate and external air, and wherein the reflected light is formed when the emergent light is totally reflects from a region that is not in contact with the to-be-detected pattern and that is on the top surface.

13. The electronic device of claim 11, wherein the display panel is a rigid organic light-emitting diode panel, wherein the display panel comprises an air layer, wherein the emergence angle is less than a critical angle between the cover plate and external air, and wherein the reflected light is formed when the emergent light is reflected from the to-be-detected pattern.

14. The electronic device of claim 13, further comprising:
a quarter-wave plate located between the cover plate and the first bonding layer; and
a linear polarizer located between the image sensor and the second bonding layer,
wherein the light source is further configured to perform linear polarization on the emitted light, wherein a first polarization direction of the emitted light is perpendicular to a second polarization direction of the linear polarizer.

15. The electronic device of claim 1, further comprising:
a bonding layer;
an air layer formed between the bonding layer and the image sensor and comprising a ninth third side that is proximate to the bonding layer; and
a prism film located on the third side and comprises a plurality of first micro prisms arranged in an array, wherein an incidence angle of the reflected light on a tilt surface of a second micro prism is less than a critical angle between the prism film and external air.

16. The electronic device of claim 1, further comprising:
a bonding layer;
an air layer formed between the bonding layer and the image sensor, wherein the air layer comprises a third side that is proximate to the bonding layer; and
a grating layer located on the third side and configured to:
diffract the reflected light to form a sensed light; and
make the sensed light pass through the air layer and enter the image sensor.

17. The electronic device of claim 1, further comprising:
a bonding layer; and
one grating group,
wherein the cover plate comprises a bottom surface coupled to the bonding layer and comprising:
a first short side; and
a first long side perpendicular to the first short side, wherein a first length of the first long side is greater than a second length of the first short side,
wherein a second light incident surface of the second grating part is configured to face the first grating part,
wherein a second light emergent surface of the second grating part is configured to face the third grating part, and
wherein either:
the second light incident surface is parallel to the first short side, and the second light emergent surface is parallel to the first long side; or
the second light emergent surface is parallel to the first short side, and the second light incident surface is parallel to the first long side.

18. The electronic device of claim 17, further comprising a display panel, wherein, for a display zone of the display panel, a display region is formed on the bottom surface, wherein the bottom surface further comprises a black-edged region around the display region, wherein a fourth projection of the first grating part onto the bottom surface falls within the black-edged region, wherein a fifth projection of the second grating part onto the bottom surface falls within the black-edged region, and wherein a sixth projection of the third grating part onto the bottom surface falls within the display region.

19. The electronic device of claim 17, wherein a diffraction efficiency of the second grating part increases in a direction parallel to the second light emergent surface and located away from the second light incident surface.

* * * * *

UNITED STATES PATENT AND TRADEMARK OFFICE
CERTIFICATE OF CORRECTION

PATENT NO. : 11,474,394 B2
APPLICATION NO. : 17/152015
DATED : October 18, 2022
INVENTOR(S) : Wenxiong Wei et al.

Page 1 of 1

It is certified that error appears in the above-identified patent and that said Letters Patent is hereby corrected as shown below:

In the Claims

Claim 4, Column 50, Line 55: "on the fourth sixth side" should read "on the sixth side"

Claim 4, Column 50, Line 56: "fifth seventh side" should read "seventh side"

Claim 10, Column 51, Line 33: "on the sixth third side" should read "on the third side"

Claim 15, Column 52, Line 18: "a ninth third side" should read "a third side"

Signed and Sealed this
Thirteenth Day of December, 2022

Katherine Kelly Vidal
*Director of the United States Patent and Trademark Office*